US008458089B1

(12) United States Patent
Gareis

(10) Patent No.: US 8,458,089 B1
(45) Date of Patent: Jun. 4, 2013

(54) SYSTEM, METHOD AND PROGRAM PRODUCT FOR ADMINISTERING FUND MOVEMENTS USING DEPOSITORY INSTITUTION GROUPS

(75) Inventor: David Edgar Gareis, Maplewood, NJ (US)

(73) Assignee: Island Intellectual Property LLC, Manhasset, NY (US)

( * ) Notice: Subject to any disclaimer, the term of this patent is extended or adjusted under 35 U.S.C. 154(b) by 173 days.

(21) Appl. No.: 13/032,456

(22) Filed: Feb. 22, 2011

Related U.S. Application Data

(60) Provisional application No. 61/354,623, filed on Jun. 14, 2010.

(51) Int. Cl.
*G06Q 40/00* (2012.01)

(52) U.S. Cl.
USPC ............. 705/39; 705/35; 705/40; 705/41; 705/42; 705/45; 235/379; 235/380; 235/385; 235/437; 235/470

(58) Field of Classification Search
USPC ............. 705/35, 39–42, 45; 235/379, 380, 235/385, 437, 470
See application file for complete search history.

(56) References Cited

U.S. PATENT DOCUMENTS

| 4,232,367 A | 11/1980 | Youden et al. |
| 4,346,442 A | 8/1982 | Musmanno |
| 4,376,978 A | 3/1983 | Musmanno |
| 4,597,046 A | 6/1986 | Musmanno et al. |
| 4,674,044 A | 6/1987 | Kalmus et al. |
| 4,694,397 A | 9/1987 | Grant et al. |
| 4,700,297 A | 10/1987 | Hagel et al. |
| 4,751,640 A | 6/1988 | Lucas et al. |
| 4,774,663 A | 9/1988 | Musmanno et al. |
| 4,953,085 A | 8/1990 | Atkins |
| 4,985,833 A | 1/1991 | Oncken |
| 5,126,936 A | 6/1992 | Champion et al. |
| 5,206,803 A | 4/1993 | Vitagliano et al. |

(Continued)

FOREIGN PATENT DOCUMENTS

| EP | 0 608 322 | 7/1998 |
| JP | 10-049590 A | 2/1998 |

(Continued)

OTHER PUBLICATIONS

U.S. Appl. No. 12/025,402, filed Feb. 4, 2008, Bent.

(Continued)

*Primary Examiner* — Narayanswamy Subramanian
(74) *Attorney, Agent, or Firm* — Foley & Lardner LLP

(57) ABSTRACT

A method, system and program product, the method comprising: obtaining at or before a first source reception cutoff time, first client account transaction information; obtaining a respective net transfer amount; selecting respective aggregated deposit account in depository institution in a first group based on selection rules, first group having recipient cutoff times in a first time range; generating transfer data; obtaining at or before a second source reception cutoff time, second client account transaction information; selecting an aggregated deposit account in a depository institution in a second group to deposit/transferor withdraw/transfer funds, based on selection rules, the second group having respective cutoff times in a second time range different from the first time range; generating transfer data; allocating funds from multiple of the client accounts to the transfers; and updating databases.

21 Claims, 8 Drawing Sheets

U.S. PATENT DOCUMENTS

| | | | |
|---|---|---|---|
| 5,220,501 A | 6/1993 | Lawlor et al. | |
| 5,235,507 A | 8/1993 | Sackler et al. | |
| 5,262,942 A | 11/1993 | Earle | |
| 5,270,922 A | 12/1993 | Higgins | |
| 5,291,398 A | 3/1994 | Hagan | |
| 5,297,032 A | 3/1994 | Trojan et al. | |
| 5,424,938 A | 6/1995 | Wagner et al. | |
| 5,631,828 A | 5/1997 | Hagan | |
| 5,644,727 A | 7/1997 | Atkins | |
| 5,649,116 A | 7/1997 | McCoy et al. | |
| 5,671,363 A | 9/1997 | Cristofich et al. | |
| 5,689,650 A | 11/1997 | McClelland et al. | |
| 5,710,889 A | 1/1998 | Clark et al. | |
| 5,765,144 A | 6/1998 | Larche et al. | |
| 5,774,880 A | 6/1998 | Ginsberg | |
| 5,781,654 A | 7/1998 | Carney | |
| 5,802,499 A | 9/1998 | Sampson et al. | |
| 5,806,048 A | 9/1998 | Kiron et al. | |
| 5,806,049 A | 9/1998 | Petruzzi | |
| 5,812,987 A | 9/1998 | Luskin et al. | |
| 5,826,243 A | 10/1998 | Musmanno et al. | |
| 5,848,400 A | 12/1998 | Chang | |
| 5,852,811 A | 12/1998 | Atkins | |
| 5,864,685 A | 1/1999 | Hagan | |
| 5,875,437 A | 2/1999 | Atkins | |
| 5,878,258 A | 3/1999 | Pizi et al. | |
| 5,878,405 A | 3/1999 | Grant et al. | |
| 5,884,285 A | 3/1999 | Atkins | |
| 5,890,141 A | 3/1999 | Carney et al. | |
| 5,893,078 A | 4/1999 | Paulson | |
| 5,903,881 A | 5/1999 | Schrader et al. | |
| 5,905,974 A | 5/1999 | Fraser et al. | |
| 5,940,809 A | 8/1999 | Musmanno et al. | |
| 5,941,996 A | 8/1999 | Smith et al. | |
| 5,946,667 A | 8/1999 | Tull et al. | |
| 5,950,175 A | 9/1999 | Austin | |
| 5,974,390 A | 10/1999 | Ross | |
| 5,978,779 A | 11/1999 | Stein et al. | |
| 6,014,642 A | 1/2000 | El-Kadi et al. | |
| 6,016,482 A | 1/2000 | Molinari et al. | |
| 6,026,438 A | 2/2000 | Piazza et al. | |
| 6,032,133 A | 2/2000 | Hilt et al. | |
| 6,041,314 A | 3/2000 | Davis | |
| 6,044,371 A | 3/2000 | Person et al. | |
| 6,047,324 A | 4/2000 | Ford et al. | |
| 6,049,782 A | 4/2000 | Gottesman et al. | |
| 6,052,673 A | 4/2000 | Leon et al. | |
| 6,088,685 A | 7/2000 | Kiron et al. | |
| 6,092,056 A | 7/2000 | Tull et al. | |
| 6,105,005 A | 8/2000 | Fuhrer | |
| 6,108,641 A | 8/2000 | Kenna et al. | |
| 6,112,191 A | 8/2000 | Burke | |
| 6,119,093 A | 9/2000 | Walker et al. | |
| 6,131,810 A | 10/2000 | Weiss et al. | |
| 6,154,770 A | 11/2000 | Kostakos | |
| 6,189,785 B1 | 2/2001 | Lowery | |
| 6,192,347 B1 | 2/2001 | Graff | |
| 6,226,623 B1 | 5/2001 | Schein et al. | |
| 6,317,783 B1 | 11/2001 | Freishtat et al. | |
| 6,324,523 B1 | 11/2001 | Killeen et al. | |
| 6,363,360 B1 | 3/2002 | Madden | |
| 6,374,231 B1 | 4/2002 | Bent et al. | |
| 6,408,336 B1 | 6/2002 | Schneider et al. | |
| 6,513,020 B1 | 1/2003 | Weiss et al. | |
| 6,970,843 B1 | 11/2005 | Forte | |
| 7,089,202 B1 | 8/2006 | McNamar et al. | |
| 7,103,556 B2 | 9/2006 | Del Rey et al. | |
| 7,124,101 B1 | 10/2006 | Mikurak | |
| 7,133,840 B1 | 11/2006 | Kenna et al. | |
| 7,203,845 B2 | 4/2007 | Sokolic et al. | |
| 7,206,761 B2 | 4/2007 | Colvin | |
| 7,216,100 B2 | 5/2007 | Elliott | |
| 7,321,874 B2 | 1/2008 | Dilip et al. | |
| 7,321,875 B2 | 1/2008 | Dilip et al. | |
| 7,328,179 B2 | 2/2008 | Sheehan et al. | |
| 7,376,606 B2 | 5/2008 | Jacobsen | |
| 7,383,223 B1 | 6/2008 | Dilip et al. | |
| 7,383,227 B2 | 6/2008 | Weinflash et al. | |
| 7,392,222 B1 | 6/2008 | Hamilton et al. | |
| 7,401,037 B2 | 7/2008 | Arena et al. | |
| 7,440,914 B2 | 10/2008 | Jacobsen | |
| 7,505,937 B2 | 3/2009 | Dilip et al. | |
| 7,509,286 B1 | 3/2009 | Bent et al. | |
| 7,519,551 B2 | 4/2009 | Bent et al. | |
| 7,529,709 B2 | 5/2009 | Volchek et al. | |
| 7,536,340 B2 | 5/2009 | Dheer et al. | |
| 7,536,350 B1 | 5/2009 | Bent et al. | |
| 7,596,522 B1 | 9/2009 | Jacobsen | |
| 7,603,307 B2 | 10/2009 | Jacobsen | |
| 7,640,199 B1 | 12/2009 | Hyland | |
| 7,657,761 B2 | 2/2010 | Sokolic et al. | |
| 7,668,771 B1 * | 2/2010 | Bent et al. | 705/35 |
| 7,668,772 B1 | 2/2010 | Bent et al. | |
| 7,672,886 B2 | 3/2010 | Bent et al. | |
| 7,672,901 B1 | 3/2010 | Bent et al. | |
| 7,672,902 B1 | 3/2010 | Bent et al. | |
| 7,680,716 B1 | 3/2010 | Bent et al. | |
| 7,680,734 B1 | 3/2010 | Bent et al. | |
| 7,716,131 B2 | 5/2010 | Bent et al. | |
| 7,720,755 B1 | 5/2010 | Coyle | |
| 7,729,987 B1 | 6/2010 | Wakim et al. | |
| 7,752,107 B1 | 7/2010 | Bent et al. | |
| 7,752,129 B2 | 7/2010 | Bent et al. | |
| 7,756,767 B2 | 7/2010 | Cluse et al. | |
| 7,769,688 B1 | 8/2010 | Bent et al. | |
| 7,788,235 B1 | 8/2010 | Yeo | |
| 7,797,207 B1 | 9/2010 | Dilip et al. | |
| 7,809,640 B1 | 10/2010 | Bent et al. | |
| 7,814,017 B2 | 10/2010 | Vancini et al. | |
| 7,837,100 B2 | 11/2010 | Bonalle et al. | |
| 7,860,771 B2 | 12/2010 | Colvin | |
| 7,873,571 B1 | 1/2011 | Wehmer | |
| 7,873,573 B2 | 1/2011 | Realini | |
| 7,873,677 B2 | 1/2011 | Messing et al. | |
| 7,886,969 B2 | 2/2011 | Antoo et al. | |
| 7,895,098 B2 | 2/2011 | Beard | |
| 7,895,099 B2 | 2/2011 | Whiting et al. | |
| 7,899,743 B2 | 3/2011 | Jacobsen | |
| 7,899,745 B1 | 3/2011 | Jacobsen | |
| 7,899,746 B1 | 3/2011 | Jacobsen | |
| 7,899,747 B2 | 3/2011 | Jacobsen | |
| 7,904,372 B2 | 3/2011 | Whiting et al. | |
| 7,917,433 B2 | 3/2011 | Jacobsen | |
| 7,921,057 B1 | 4/2011 | Jacobsen | |
| 7,933,821 B1 | 4/2011 | Bent et al. | |
| 7,945,511 B2 | 5/2011 | O'Brien et al. | |
| 7,996,308 B1 | 8/2011 | Bent et al. | |
| 8,015,085 B2 | 9/2011 | Blagg et al. | |
| 8,019,667 B1 | 9/2011 | Bent et al. | |
| 8,019,668 B1 * | 9/2011 | Bent et al. | 705/35 |
| 8,032,456 B1 | 10/2011 | Bent et al. | |
| 8,036,986 B2 | 10/2011 | Jacobsen | |
| 8,051,004 B2 | 11/2011 | Jacobsen | |
| 8,051,005 B2 | 11/2011 | Jacobsen | |
| 8,086,508 B2 | 12/2011 | Dheer et al. | |
| 8,090,651 B2 | 1/2012 | Winslow et al. | |
| 8,103,582 B1 | 1/2012 | Zettner | |
| RE43,246 E | 3/2012 | Bent et al. | |
| 8,150,766 B1 | 4/2012 | Bent et al. | |
| 8,191,156 B2 | 5/2012 | Kubo | |
| 8,239,321 B1 * | 8/2012 | Bent et al. | 705/39 |
| 2001/0023414 A1 | 9/2001 | Kumar et al. | |
| 2001/0032182 A1 | 10/2001 | Kumar et al. | |
| 2002/0007330 A1 | 1/2002 | Kumar et al. | |
| 2002/0046144 A1 | 4/2002 | Graff | |
| 2002/0069147 A1 | 6/2002 | Sheehan et al. | |
| 2002/0082981 A1 | 6/2002 | Madden | |
| 2002/0087454 A1 | 7/2002 | Calo et al. | |
| 2002/0091637 A1 | 7/2002 | Bent et al. | |
| 2002/0095592 A1 | 7/2002 | Daniell et al. | |
| 2002/0128951 A1 | 9/2002 | Kiron et al. | |
| 2002/0161707 A1 | 10/2002 | Cole et al. | |
| 2002/0165757 A1 | 11/2002 | Lisser | |
| 2002/0174048 A1 | 11/2002 | Dheer et al. | |
| 2002/0178098 A1 | 11/2002 | Beard | |
| 2002/0194099 A1 | 12/2002 | Weiss | |
| 2003/0023529 A1 | 1/2003 | Jacobsen | |

| | | | |
|---|---|---|---|
| 2003/0041003 A1 | 2/2003 | Kayser, III | |
| 2003/0080185 A1 | 5/2003 | Werther | |
| 2003/0135437 A1 | 7/2003 | Jacobsen | |
| 2003/0149646 A1 | 8/2003 | Chen et al. | |
| 2003/0163403 A1 | 8/2003 | Chen et al. | |
| 2003/0177092 A1 | 9/2003 | Paglin | |
| 2003/0191702 A1 | 10/2003 | Hurley | |
| 2003/0200174 A1 | 10/2003 | Star | |
| 2003/0208438 A1 | 11/2003 | Rothman | |
| 2003/0236728 A1 | 12/2003 | Sunderji et al. | |
| 2004/0039674 A1 | 2/2004 | Coloma | |
| 2004/0107157 A1 | 6/2004 | Bleunven et al. | |
| 2004/0111361 A1 | 6/2004 | Griffiths et al. | |
| 2004/0128229 A1 | 7/2004 | Raines et al. | |
| 2004/0128235 A1 | 7/2004 | Kemper et al. | |
| 2004/0138974 A1 | 7/2004 | Shimamura et al. | |
| 2004/0153398 A1 | 8/2004 | Baumgartner et al. | |
| 2004/0162773 A1 | 8/2004 | Del et al. | |
| 2004/0177036 A1 | 9/2004 | Nutahara et al. | |
| 2004/0249741 A1 | 12/2004 | Understein | |
| 2005/0044038 A1 | 2/2005 | Whiting et al. | |
| 2005/0091137 A1 | 4/2005 | Woeber | |
| 2005/0102225 A1 | 5/2005 | Oppenheimer et al. | |
| 2005/0102226 A1 | 5/2005 | Oppenheimer et al. | |
| 2005/0108120 A1 | 5/2005 | Malka et al. | |
| 2005/0108149 A1* | 5/2005 | Bent et al. | 705/38 |
| 2005/0114246 A1 | 5/2005 | Coloma | |
| 2005/0154662 A1 | 7/2005 | Langenwalter | |
| 2005/0228733 A1* | 10/2005 | Bent et al. | 705/35 |
| 2006/0004655 A1 | 1/2006 | Alexander et al. | |
| 2006/0047593 A1 | 3/2006 | Naratil et al. | |
| 2006/0106703 A1 | 5/2006 | Del et al. | |
| 2006/0155644 A1 | 7/2006 | Reid et al. | |
| 2006/0167773 A1 | 7/2006 | Yang et al. | |
| 2006/0212385 A2* | 9/2006 | Bent et al. | 705/38 |
| 2006/0212389 A2 | 9/2006 | Bent et al. | |
| 2006/0213980 A1 | 9/2006 | Geller et al. | |
| 2006/0273152 A1 | 12/2006 | Fields | |
| 2007/0043666 A1 | 2/2007 | Burdette | |
| 2007/0083938 A1 | 4/2007 | Aoki et al. | |
| 2007/0118449 A1 | 5/2007 | De La Motte et al. | |
| 2007/0130065 A1 | 6/2007 | Staab et al. | |
| 2007/0143196 A1 | 6/2007 | Colvin | |
| 2007/0255655 A1 | 11/2007 | Kemper et al. | |
| 2007/0271174 A2* | 11/2007 | Bent et al. | 705/38 |
| 2007/0276752 A1 | 11/2007 | Whiting et al. | |
| 2007/0288400 A1 | 12/2007 | Menon | |
| 2008/0015985 A1 | 1/2008 | Abhari et al. | |
| 2008/0046358 A1 | 2/2008 | Holm-Blagg et al. | |
| 2008/0065532 A1 | 3/2008 | De La Motte | |
| 2008/0077996 A1 | 3/2008 | Kubo | |
| 2008/0097899 A1 | 4/2008 | Jackson et al. | |
| 2008/0120228 A1 | 5/2008 | Bent et al. | |
| 2008/0133280 A1 | 6/2008 | Ziegler | |
| 2008/0133396 A1 | 6/2008 | De La Motte | |
| 2008/0195534 A1 | 8/2008 | Landis et al. | |
| 2008/0222053 A1 | 9/2008 | Jacobsen | |
| 2008/0288398 A1 | 11/2008 | Maricondi | |
| 2009/0006985 A1 | 1/2009 | Fong et al. | |
| 2009/0012899 A1 | 1/2009 | Friesen | |
| 2009/0024496 A1 | 1/2009 | Balachandran et al. | |
| 2009/0138412 A1 | 5/2009 | Jacobsen | |
| 2009/0241197 A1 | 9/2009 | Troyansky | |
| 2009/0327154 A1 | 12/2009 | Van Vooren et al. | |
| 2010/0268668 A1* | 10/2010 | Burdette | 705/36 R |
| 2010/0274687 A1* | 10/2010 | Ghosh et al. | 705/30 |
| 2010/0274718 A1* | 10/2010 | Ghosh et al. | 705/44 |
| 2011/0106703 A1 | 5/2011 | Jay et al. | |
| 2011/0208640 A1 | 8/2011 | Geoghegan et al. | |
| 2011/0246359 A1 | 10/2011 | O'Brien et al. | |
| 2011/0270720 A1* | 11/2011 | Manohar | 705/30 |
| 2011/0276473 A1* | 11/2011 | Blok | 705/39 |

FOREIGN PATENT DOCUMENTS

| | | |
|---|---|---|
| WO | WO-95/23379 A1 | 8/1995 |
| WO | WO-99118529 A1 | 4/1999 |
| WO | WO-02/42952 A1 | 5/2002 |
| WO | WO-03/012580 A2 | 2/2003 |
| WO | WO-2005/006111 A2 | 1/2005 |

OTHER PUBLICATIONS

U.S. Appl. No. 12/794,448, filed Jun. 4, 2010, Bruce Bent et al.
U.S. Appl. No. 12/794,545, filed Jun. 4, 2010, Bruce Bent et al.
U.S. Appl. No. 12/816,092, filed Jun. 15, 2010, Bruce Bent, II et al.
U.S. Appl. No. 12/829,961, filed Jul. 2, 2010, Bruce Bent, et al.
"Bank of Oak Ridge to Offer FDIC Insurance on up to $1.5.Million," Dialog Web Command Mode, 2 Sheets, Sep. 25, 2003, http://www.dialogweb.com/cgi/dwclient.
"Man Bites Dog: Funds Move Into Banking," IBC's Money Fund Selector, 2 Sheets, Nov. 6, 1998.
"Reverse Ups Insurance Limit on Money Market Account," Thomson Financial Inc., Mutual Fund Market News, 1 Sheet, Aug. 26, 2002.
"The Bank of New York adds a $300,000 FDIC-Insured Money Market Account Option to its Dividend Income Checking Account," PR Newswire Associations, Inc., PR Newswire, 2 Sheets, Apr. 18, 2002.
"The Reverse Funds to Offer up to $600,000 of FDIC Insurance on Reserve Insured Deposits; Addressing Investor Needs for Increased Safety, Flexibility and a Competitive Yield," Business Wire, Inc. Business Wire, 2 Sheets, Aug. 13, 2002.
12 CFR Part 329—Interest on Deposit, Source: 51 FR 10808, Mar. 31, 1986, 5 Sheets.
AB 2011 Assembly Bill—Bill Analysis, Senate Amendments, http://www.leginfo.ca.gov/pub/bill/asm/ab_2001-2050/ab_2011_cfa_20060811_161755_asm_floor.html, 2006, pp. 1-3.
AB 2011 Assembly Bill—Bill Analysis, Senate Rules Committee, Third Reading, http://www.leginfo.ca.gov/pub/bill/asm/ab_2001-2050/ab_2011_cfa_20060705_161454_sen_floor.html, 2006, pp. 1-7.
AB 2011 Assembly Bill—Chaptered, http://www.leginfo.ca.gov/pub/bill/asm/ab_2001-2050/ab_2011_bill_20060925_chaptered.html, 2006, pp. 1-3.
AB 2011 Assembly Bill—Enrolled, http://www.leginfo.ca.gov/pub/bill/asm/ab_2001-2050/ab_2011_bill_20060816_enrolled.html, 2006, pp. 1-3.
AB 2011 Assembly Bill—History, Complete Bill History, http://www.leginfo.ca.gov/pub/bill/asm/ab_2001-2050/ab_2011_bill_20060925_history.html, 2006, p. 1.
About iMoneyNet, Inc., About iMoneyNet's Money Funds Division, 4 Sheets, Aug. 21, 2003, http://www.ibcdata.com/about.htm.
Adler, Joe, "Promontory to Roll Out Deposit Service Insuring Liquid Funds", American Banker, Feb. 22, 2010, 1 sheet.
An iMoneyNet Special Report, Brokerage Cash Sweep Options: The Shift from Money Funds to FDIC-Insured Bank Deposit Accounts, by Peter G. Crane & Michael F. Krasner, iMoneyNet, Nov. 2004, 66 pages.
Anderson et al. "Retail Sweep Programs and Bank Reserves," Federal Reserve Bank of St. Louis Review, Bell & Howell Information and Learning Company, vol. 83, Issue 1, 24 Sheets, Jan. 1, 2001.
Bank Deposit Program, Online http://web.archive.org/web/20030620100115/http:/www.smithbarney.com/products_servi , Jan. 19, 2001, 4 Sheets.
Bent, "Bruce Bent Makes Money Market Funds Act Like Bank Accounts," Equity BBDP, Oct. 5, 1998, 3 Sheets.
Blackwell, "ABA to Approve System for Sharing Deposit Coverage," American Banker, 2 Sheets, Feb. 11, 2003.
Blackwell, "New Pitch: Deposit Insurance Sharing," American Banker Online, 4 Sheets, Jan. 21, 2003.
Board of Governors of the Federal Reserve System, 1984 Fed. Res. Interp. Ltr. LEXIS 56, Nov. 16, 1984, 3 Sheets.
Board of Governors of the Federal Reserve System, 1988 Fed. Res. Interp. Ltr. LEXIS 141, Jun. 22, 1988, 3 Sheets.
Board of Governors of the Federal Reserve System, 1989 Fed. Res. Interp. Ltr. LEXIS 154, Jun. 21, 1989, 2 Sheets.
Board of Governors of the Federal Reserve System, 1989 Fed. Res. Interp. Ltr. LEXIS 77, Mar. 14, 1989, 2 Sheets.
Board of Governors of the Federal Reserve System, 1990 Fed. Res. Interp. Ltr. LEXIS 94, Feb. 1, 1990, 1 Sheet.
Board of Governors of the Federal Reserve System, 1991 Fed. Res. Interp. Ltr. LEXIS 232, Jan. 30, 1991, 2 Sheets.
Board of Governors of the Federal Reserve System, 1994 Fed. Res. Interp. Ltr. LEXIS 156, Jun. 24, 1994, 3 Sheets.

Board of Governors of the Federal Reserve System, 1994 Fed. Res. Intern. Ltr. LEXIS 314, Oct. 17, 1994, 2 Sheets.
Board of Governors of the Federal Reserve System, 1994 Fed. Res. Interp. Ltr. LEXIS 419, Oct. 14, 1994, 4 Sheets.
Britt, "Struggling with Sweep Accounts," America's Community Banker, vol. 6, No. 12, 11 Sheets, Dec. 1, 1997.
California Independent Bankers, ICBA Independent Community Bankers of America, Banker Bulletin, 2006, CIB 16th Annual Convention, vol. 4, issue 6, http://www.cib.org/banker_bulletin.htm.
Capital Briefs: Corporate Checking Account Relief Sought, American Banker, vol. 162, Jul. 28, 1997, 1 Sheet.
Certificate of Deposit Registry Service: Keeping Deposits in the Corn Patch, Banknews, 2 Sheets. Mar. 2003.
Chapelle et al. "Peering Into Tomorrow: At the Threshold of a New Century, Brokers and Others Discuss Where They were Going," Securities Data Publishing on Wall Street, 6 Sheets, Dec. 1, 1999.
Chapelle, "Merrill's Rivals Say They, Too. Offer Services Beyond Banking," Securities Data Publishing on Wall Street, 2 Sheets, Feb. 1, 2003.
CMA, Insured Savings Account Fact Sheet, Merrill Lynch, Pierce, Fenner & Smith Incorporated, 1997, pp. 49-57.
CMA, Insured Savings Account Fact Sheet, Merrill Lynch, Pierce, Fenner & Smith Incorporated, Jul. 1994, pp. 47-54.
CMA, The Investor Credit Line Service, Cost-Effective Financing for the '90s, Merrill Lynch, Pierce, Fenner & Smith Incorporated, 1997, pp. 36-46.
CMA, The Merrill Lynch Cash Management Account Financial Service, Insured Savings Account Participating Depository Institutions, Merrill Lynch, Pierce, Fenner & Smith Incorporated, Mar. 1995, 2 Sheets.
CMA, The Merrill Lynch Cash Management Account Financial Service, Insured Savings Account Participating Depository Institutions, Merrill Lynch, Pierce, Fenner & Smith Incorporated, Nov. 1992, 2 Sheets.
CMA, The Merrill Lynch Cash Management Account Financial Service, Merrill Lynch, Pierce, Fenner & Smith incorporated, Jan. 1997, 35 Sheets.
Litigation Notice After Payment of Issue Fee filed in Parent U.S. Appl. No. 10/382,946, Apr. 3, 2009, 160 pages.
Coyle, "A Look at commercial Demand Deposit Options," America's Community Banker, vol. 9, Issue 2, Bell & Howell Information and Learning Company, 9 Sheets, Feb. 1, 2000.
Crockett, "Big Banks Found Stepping Up Marketing of 'Sweep' Accounts," American Banker, vol. 159, No. 198, American Banker Inc., 3 Sheets, Oct. 13, 1994.
Declaration of Mr. Bruce Bent II, Vice Chairman and Registrant of Applicant on the date of first commercial use of the service providing interest and FDIC insurance for checking accounts by means of a system using money market deposit accounts (MMDA's) of Oct. 23, 1997.
Declaration of Mr. Bruce Bent II, Vice Chairman and Registrant of Applicant. (3 Sheets) and Exhibits A, B, C and D, Mar. 1, 2007, (6 Sheets).
Deposit Growth Strategies for Financial Institutions, New Sweep Account Helps Retain $40 Million in Business Deposits, vol. 7, No. 12, The Reserve Funds, May 2001, 1 Sheet.
Deutsche Bank Insured Deposit Program, Marketing Literature 2007, 3 pages.
DI 48, Excerpts of Transcript of Hearing, U.S. Dist. Ct., District of Delaware, Civil Action No. 82-680, Apr. 8, 1983, 5 sheets.
DI 56, Interrog. Response, U.S. Dist. Ct. District of Delaware, Civil Action No. 82-680, May 20, 1983, 15 Sheets.
DI 99, Suppl. Interrogatory Response, U.S. Dist. Ct., District of Delaware, Civil Action No. 82-630, May 30, 1984, 6 Sheets.
Dreyfus Insured Deposit Program, Disclosure Statement and Terms and Conditions, Dreyfus A BNY Mellon Company, Jan. 2008, 8 Sheets.
Dreyfus Insured Deposit Program, Multiple List Program—Effective May 11, 2009, 1 Sheet.
Email from Olivia Kim to Charles Macedo on Jun. 9, 2010 with attachment of Lawsuit by Island Intellectual Property LLC, Lids Capital LLC, Double Rock Corporation, and Intrasweep LLC against Deutshe Bank Trust Company Americas and Total Bank Solutions, LLC, Defendant Deutsche Bank Trust Company America's responses to lntrasweep's common interrogatory Nos. 1-5, Confidential—Attorneys only, Civil Action No. 09 Civ. 2675 (VM) (AJP).
Email from Olivia Kim to Charles Macedo on May 13, 2010 with attachment of Lawsuit by Island Intellectual Property LLC, Lids Capital LLC, Double Rock Corporation, and Intrasweep LLC against Deutshe Bank Trust Company Americas and Total Bank Solutions, LLC, Defendant Deutsche Bank Trust Company America's responses to Double Rock's Common interrogatory Nos. 1-10 to defendants Reservation of Right, Civil Action No. 09 Civ. 2675 (VM) (AJP).
Email from Olivia Kim to Charles Macedo on May 13, 2010 with attachment of Lawsuit by Island Intellectual Property LLC, Lids Capital LLC, Double Rock Corporation, and Intrasweep LLC against Deutshe Bank Trust Company Americas and Total Bank Solutions, LLC, Defendant Total Bank Solutions, LLC's responses to Double Rock's Common interrogatory Nos. 1-10 to defendants, Reservation of Right, Civil Action No. 09 Civ. 2675 (VM) (AJP).
FDIC, Federal Deposit Insurance Corporation, Letter to Mr. Ronald Rexter, Feb. 28, 2003, From Michelle M. Borzillo, Counsel Supervision and Legislation Section, 2 Sheets.
Federal Register: Oct. 9, 1997 (vol. 62, No. 196), pp. 52809-52868. http://www.fdic.gov/news/news/inactivefinancia1/1997/fil97111b.html.
Financial Services Industry, "WebWatch: Trading Company Bundles CDs for Better Rates," Community Banker, Jun. 2002, online, http://findarticles.com/p/articles/mi_qa5344/is_200206/ai_n21313883/.
Finistar Reg. No. 2,939,558, Registered Apr. 12, 2005.
Finistar, Providing FDIC Insured Funds as a Stable Source of Deposits to Commercial Banking Institutions; received Oct. 2004; 16 Sheets, www.Finistar.com.
Fredrickson, "Rising Rates Rescue Money Fund Firm Reserve Profits by Picking Niches," Crain's New York Business, Crain Communications Inc., vol. 20, Issue 51, 2 Sheets, Dec. 20, 2004.
Frost Bank, Member FDIC, Checking Accounts, 1 Sheet, Sep. 19, 2003, https://www.frostbank.com/cgi-bin/ecomm/frost1/scripts/products/product_detail.jsp?BV_....
Garmhausen, "Matching Small Banks with Large Muni Deposits," American Banker, Online The Financial Services Resource, Oct. 4, 2005, 4 pages, http://www.finstar.com/docs/AmericanBanker.html.
Heavyweight Funding, Bankers News, Mar. 4, 2003, vol. II, Issue No. 5, 2 Sheets.
Hencke, "New Rules for FDIC deposit Insurance", ABA Bank Compliance, vol. 20, No. 7, Jul./Aug. 1999, pp. 31-37.
Hoffman, "Reserve's FDIC-Insured Account Draws Regionals; But some see little need for insurance," Crain Communications Inc., Investment News, 2 Sheets, Jun. 4, 2001.
IDC Deposits, online, http://idcdeposits.com/ , 2009, 1 Sheet.
In the Know, Important Information About Your Account, Smith Barney Citigroup, 2005, 6 Sheets.
Insured Bank Deposit Program Summary Information Statement, Information Statement, and list of Eligible Program Banks Effective Feb. 10, 2005, 11 pages.
Insured Cash Account Program Disclosure Booklet, LPL Financial Services, Linsco/Private Ledger, Member NASD/SIPC, Apr. 2006, 14 pages.
Jong et al., "The Valuation and Hedging of Variable Rate Savings Accounts," University of Amsterdam, Nov. 15, 2001, 23 Sheets.
Keenan, "Tapping Brokerages for Alternative to CDs," American Banker, The Financial Services Daily, 3 Sheets, Feb. 18, 2004.
Lake Forest Bank & Trust Company, Introducing MaxSafe Deposit Accounts with up to $3.75 Million in FDIC Insurance, www.lakeforestbank.com/maxsafe, Nov. 21, 2008, 2 Sheets.
Lavine, "Check Out High-Yield Checking Accounts," Broward Daily Business Review, vol. 39, No. 102, 2 Sheets, Apr. 27, 1998.
Lawsuit by Island Intellectual Property LLC, Lids Capital. LLC, Double Rock Corporation and Intrasweep LLC, against Promontory Interfinancial Network, LLC, Deutsche Bank AG, Deutsche Bank Trust Company Americas and Total Bank Solutions, LLC, Complaint, Apr. 14, 2009, Case No. 09 CV 3750.
Lawsuit by Carlo DeBlasio et al. against Merrill Lynch & Co., Inc. et al., Declaration of Andrew W. Stem, including Exhibits A, B, C, D, E and F, Nov. 12 2007, Case No. 07-c-318 (RJS) (Document 59).

Lawsuit by Carlo DeBlasio et al. against Merrill Lynch & Co., Inc. et al., Declaration of Joel P. Laitman in Support of Plaintiffs' Memorandum of Law in Opposition to Defendants' Motion for Dismissal of the Second Amended Class Action Complaint, Including: "Client Commitment"; "Get Started Today"; "Total Merrill"; "Guideline for Business Conduct"; "Commitment to Clarity"; "Cash Management Account"; "Information Statement Regarding Changes to Interest Rates on Deposits in Merrill Lynch Banks", Feb. 5, 2008.

Lawsuit by Carlo DeBlasio et al. against Merrill Lynch & Co., Inc. et al., Declaration of Joel P. Laitman in Support of Plaintiffs' Memorandum of Law in Opposition to Defendants' Motion for Dismissal of the Second Amended Class Action Complaint, Including: . . . Feb. 5, 2008 (Document 72).

Lawsuit by Carlo DeBlasio et al. against Merrill Lynch & Co., Inc. et al., Declaration of Joel P. Laitman in Support of Plaintiffs' Memorandum of Law in Opposition to Defendants' Motion for Dismissal of the Second Amended Class Action Complaint, Including: . . . Feb. 5, 2008 (Document 73).

Lawsuit by Carlo DeBlasio et al. against Merrill Lynch & Co., Inc. et al., Declaration of Joel P. Laitman in Support of Plaintiffs' Memorandum of Law in Opposition to Defendants' Motion for Dismissal of the Second Amended Class Action Complaint, Including: . . . Feb. 5, 2008 (Document 74).

Lawsuit by Carlo DeBlasio et al. against Merrill Lynch & Co., Inc. et al., Declaration of Joel P. Laitman in Support of Plaintiffs' Memorandum of Law in Opposition to Defendants' Motion for Dismissal of the Second Amended Class Action Complaint, Including: . . . Feb. 5, 2008 (Document 75).

Lawsuit by Carlo DeBlasio et al. against Merrill Lynch & Co., Inc. et al., Declaration of Kenneth I. Schacter, including Exhibits A, B, C, D, F, G, H, I, J, K, L, M, N, O, P, Q and R, Nov. 14 2007, Case No. 07-cv-318 (RJS) (Document 69).

Lawsuit by Carlo DeBlasio et al. against Merrill Lynch & Co., Inc. et al., Declaration of Mathew J. Terry in Support of Motion to Dismiss by Defendants Wachovia Corporation, Wachovia Securities, LLC, Wachovia Bank, N. A., and Wachovia Bank of Delaware, N. A., including Exhibits A, B, C and D, Nov. 14, 2007, Case No. 07-318 (RJS) (Document 67).

Lawsuit by Carlo DeBlasio et al. against Merrill Lynch & Co., Inc. et al., Declaration of Scott D. Musoff in Support of The Merrill Lynch Defendants' Motion to Dismiss The Second Amended Class Action Complaint, ECF Case, Nov. 12, 2007, Case No. 07-cv-318 (RJS) (Document 64).

Lawsuit by Carlo DeBlasio et al. against Merrill Lynch & Co., Inc. et al., Reply Declaration of Kenneth Schacter including Exhibits S and T, Mar. 6, 2008, Case No. 07-cv-318 (RJS) (Document 81).

Lawsuit by Carlo DeBlasio et al. against Merrill Lynch & Co., Inc. et al., Second Amended Class Action Complaint, Jury Trial Demanded, Introduction and Summary of Allegations, Jun. 11, 2007, Case No. 07-cv-318-VM.

Lawsuit by Carlo DeBlasio et al. against Merrill Lynch & Co., Inc. et al., Supplemental Declaration of Matthew J. Terry in Support of Motion to Dismiss by Defendants Wachovia Corp., Wachova Securities, LLC, Wachovia Bank N. A., and Wachovia Bank of Delaware, N. A., including Exhibits A and B, Mar. 6, 2008, Case No. 07-cv-318 (RJS) (Document 79).

Lawsuit by Carlo DeBlasio, et al. against Merrill Lynch & Co., Inc., et al., Opinion and Order Regarding Motions, Jul. 27, 2009, Case No. 07 CIV 318(RJS).

Lawsuit by Island Intellectual Property LLC and Intrasweep LLC against Deutsche Bank Trust Company Americas and Total Bank Solutions, LLC, Deutsche Bank Trust Company Americas' answer to plaintiffs' Feb. 23, 2010 complaint and counterclaims, May 4, 2010, Civil Action No. 09 Civ. 2675 (VM) (AJP)(Document 111).

Lawsuit by Island Intellectual Property LLC and Intrasweep LLC against Deutsche Bank Trust Company Americas and Total Bank Solutions, LLC, Total Bank Solutions, LLC's answer to plaintiffs' Feb. 23, 2010 complaint and counterclaims, May 4, 2010, Civil Action No. 09 Civ. 2675 (VM) (AJP)(Document 112).

Lawsuit by Island Intellectual Property LLC and Intrasweep LLC against Institutional Deposits Corp. The Island Plaintiffs' Complaint against Defendant Institutional Deposits Corp., Nov. 4, 2009, Civil Action No. 1 09-CV-3079.

Lawsuit by Island Intellectual Property LLC and Intrasweep LLC against Institutional Deposits Corp., Complaint for Patent Infringement, Jury Trial Demanded, Nov. 4, 2009, Civil Action No. 09 CV 3079.

Lawsuit by Island Intellectual Property LLC and Intrasweep LLC against Institutional Deposits Corp., Consent Order, Apr. 21, 2010, Case No. 09-CV-3079 (Document 44).

Lawsuit by Island Intellectual Property LLC and Intrasweep LLC, Answer of Defendant Institutional Deposits Corp. to Complaint for Patent Infringement, Dec. 10, 2009, Case No. 09 CV 03079 (JEC), (Document 16).

Lawsuit by Island Intellectual Property LLC and Lids Capital LLC against Deutsche Bank Trust Company Americas and Total Bank Solutions, LLC, Deutsche Bank Trust Company answer to plaintiffs' Mar. 16, 2010 complaint and counterclaims, May 4, 2010, Civil Action No. 09 Civ. 2675 (VM) (AJP) (Document 113).

Lawsuit by Island Intellectual Property LLC and Lids Capital LLC against Deutsche Bank Trust Company Americas and Total Bank Solutions, LLC, Total Bank Solutions, LLC's answer to plaintiffs' Mar. 16, 2010 complaint and counterclaims, May 4, 2010, Civil Action No. 09 Civ. 2675 (VM)(Document 114).

Lawsuit by Island Intellectual Property LLC et al., against Deutsche Bank Trust Company Americas, et al.; Expert Report of Richard T. Powers Concerning Invalidity of U.S. Pat. Nos. 7,509,286; 7,519,551; 7,536,350; 7,668,771; 7,668,772, 7,672,886; and 7,680,734; and Exhibits A-R; Civil Action No. 09 Civ. 2675(VM)(AJP), Oct. 28, 2010; 1.119 pages.

Lawsuit by Island Intellectual Property LLC, et al. against Deutsche Bank Trust Company Americas, et al,. Defendant Deutsch Bank Trust Company Americas' Responses to Double Rock's Interrogatories Nos. 1-10; May 2010; Civil Action No. 09 Civ. 2675 (VM)(AJP).

Lawsuit by Island Intellectual Property LLC, et al. against Deutsche Bank Trust Company Americas, et al.; Expert Report of Ivan Zatkovich Regarding Validity and Enforceability of the Asserted Claims of the Patents-in-Suit; Civil Action No. 09 Civ. 2675 (VM)(AJP); Nov. 23, 2010; 192 pages. The redacted items were designated as confidential in a Protective Order in this case.

Lawsuit by Island Intellectual Property LLC, et al. against Deutsche Bank Trust Company Americas, et al.; Expert Report of the Honorable Gerald J. Mossinghoff and Exhibits A-E; Civil Action No. 09 Civ. 2675 (VM)(AJP); Nov. 23, 2010; 107 pages.

Lawsuit by Island Intellectual Property LLC, et al. against Deutsche Bank Trust Company Americas; Defendant Total Bank Solutions, LLC's Responses to Double Rock's Common Interrogatory Nos. 1-10 to Defendants; May 2010; Civil Action No. 09 Civ. 2675 (VM)(AJP).

Lawsuit by Island Intellectual Property LLC, et al., against Deutsche Bank Trust Company Americas, et al.; Defendant Deutsche Bank Trust Company Americas' Fifth Supplemental Responses to Island IP's First Set of Common Interrogatories to All Defendants (No. 7); Case No. 09 Civ. 2675 (VM)(AJP); Sep. 16, 2010; 9 pages.

Lawsuit by Island Intellectual Property LLC, et al., against Deutsche Bank Trust Company Americas, et al.; Defendant Total Bank Solutions, LLC's Fifth Supplemental Responses to Island IP's First Set of Common Interrogatories to All Defendants (No. 7); Case No. 09 Civ. 2675 (VM)(AJP); Sep. 16, 2010; 9 pages.

Lawsuit by Island Intellectual Property LLC, Intrasweep LLC and Double Rock Corporation against Deutsche Bank AG, Deutsche Bank Trust Company Americas and Total Bank Solutions, LLC, Complaint for Patent Infringement, May 19, 2009, Case No. 09 CIV 4673.

Lawsuit by Island Intellectual Property LLC, Lids Capital LLC, and Double Rock Corporation against Deutsche Bank AG, Deutsche Bank Trust Company Americas and Total Bank Solutions, LLC, including Cover Sheet, Summons, Complaint and Rule 7.1 Statement, Mar. 24, 2009, Case No. 09 CV 2677.

Lawsuit by Island Intellectual Property LLC, Lids Capital LLC, and Double Rock Corporation against Promontory Interfinancial Network, LLC and MBSC Securities Corporation, including Cover Sheet, Summons, Complaint and Rule 7.1 Statement, Mar. 24, 2009, Case No. 09 CV 2675.

Lawsuit by Island Intellectual Property LLC, Lids Capital LLC, Double Rock Corporation and Intrasweep LLC against Deutsche Bank AG, Deutsche Bank Trust Company Americas and Total Bank Solutions, LLC, Stipulated Dismissal of Deutsche Bank AG Without Prejudice, Nov. 19, 2009, Civil Action No. 09 CIV 2675 (VM) (AJP) (Document 79).
Lawsuit by Island Intellectual Property LLC, Lids Capital LLC, Double Rock Corporation and Intrasweep LLC against Deutsche Bank Trust Company Americas and Total Bank Solutions, LLC, Deutsche Bank Trust Company Americas' First Amended Answer to Consolidated First Amended Complaint and Counterclaims, Dec. 4, 2009, Civil Action No. 09 CIV 2675 (VM) (AJP), (Document 86).
Lawsuit by Island Intellectual Property LLC, Lids Capital LLC, Double Rock Corporation and Intrasweep LLC against Deutsche Bank Trust Company Americas and Total Bank Solutions, LLC, Total Bank Solutions, LLC's First Amended Answer to Consolidated First Amended Complaint and Counterclaims Dec. 4, 2009, Civil Action No. 09 CIV 2675 (VM) (AJP) (Document 87).
Lawsuit by Island Intellectual Property LLC, Lids Capital LLC, Double Rock Corporation and Intrasweep LLC against Promontory Interfinancial Network LLC, MBSC Securities Corporation, Deutsche Bank AG, Deutsche Bank Trust Company Americas and Total Bank Solutions, LLC, Answer and Counter Claims, Answer of Defendant MBSC Securities Corporation, Jun. 25, 2009, Case No. 09 CV 2675.
Lawsuit by Island Intellectual Property LLC, Lids Capital LLC, Double Rock Corporation and Intrasweep LLC against Promontory Interfinancial Network LLC, MBSC Securities Corporation, Deutsche Bank AG, Deutsche Bank Trust Company Americas and Total Bank Solutions, LLC, Answer and Counter Claims, Answer of Defendant Promontory Interfinancial Network, LLC, Jun. 25, 2009, Case No. 09 CV 2675.
Lawsuit by Island Intellectual Property LLC, Lids Capital LLC, Double Rock Corporation and Intrasweep LLC against Promontory Interfinancial Network LLC, MBSC Securities Corporation, Deutsche Bank AG, Deutsche Bank Trust Company Americas and Total Bank Solutions, LLC, Consolidated First Amended Complaint, Jury Trial Demanded, Jun. 11 2009, Civil Action No. 09 CIV 2675 (VM).
Lawsuit by Island Intellectual Property LLC, Lids Capital LLC, Double Rock Corporation and Intrasweep LLC against Promontory Interfinancial Network LLC, MBSC Securities Corporation, Deutsche Bank AG, Deutsche Bank Trust Company Americas and Total Bank Solutions, LLC, Jury Trial Demanded, Deutsche Bank AG's Answer to Consolidated First Amended Complaint, Jun. 25, 2009, Civil Action No. 09 CIV 2675.
Lawsuit by Island Intellectual Property LLC, Lids Capital LLC, Double Rock Corporation and Intrasweep LLC against Promontory Interfinancial Network LLC, MBSC Securities Corporation, Deutsche Bank AG, Deutsche Bank Trust Company Americas and Total Bank Solutions, LLC, Jury Trial Demanded, Deutsche Bank Trust Company Americas' Answer to Consolidated First Amended Complaint and Counter Claims, Jun. 25, 2009, Civil Action No. 09 CIV 2675.
Lawsuit by Island Intellectual Property LLC, Lids Capital LLC, Double Rock Corporation and Intrasweep LLC against Promontory Interfinancial Network LLC, MBSC Securities Corporation, Deutsche Bank AG, Deutsche Bank Trust Company Americas and Total Bank Solutions, LLC, Jury Trial Demanded, Total Bank Solutions, LLC's Answer to Consolidated First Amended Complaint and Counterclaims, Jun. 25, 2009, Civil Action No. 09 CIV 2675.
Lawsuit by Island Intellectual Property LLC, Lids Capital LLC, Double Rock Corporation and Intrasweep LLC against Promontory Interfinancial Network LLC, MBSC Securities Corporation, Deutsche Bank AG, Deutsche Bank Trust Company Americas and Total Bank Solutions, LLC, Stipulated Dismissal of Counts I-III of Defendant Promontory Interfinancial Network, LLC's, Counterclaim with Prejudice, Oct. 19, 2009, (Document 68).
Lawsuit by Island Intellectual Property LLC, Lids Capital LLC, Double Rock Corporation and Intrasweep LLC against Promontory Interfinancial Network LLC, MBSC Securities Corporation, Deutsche Bank AG, Deutsche Bank Trust Company Americas and Total Bank Solutions, LLC, Stipulation and Order, Oct. 29, 2009, Case No. 09 CV 2675 (VM) (AJP) (Document 73).
Lawsuit by Island Intellectual Property LLC, Lids Capital LLC, Double Rock Corporation and Intrasweep LLC against Promontory Interfinancial Network LLC, MBSC Securities Corporation, Deutsche Bank AG, Deutsche Bank Trust Company Americas and Total Bank Solutions, LLC, The Island Plaintiffs' Reply to Defendant Deutsche Bank Trust Company Americas' Counterclaims, Jul. 9, 2009, Civil Action No. 09 CIV 2675 (VM).
Lawsuit by Island Intellectual Property LLC, Lids Capital LLC, Double Rock Corporation and Intrasweep LLC against Promontory Interfinancial Network LLC, MBSC Securities Corporation, Deutsche Bank AG, Deutsche Bank Trust Company Americas and Total Bank Solutions, LLC, The Island Plaintiffs' Reply to Defendant MBSC Securities Corporation's Counterclaims, Jul. 9, 2009, Civil Action No. 09 CIV 2675 (VM).
Lawsuit by Island Intellectual Property LLC, Lids Capital LLC, Double Rock Corporation and Intrasweep LLC against Promontory Inter-financial Network LLC, MBSC Securities Corporation, Deutsche Bank AG, Deutsche Bank Trust Company Americas and Total Bank Solutions, LLC, The Island Plaintiffs' Reply to Defendant Promontory Interfinancial Network LLC's Counterclaims, Jul. 9, 2009, Civil Action No. 09 CIV 2675 (VM).
Lawsuit by Island Intellectual Property LLC, Lids Capital LLC, Double Rock Corporation and Intrasweep LLC against Promontory Interfinancial Network LLC, MBSC Securities Corporation, Deutsche Bank AG, Deutsche Bank Trust Company Americas and Total Bank Solutions, LLC, The Island Plaintiffs' Reply to Defendant Total Bank Solutions, LLC's Counterclaims, Jul. 9, 2009, Civil Action No. 09 CIV 2675 (VM).
Lawsuit by Promontory Interfinancial Network, LLC against Double Rock Corporation p/k/a Reserve Management Corporation and Lids Capital LLC, Amended Complaint, Mar. 27, 2009, Civil Action No. 1:09 CV 316.
Lawsuit by Promontory Interfinancial Network, LLC against Double Rock Corporation p/k/a Reserve Management Corporation, Complaint, Mar. 24, 2009, Civil Action No. 1:09 CV 316.
Lawsuit by Promontory Interfinancial Network, LLC against Double Rock Corporation p/k/a Reserve Management Corporation, Island Intellectual Property LLC, Lids Capital LLC and Intrasweep LLC, Amended Complaint, Apr. 15, 2009, Civil Action No. 3:09 CV 217.
Lawsuit by Promontory Interfinancial Network, LLC against Double Rock Corporation p/k/a Reserve Management Corporation, Island Intellectual Property LLC, Lids Capital LLC and Intrasweep LLC, Complaint, May 19, 2009, Civil Action No. 3:09 CV 322.
Lawsuit by Promontory Interfinancial Network, LLC against Double Rock Corporation, p/k/a Reserve Management Corporation, Island Intellectual Property LLC and Lids Capital LLC, including Cover Sheet, Summons and Complaint, Apr. 14, 2009, Civil Action No. 3:09 CV 217.
Letter from Gilbert T. Schwartz, Skadden, Arts, Slate, Meagher & Flom to Oliver Ireland, Associate General Counsel, Board of Governors of the Federal Reserve System; Dec. 18, 1987; 19 sheets.
Letter From Jamey Basham, Attorney, LEXSEE 1990 FDIC Interp. Ltr., Lexis 1, Federal Deposit Insurance Corporation, FDIC-90-02, Jan. 3, 1990, 2 Sheets.
Letter From Joseph A. DiNuzzo, Counsel, Oct. 20, 1999, FDIC, Federal Deposit Insurance Corporation, 1 Sheet.
Letter From Merle Y. Waldman, LEXSEE 1985 Sec No- Act., Lexis 1593, Securities Exchange Act of 1934—Section 15(a), Jan. 8, 1985, 11 Sheets.
Letter from Michael Bradfield, General Counsel, Board of Governors of the Federal Reserve System, Nov. 16, 1984, 4 Sheets.
Letter From Oliver I. Ireland, Associate General Counsel, Board of Governors of the Federal Reserve System, Jun. 22, 1988, 5 Sheets.
Letter From Roger A. Hood, Assistant General Counsel, Jul. 16, 1986, FDIC, Federal Deposit Insurance Corporation, Legal Division, 1 Sheet.
Letter from Roger M. Zaitzeff, Seward & Kissel to Gilbert T. Schwartz, Associate General Counsel, Board of Governors of the Federal Reserve System; May 10, 1983, 5 sheets.
Letter from Stephanie Martin, Assoc. General Counsel, Board of Governors of the Federal Reserve System, Apr. 22, 2004, 8 Sheets.
Letter From William W. Wiles, Secretary of the Board, Board of Governors of the Federal Reserve System, Jun. 22, 1983, 6 Sheets.

Letter to Mr. James E. Creekman, Group Vice President, From Oliver Ireland, Associate General Counsel, Aug. 1, 1995, 4 Sheets.
Letter to Mr. Jonathan L. Levin, Esq., From Oliver Ireland, Associate General Counsel, Oct. 18, 1996, 2 Sheets.
Letter to Mr. L.P. Fleming, Jr., Esq., From Oliver Ireland, Associate General Counsel, Feb. 7, 1995, 3 Sheets.
Letter to Ms. Brenda L. Skidmore, Senior Vice President, From Oliver Ireland, Associate General Counsel, Aug. 30, 1995, 4 Sheets.
Letter to William R. Burdette, CEO, Apr. 6, 2009, FDIC, Federal Deposit Insurance Corporation, 2 pages.
Letter to William R. Burdette, CEO, Nov. 15, 2007, FDIC, Federal Deposit Insurance Corporation, 5 Sheets.
Liberman et al., Market Watch, "How Important are Banks?" FDIC Insurance on Deposits Just One Continuing Advantage, Oct. 17, 2006, 3 Sheets.
McReynolds et al. "Unusual Products for Unusual Times," Securities Data Publishing on Wall Street, 6 Sheets, May 1, 2001.
McReynolds, "The Power of CASH: Ho-hum cash can be great product (and lead to more business) in troubled times," Securities Data Publishing on Wall Street, 3 Sheets, Jun. 1, 2002.
Merriam-Webster Online Dictionary, 10th Edition, Definition of "Associated", Jan. 30, 2009, 2 Sheets.
Merrill Lynch & You, "Financial Services the Way You Want, When You Want Them," Jan. 2000 4 Sheets.
Merrill Lynch, Pierce, Fenner & Smith Incorporated, "Information Statement," 2000 12 Sheets.
Merrill Moves CMA Cash to Bank, Street Talk, On Wall Street, Nov. 2000, p. 26.
Money Fund Report, Bank of New York Adds Insured Sweeps Option, Friday, May 3, 2002, The Reserve Funds, 1 Sheet.
Money Fund Report, IBC Financial Data, Inc., Nov. 6, 1998, 1 Sheet.
Money Fund Report, Insured Cash Sweep Options Proliferate, Friday, Jun. 1, 2001, The Reserve Funds, 1 Sheet.
Money Market Insight's, Goldman Sachs May Create Bank to Offer Insured Cash Sweeps, Aug. 2002 Issue, 3 Sheets.
Munk, Merrill Makes New Push Into Traditional Banking, Dow Jones Newswires, Jan. 3, 2003, 1 Sheet.
Mutual Funds Magazine, Bargain Basement Funds, Oct. 1997, 1 Sheet.
Mutual Funds Magazine, Bargain Basement Funds, Oct. 1997, 2 Sheets.
News Article: "Regulators Support Demand Deposit Bill", Regulatory Compliance Watch—Mar. 9, 1998; 2 Sheets, vol. 9, No. 10.
Northbrook Bank & Trust Company, Introducing our MaxSafe CD with up to $700,000 of FDIC Insurance, Nov. 12, 2002, 4 Sheets.
Northbrook Bank & Trust Company, Seven Times the Security of a Normal CD, Introducing our MaxSafe CD, Nov. 12, 2002, 4 Sheets.
O'Brian, "Money-Market Funds Suit Many Investors, But Proud Creator Frets About Extra Risk," Re-Printed From the Wall Street Journal, Monday, Nov. 6, 2000, Dow Jones & Company, Inc., Nov. 25, 2002, 2 Sheets.
On Wall Street, Helping Brokers Build a More Successful Business, The Power of CASH, Jun. 2002, 2 Sheets.
On Wall Street, Helping Brokers Build a More Successful Business, Unusual Products for Unusual Times, May 2001, 2 Sheets.
Online, www.usabancshares.com, Brave New World, 1999, 2 Sheets.
Potter, "As Sweep Accounts Continue to Grow, So do Community Bank Options," America's Community Banker, vol. 9, Issue 8, Bell & Howell Information and Learning Company, 3 Sheets, Aug. 1, 2000.
Promontory Interfinancial Network, Promontory Inter-financial Network Announces New Deposit Placement Service, Jan. 21, 2003, 3 Sheets.
Promontory Interfinancial Network: http://www.promnetwork.com/index.html, 2003.
Promontory Interfinancial Network: Frequently Asked Questions (FAQs), Feb. 5, 2003, 5 pages.
Promontory to Roll Out Deposit Service Insuring Liquid Funds, American Banker, by Joe Adler, Feb. 22, 2010, 2 sheets.
Reserve Insured Deposits, United States Patent and Trademark Office, Reg. No. 2,694,910, Registered Mar. 11, 2003, 1 Sheet.
Ring, National /Global, "Amex Spans the Globe in Retail Bank Buildup," Nov. 27, 2000, 1 Sheet.
Share, "New Service Skirts FDIC's $100K Limit," Dialog Web Command Mode, 2 Sheets, Jun. 13, 2003, http://www.dialogweb.com/cgi/dwclient.
Smith, "IBAA Won't Push Interest-Bearing Checking for Business; Says Too Few Members Want It," The American Banker, 2 Sheets, Apr. 18, 1996.
Stafford, "New Bank Program Allows $1 Million in Insured Deposits," Dialog Web Command Mode, 3 Sheets, Aug. 24, 2003, http://www.dialogweb.com/cgi/dwclient.
Sweeping Your Firm Into FDIC Insured Deposits, Harken Financial Services, Aug. 4, 2006, 8 Sheets.
Testimony of Bruce R. Bent, CEO of the Reserve Funds, Before the Financial Institutions and Consumer Credit Subcommittee House Financial Services Committee U.S. House of Representative, Hearing on H.R. 758 and H.R. 859, Mar. 5, 2003, 4 Sheets.
The Depository Trust Company, B#: 3875, Oct. 1, 2002, Settlement\Underwritting, From: Denise Russo, Director, Underwritting, 6 Sheets.
The Insured Savings Account, Issuer Guide to Offering MMDAs Through Merrill Lynch, Merrill Lynch Money Markets, Inc., "Operational Guide to the Merrill Lynch MMDA Program 1986", Sep. 1986 3 Sheets.
The Pershing Press, Dreyfus Insured Deposit Program, Issue 2, Aug. 2008, http://www.pershing.com/news/pershing_press/news_466244.html, 1 Sheets.
The Reserve Funds Press Release, "The Reserve Funds and Frontier Bank Partner to Offer Revolutionary Banking Product," 5 Sheets, Aug. 1, 2000.
The Reserve Funds, Objectives, Observations & Strategies for American Enterprises Inv., Oct. 18, 2000, 11 Sheets.
The Reserve Funds, NJBA Endorses New Sweep Account Offers New Jersey Banks Deposit Growth, Retention, for Immediate Release, May 23, 2001, 1 Sheet.
The Reserve Funds, Reserve Management and Irwin Union Bank and Trust Company Partner to Offer the Reserve Return Sweep, for Immediate Release, Mar. 8, 2001, 2 Sheets.
The Reserve, "Company History," 3 Sheets, Oct. 4, 2006, http://www.ther.com/aboutus/history.shtml.
The Reserve, "Reserve Insured Deposits Program," 2 Sheets, Oct. 4, 2006, http://www.ther.com/bank/bank_insdep.shtml.
The Reserve, "Reserve Insured Deposits," 2 Sheets, Oct. 4, 2006, http://www.ther.com/ps/ps_fif.shtml.
The Reserve, "What Sets Us Apart," 2 Sheets, Oct. 4, 2006, http://www.ther.com/bank/bank_wsua.shtml.
Total Bank Solutions, Bank Sweep FAQs http://www.totalbanksolutions.com/sweepbnkfaqs.htm, Sep. 23, 2005, 2 pages.
Total Bank Solutions, Bank Sweep FAQs, http://www.totalbanksolutions.com/sweepbnkfaqs.htm, Nov. 2, 2005, 3 pages.
Total Bank Solutions, Bank Sweep Products, Deutsche Bank, http://www.totalbanksolutions.com/banksweep.htm, Sep. 23, 2005, 1 page.
Total Bank Solutions, Bank Sweep Products, http://www.totalbanksolutions.com/banksweep.htm, Appendix 3, Oct. 18, 2005, 2 pages.
Total Bank Solutions, Bank Sweep Products, http://www.totalbanksolutions.com/banksweep.htm, Nov. 2, 2005, 2 pages.
Total Bank Solutions, Brokerage Sweep FAQs, http://www.totalbanksolutions.com/brokerfaqs.htm, Nov. 2, 2005, 3 pages.
Total Bank Solutions, Brokerage Sweep, http://www.totalbanksolutions.com/brokersweep.htm, Nov. 2, 2005, 1 page.
Total Bank Solutions, Deposit Bank FAQs, http://www.totalbanksolutions.com/depositbnkfaqs.htm, Nov. 2, 2005, 2 pages.
Total Bank Solutions, Deposits, Deutsche Bank, http://www.totalbanksolutions.com/deposits.htm, Sep. 23, 2005, 1 page.
Total Bank Solutions, Deposits,. http://www.totalbanksolutions.com/deposits.htm, Nov. 2, 2005, 2 pages.
Total Bank Solutions, Deutsche Bank Insured Deposit Program, DB Insured Deposit Program Features, http://www.totalbanksolutions.com/features.htm, Sep. 23, 2005, 2 pages.
Total Bank Solutions, Deutsche Bank Insured Deposit Program, http://www.totalbanksolutions.com/, Sep. 23, 2005, 1 page.
Total Bank Solutions, http://www.totalbanksolutions.com/, Mar. 16, 2007, 8 pages.

Total Bank Solutions, http://www.totalbanksolutions.com/overview.htm, Nov. 2, 2005, 1 page.
Total Bank Solutions, Insured Deposit Program Features, http://www.totalbanksolutions.com/features.htm, Nov. 2, 2005, 2 pages.
Total Bank Solutions, Insured Deposit Program, http://www.totalbanksolutions.com/Insureddeposits.htm, Nov. 2, 2005, 2 pages.
Total Bank Solutions, Partners & Affiliates, http://www.totalbanksolutions.com/partners.htm, Nov. 2, 2005, 3 pages.
Total Bank Solutions, Partners & Affiliates, http://www.totalbanksolutions.com/partners.htm, Oct. 25, 2005, 3 pages.
Total Bank Solutions, Strategtic Partners, Nov. 2, 2005, 1 page.
Total Bank Solutions, TBS Deposit Account, About Our Broker Products, http://www.totalbanksolutions.com/brokerproducts.htm, Sep. 7, 2005, 2 pages.
Total Bank Solutions, TBS Management Team, http://www.totalbanksolutions.com/management.htm, Appendix 1, Oct. 18, 2005, 1 page.
Total Bank Solutions, TBS Management Team, http://www.totalbanksolutions.com/management.htm, Nov. 2, 2005, 2 pages.
Total Bank Solutions, TBS Management Team, http://www.totalbanksolutions.com/management.htm, Oct. 25, 2005, 2 pages.
TotalBank Solutions, TBS Bank Deposit Account, Oct. 2004, 7 pgs.
TotalBank Solutions, web.archive.org/web/20050126044216/http://totalbanksolutions.com, Jan. 26, 2005, 2 pgs.
USA Mutual Partners Insured Cash Shelter Account Terms and Conditions, 11 pages, 2009 USA Mutuals Partners, Inc.
Wachovia Securities, Important Information for Clients Concerning Changes in Automatic "Sweep" Arrangements, Oct. 1, 2003, 6 sheets.
Wilson, "How Cash Management Services Can Help Your Bank Cultivate New Relationships with Commercial Customers," America's Community Banker, vol. 10, Issue 5, Bell & Howell Information and Learning Company, 8 Sheets, May 1, 2001.
Memorandum from Ken Johnson re: Insured Deposit Products, Aug. 18, 1992, 3 pgs.
Memorandum from John E. Oncken re: Insured Savings Update, Jun. 15, 1990, 7 pgs.
Memorandum from John E. Oncken re: Brokered Deposit Issue vs. Insured Savings, Mar. 22, 1990, 8 pgs.
Memorandum from Ed Piner re: Insured Savings Product Update, Feb. 1, 1990, 4 pgs.
Product Bulletin from Bill McCain, Subject: Insured Savings Product Announcement, May 8, 1989, 7 pgs.
Insured Savings Project Team Meeting, Feb. 2, 1989, 16 pgs.
Letter to Tim C. Lear, Sep. 20, 1988, 1 pg., with Memorandum from Ed Piner, re: Insured Savings Product, Nov. 9, 1988, and Letter from Tara L. Cyr, Dec. 9, 1988, 1 pg.
Automatic Insured Deposit Method, Patent Application Information, Jul. 11, 1988, 17 pgs.
Insured Savings, Overview & Marketing Plan, Dec. 6, 1988, 23 pgs.
Memorandum from Dick Zinser, re: A First City-Austin deposit program to hold existing customers' deposits, Mar. 17, 1988, 7 pgs.
Letter to Malcolm L. Duke, Dec. 27, 1989 with Insured Savings Correspondent Agreement, Exhibits A-D, and Letter to Malcolm L. Drake, Nov. 21, 1989, 37 pgs.
Memorandum from Ken Johnson, re: Attached Insured Savings Letters, Jul. 5, 1990, 1 pg.
Letter to Jerry Crutsinger, Jul. 3, 1990, 1 pg.
Letter to Bill Goertz, Jul. 3, 1990, 1 pg.
Letter to Susan Goodwin, Jul. 3, 1990, 1 pg.
Insured Savings Rate Change Notice, Jul. 17, 1990, 1 pg.
Addendum to Insured Savings Agency Agreement, Jul. 17, 1990, 1 pg.
Letter to Paula Martin, Jul. 3, 1990, 1 pg.
Letter to John Lovell, Jul. 3, 1990, 1 pg.
Email from John Oncken re: Depository Levels at Insured Savings Depositories, Nov. 2, 1989, 1 pg.
Memorandum from Ed Piner, Subject: Discontinuation of Automatic Balance Monitoring in conjunction with Insured Savings Accounts, May 21, 1991, 1 pg.
Blank form letter from Edward N. Piner, May 24, 1991, 1 pg.
Letter from First City National Bank of Austin, Sep. 20, 1982, 5 pgs.

First City, Texas—Austin, Special Products, Feb. 20, 1992, with Schedule A & Schedule B, 6 pgs.
Alliance Insured Account, Information Statement, Sep. 1999, 6 sheets.
Lawsuit by Carlo DeBlasio et al. and Merrill Lynch & Co., Inc. et al., Opinion and Order, Jul. 27, 2009, Civil Action No. 07 Civ. 318, 47 pgs.
Lawsuit by Carlo DeBlasio et al. and Merrill Lynch & Co., Inc. et al., Second Amended Class Action Complaint, Jury Trial Demanded, Jun. 11, 2007, Civil Action No. 07 cv 318, 137 pgs.
Investment Company Act of 1940—Section 3(a)(1), 2(a)(36); Securities Act of 1933—Section 2(1), Nov. 29, 1985, Kempter Financial Services, Inc., 9 pgs.
First National Bank in Brookings, Certificates of Deposit, Fuly 17, 2009, 5 sheets.
Summary of Commentary on Current Economic Conditions by Federal Reserve Districts, Jan. 1985, 44 pgs.
Board of Governors of the Federal Reserve System, Blank Form Letter, Apr. 22, 2004, 8 pgs.
FDIC Law, Regulations, Related Acts, 4000—Advisory Opinions, FDIC-93-35, Jun. 28, 1993, 2 sheets.
§204.134, 12 CFR Ch. 11 (Jan. 1, 2009 Edition), 2 sheets.
Money Fund $$ Moving to Bank Deposits, 6 FRC Monitor, Dec. 2003, 2 sheets.
Crane, P. & Krasner, Mike, An iMoney Net Special Report™, "Brokerage Cash Sweep Options: The Shift from Money Funds to FDIC-Insured Bank Deposit Accounts", Nov. 2004, 64 pgs.
The May 1998 Senior Financial Officer Survey, Board of Govenors of the Federal Reserve System, with Appendix A, 48 pgs.
Interest Rate Review© A Publication of Meyer Weekly Interest Rate Survey, A Look At Tiers, vol. II, No. 4, Apr. 1987, 6 pgs.
Interest Rate Review© Publication of Meyer Weekly Interest Rate Survey, A Study of Historical Rates and Yields, vol. II, No. 6, Jun. 1987, 8 pgs.
Blank form letter to Oliver Ireland, Oct. 7, 1994, 1 pg.
Letter to L.P. Fleming, Jr. Esq., Feb. 7, 1995, 3 pgs.
Letter to James E. Creekman, Aug. 1, 1995, 4 pgs.
Letter to Brenda L. Skidmore, Aug. 30, 1995, 4 pgs.
Merrill Lynch & Co., Inc. Form 10-K405 (Annual Report (Regulation S-K, item 405)), Filed Mar. 14, 2002 for the Period Ending Dec. 28, 2001, with Schedules, Exhibits, and 2001 Annual Report, 248 pgs.
Merrill Lynch, Pierce, Fenner & Smith Incorporated, "Information Statement," 2000, 12 Sheets.
Merrill Lynch, Information Statement Regarding Changes to Interest Rates on Deposits in the Merrill Lynch Banks, Document 64-14, Nov. 12, 2007, Case 1:07-cv-00318, 2 sheets.
Street Talk, "Merrill Moves CMA Cash to Bank", On Wall Street, Nov. 2000, 1 sheet.
Insured Bank Deposit Account, Information Statement, Jul. 1, 2000, 2 sheets.
FDIC Law, Regulations, Related Acts, 4000—Advisory Opinions, FDIC-87-25, Oct. 22, 1987, 1 sheet.
FDIC Law, Regulations, Related Acts, 4000—Advisory Opinions, FDIC-86-21, Jul. 23, 1986, 2 sheets.
Insured Savings Account Fact Sheet, The Merrill Lynch Cash Management Account Financial Service, 1987, 11 pgs.
CMA Insured Savings Account Fact Sheet, 1994, 9 pgs.
A Guide to Your CMA Account, 1995, 19 pgs.
Insured Savings Account Fact Sheet, The Merrill Lynch Cash Management Account Financial Service, 1985, 4 pgs.
CMA Insured Savings Account Fact Sheet, 1997, 13 pgs.
Blackwell, Rob, Salomon's Sweep Plan Raises FDIC Fund Alarm, American Banker, Dec. 6, 2000, 2 pgs.
Insured Deposit Account (IDA), May 21, 1996, 11 pgs.
An Introduction to the Smith Barney Insured Deposit Account, 1995, 8 pgs.
Memorandum from Ted Hamilton re: Insured Deposit Account, Oct. 10, 1995, 13 pgs.
The Insured Deposit Account: "Money in the Bank", 1997, 2 sheets.
Merrill Joins Money Market Account, CMA; Broker Begins Testing With 12 Institutions, Lexis Nexis, Sep. 23, 1983, 4 pgs.

Form 8-K Merill Lynch & Co Inc —MER, Filed: Mar. 7, 2002, Report of unscheduled material events or corporate changes, 41 pgs.
Lawsuit by Island Intellectual Property LLC and Intrasweep LLC against Deutsche Bank Trust Company Americas and Total Bank Solutions, Complaint for Patent Infringement, Jury Trial Demanded, Feb. 23, 2010, Case No. 10 CV 1518, (Document 1).
Lawsuit by Island Intellectual Property LLC and Lids Capital LLC against Deutsche Bank Trust Company Americas and Total Bank Solutions, Complaint for Patent Infringement, Jury Trial Demanded, Mar. 16, 2010, Case No. 10 CV 2268.
Quest Cash Management Services Memorandum to Tom Duggan, Re: Quest Insure Account, Nov. 16, 1993.
Federally Insured Deposit Program for Banks, AmVest capital, Jan. 15, 2010, 2 sheets.
Flow Chart, AmVest Capital, Dec. 9, 2009, 1 sheet.
Participation Criteria for the FIDP, Federally Insured Deposit Program Participation Criteria, AmVest Capital, Jan. 15, 2010, 4 pgs.
Federally Insured Deposits/FAQ, Frequently Asked Questions on the Federally Insured Deposit Program, AmVest Capital, Jan. 15, 2010, 2 sheets.
Money Market Rates, Jan. 18, 2010, 2 sheets.
Money Market Rates, Jan. 6, 2010, 3 pgs.
Money Market Rates, Nov. 12, 2009, 3 pgs.
Scott & Stringfellow starts correspondent clearing business, News Release BB&T, Nov. 13, 2007, 2 sheets.
Curian Capital Introduces Custom Wealth Platform, Market Watch, Aug. 18, 2009, 3 pgs.
Ellie Behling, Curian Capital Introduces Custom Wealth Platform, Nov. 10, 2009, 3 sheets.
Curian Capital Introduces Custom Wealth Platform, Reuters, Aug. 18, 2009, 3 pgs.
Curian Capital Introduces Custom Wealth Platform, WSJ.com, Aug. 18, 2009, 3 pgs.
Curian Capital, LLC: Private Company Information, BusinessWeek, Nov. 10, 2009, 3 pgs.
Curian Capital Introduces Custom Wealth Platform, Yahoo! Finance, Aug. 18, 2009, 3 pgs.
Bank Insured Deposit Program, D.A. Davidson & Co., Jan. 15, 2010, 2 sheets.
Bank Insured Deposit Program, D.A. Davidson & Co., Nov. 2, 2009, 2 sheets.
D.A. Davison & Co., Bank Insured DepoSit Program, Disclosure Statement, Jan. 15, 2010, 4 sheets.
First Southwest Company, First Southwest Company Bank Insured Deposit Program, Sep. 28, 2009, 11 pgs.
Manage Cash in an Online Stock Portfolio: Folio Investing, Jan. 15, 2010, 2 sheets.
Folio Investing: Brokerage Features >> Cash Investments>> FDIC Plus Program, Jan. 14, 2010, 3 pgs.
Folio Investing: Brokerage Features >> Cash Investments>> Cash Seep Rates, Jan. 14, 2010, 2 sheets.
Folio Investing: Brokerage Features >> Cash Investments>> Cash Seep Banks, Jan. 15, 2010, 3 pgs.
Folio Investing: Brokerage Features >> Cash Investments>> Cash Sweep FAQ, Jan. 14, 2010, 3 pgs.
Folio Investing: Brokerage Features>> Cash Investments>> Cash Sweep FAQ, Jan. 18, 2010, 2 sheets.
Folio Investing: Brokerage Features>> Cash Investments>> Cash Sweep FAQ, Jan. 15, 2010, 2 sheets.
Folio Investing: Brokerage Features>> Cash Investments>> Sweep Terms & Conditions, Jan. 14, 2010, 2 sheets.
The LYRA Program with H.C. Denison Company, Sheboygan Wisconsin, Jan. 15, 2010, 2 sheets.
Current LYRA Program Rates, H.C. Denison Co., Jan. 15, 2010, 1 sheet.
Current LYRA Program Rates, H.C. Denison Co., Nov. 2, 2009, 1 sheet.
Current LYRA Program Banks, H.C. Denison Co. LYRA Program, Nov. 2, 2009, 1 sheet.
Authorization Form, H.S. Denison Company's Liquidity Insured Reserve Access Program (LYRA Program), Oct. 2009, 1 sheet.
Frequently Asked Questions for the LYRA Program, H.C. Denison Co., Jan. 15, 2010, 3 pgs.
Terms & Conditions for H.C. Denison Company's Liquidity Insured reserve Access Program (LYRA Program), Jan. 15, 2010, 4 pgs.
Terms & Conditions for H.C. Denison Company's Liquidity Insured reserve Access Program (LYRA Program), Nov. 2, 2009, 4 pgs.
Current Rates, http://currentrates.hillard.com/ Jan. 6, 2010, 1 sheet.
Current Rates, http://currentrates.hillard.com/ Nov. 2, 2009, 1 sheet.
Current Rates, Market Info, Hilliard Lyons, Nov. 2, 2009, 4 pgs.
Legent Insured Deposit, www.legentclearing.co/mmf/phf, Nov. 2, 2009, 2 sheets.
Legent Insured Deposit Program—Summary of Terms and Conditions, Nov. 2008, 4 pgs.
Cash Management, Mesirow Financial—B/D and IA Services, www.mesirowfinancial.com/bdia/cas_mgmt.jsp, Jan. 15, 2010, 2 sheets.
Frequently Asked Questions: FDIC Sweep Program, optionsXpress, www.optionsxpress.com/welcom/faq/fdic.aspx Jan. 6, 2010, 3 pgs.
Frequently Asked Questions: FDIC Sweep Program, www.optionsxpress.com/welcom/faq/fdic.aspx, Nov. 12, 2009, 2 sheets.
Money Fund and FDIC-Insured Bank Programs, Pershing, www.pershing.com/money_fund.htm, Jan. 15, 2010, 1 sheet.
Money Market Mutual Fund & FDIC-Insured Deposits Program Rates & Bank Lists, www.pershing.com/rates.html, Jan. 6, 2010m 6 pgs.
Clearing firms used by the top independent broker-dealers, Investment News, www.investmentnews/article/20081214/CHART/812119919, Jan. 15, 2010, 4 sheets.
Objective investment advice Building trust, Wayne Strout, www.waynestrout.com/more)info, Jan. 18, 2010, 5 pgs.
Eagle sweep disclosure, first republic Securities Company, Jun. 1, 2009, 12 pgs.
Update New FDIC product at IpI: Deutsche Bank Insured Deposit Program, Investment Professionals Inc, Feb. 4, 2009, 11 pgs.
Insured cash account http://lplfinancial.lpl.com/x68.xml, with LPL Financial insured cash account program disclosure booklet, LPL Financial Jan. 15, 2010, 23 pgs.
Insured deposit program, www.aigadvisorgroup.com/fdic/03.04.09.htm, Jan. 15, 2010, 3 pgs.
FlexInsured Account$^{SM}$, PrimeVest, http://primevest.com/flexInsured_account.asp, Jan. 14, 2010, 1 sheet.
FlexInsured$^{SM}$ Account disclosure statement, PrimeVest, 2009, 5 pgs.
An independent broker-dealer, Royal Alliance, http://www.royalalliance.com, Jan. 15, 2010, 1 sheet.
Brokerage products and services, www.steerneagee.com/sali/pcg/pages/products-services.aspx, Nov. 4, 2009, 2 sheets.
Client account agreement to Sterne Agee Clearing, INC, Sterne, Agee & Leach, Inc and its authorized agents, Feb. 3, 2009, 5 pgs.
Valet a full service asset management account, http://valetaccount.com/visaTerms.php, Nov. 12, 2009, 6 pgs.
We have your banking nees covered!, Greater Franklin, 2009, 2 sheets.
Insured MMA Seep Program, Circle Bank, www.circlebank.com/personalbanking)mma.aspx, Jan. 14, 2010, 2 sheets.
Insured MMA agency sweep agreement with rate sheet, Circle Bank, Dec. 3, 2009, 6 pgs.
Personal Banking—East West student plus program, East West Bank, www.eastwestbank.com/english/FDIC.asp, Nov. 10, 2009, 1 sheet.
Safe sound secure insured deposit programs, East West Bank, www.eastweatbank.com/English/SS_SIDProarams.asp Jan. 15, 2010, 2 sheets.
Money market insured deposit program, East West Bank, www.eastweatbank.com/English/MMarket_Insured.asp, Nov. 10, 2009, 1 sheet.
Insured deposit program bank list, www.eastweatbank.com/English/IDPB_list.htm, Nov. 10, 2009, 1 sheet.
FDIC information ofr United Commercial Ban, San Francisco, UCB, www.ibankunited.com/home.html, Nov. 12, 2009, 1 sheet.
Money market insured deposit program, Desert Community Bank, www.dck.org/MMarket_insured.html, Nov. 12, 2009, 1 sheet.
Insured deposit program bank list, www.dcbk.org/IDPB_list.htm, Nov. 12, 2009, 1 sheet.
Evolve and others team up with Deutsche Bank to provide higher FDIC coverage limits, www.insureddeposit online.com/content/view/31/86/, Nov. 12, 2009, 1 sheet.

Protect your cash portfolio!, http://insureddepositsonline.com, Jan. 15, 2010, 1 sheet.
Protect your cash portfolio!, www.insureddepositsonline.com/component/option.com_frontpage/Itemid,1/, Nov. 2, 2009, 1 sheet.
Participating bank analysis, Insured Deposit Program, Evolve Bank & Trust, www.insureddepositsonline.com/content/view/45/113/, Nov. 15, 2010, 1 sheet.
Frequently asked questions, Evolve Bank & Trust, www.insureddepositsonline.com/content/view/38/120/, Jan. 15, 2010, 3 pgs.
Strategic Partners, Insured Deposit Program, Evolve Bank & Trust, www.insureddepositsonline.com/content/view/37/114/, Jan. 15, 2010, 1 sheet.
Who the program Benefits, Insured Deposit Program, Evolve Bank & Trust, www.insureddepositsonline.com/content/view/43/115/, Jan. 15, 2010, 1 sheet.
How the program works, Insured Deposit Program, Evolve Bank & Trust, www.insureddepositsonline.com/content/view/47/112/, Jan. 15, 2010, 1 sheet.
This new bank is over 80 years old, Insured Deposit Program, Evolve Bank & Trust, www.insureddepositsonline.com/content/view/44/116/, Nov. 2, 2009, 1 sheet.
Temporary liquidity guarantee program, Evolve Bank & Trust, www.getevolved.com/index.php?option=com_content&task=view&id=67& itemid=263, Nov. 2, 2009, 1 sheet.
Contact us, Insured Deposit Program, Evolve Bank & Trust, www.insureddepositsonline.com/content/view/40/118/, Nov. 2, 2009, 1 sheet.
Over $12,5 million of FDIC deposit insurance available, Insured Deposit Program, Deutsche Bank, www.insureddepositsonline.com, 1 sheet.
How the program works, Insured deposit program, Evolve Bank & Trust, www.insureddepositsonline.com/content/view/47/112/, Nov. 4, 2009, 11 pgs.
Insured deposit online, Frequently asked questions, Evolve Bank & Trust, www.insureddepositsonline.com/content/section/3/71, May 14, 2009, 3 pgs.
Insured deposit online, The Insured Deposit Program, Evolve Bank & Trust, Apr. 3, 2009, 2 pgs.
Personal Banking, Insured Deposit Program, Pulaski Bank, www.pulaskibankstl.com/personal/checking-personalinsured.htm, Jan. 26, 2010, 1 sheet.
Personl Banking, Insured Deposit Program, Pulaski Bank, www.pulaskibankstl.com/personal/currentrates.htm, Jan. 26, 2010, 2 sheets.
Personal Banking, Insured Deposit Program, Pulaski Bank, www.pulaskibankstl.com/personal/checking-personalinsured.htm, Dec. 8, 2009, 1 sheet.
Personal Banking, Insured Deposit Program, Pulaski Ban, www.pulaskibankstl.com/personal/checking-personalinsured.htm, May 14, 2009, sheet.
Total Bank Solutions, Deposit Institutions, sheets. www.totalbanksolutions.com/depositcfm, Jan. 15, 2010, 2 sheets.
Total Bank Solutions, Insured Deposit Program, www.totalbanksolutions.com/insured-deposit.cfm, Jan. 15, 2010, 3 pgs.
Total Bank Solutions, Source Institutions, www.totalbanksolutions.com/source.cfm, Jan. 15, 2010, 3 pgs.
Total Bank Solutions, FAQs, www.totalbanksolutions.com/faqs.cfm, Jan. 15, 2010, 2 sheets.
Total Bank Solutions, Insured Deposit Program, TBS overview, Nov. 3, 2009, 1 sheet. www.totalbanksolutions.com/overview.htm, Nov. 3, 2009, 1 sheet.
Total Bank Solutions, Insured Deposit Program, Total Bank Solutions, www.totalbanksolutions.com, Nov. 3, 2009, 1 sheet.
Total Bank Solutions, Insured Deposit Program, Bank Sweep Program, www.totalbanksolutions.com/insured-deposit.cfm, Jan. 15, 2010, 3 pgs.
Total Bank Solutions, Insured Deposit Program, Bank Sweep Program, www.totalbanksolutions.com/banksweep.htm, Nov. 3, 2009, 2 sheets.
Total Bank Solutions, Insured Deposit Program, Brokerage Sweeps, www.totalbanksolutions.com/brokersweep.htm, Nov. 3, 2009, 2 sheets.
Total Bank Solutions, Insured Deposit Program, Deposits, www.totalbanksolutions.com/Deposits.htm, Nov. 3, 2009, 1 sheet.
Total Bank Solutions, Insured Deposit Program, Bank Sweep Program, www.totalbanksolutions.com/banksweep.htm Mar. 6, 2009, 2 sheets.
Total Bank Solutions, Insured Deposit Program, Broker Sweep Program, www.totalbanksolutions.com/brokerweep.htm, Mar. 6, 2009, 2 sheets.
Total Bank Solutions, Insured Deposit Program, Deposit, www.totalbanksolutions.com/deposit.htm, Mar. 6, 2009, 2 sheets.
Total Bank Solutions, Insured Deposit Program, Bank Sweep Program, www.totalbanksolutions.com/banksweep.htm, Mar. 6, 2009, 2 sheets.
Total Bank Solutions, Insured Deposit Program, www.totalbanksolutions.com, Mar. 6, 2009, 2 sheets.
Total Bank Solutions, Insured Deposit Program, Partners & Affiliates, www.totalbanksolutions.com/partners.htm, Sep. 11, 2009, 2 sheets.
Christopher McCrum, LinkedIn, http://74.125.93.132/search?=cache:5hs9cebUSigJ:www.linkedin.com/pub/christopher-mccrum/. . . , Nov. 2, 2009, 2 sheets.
Kentucky Bankers Association, Alternative for excess deposit coverage FREE Webiners, http://209.235.145/cgi-bin/websuite/tcsassnwebsuite.pl? ..., Nov. 2, 2009, 2 sheets.
Kentucky Bankers Association Detailed listening, http://member.kybanks.com/source/members . . . , Nov. 2, 2009, 1 sheet.
Letter from Ballard W. Cassady, Jr. President and Chief Executive Officer, Kentucky Bankers Association, Mar. 31, 2009, 1 sheet.
Oklahoma bankers association seeks extra security for deposits, http://findarticles.com/p/articles/mi_qn4182/is_200811281ai_n31055289/, Nov. 2, 2009, 2 sheets.
Deutsche Bank Insured Deposits, Bank list as of Dec. 18, 2009, 1 sheet.
Letter to Robert E. Feldman, Federal Deposit Insurance Corporation, re: Proposed rule on risk-based assessments (RIN#3064-AD35), Dec. 17, 2008, 4 pgs.
Deutsche Bank Alex. Brown insured deposit program (IDP), Dec. 1, 2009, 10 pgs.
Cd's pass agencies as largest holding in MMFs: Repo plunges in sept., www.cranedata.us/archives/news/2009/10/, Nov. 3, 2009, 14 pgs.
Lawsuit by Island Intellectual Property LLC, Lids Capital LLC, Double Rock Corporation, and Intrasweep LLC against Deutsche Bank Trust Company Americas, and Total Bank Solutions, LLC, Defendants' Preliminary Invalidity Contentions, Mar. 12, 2010, Civil Action No. 09 Civ. 2675 (VM) (AJP).
Lawsuit by Island Intellectual Property LLC and Intrasweep LLC against Institutional Deposits Corp., Defendant Institutional Deposits Corp.'s Preliminary Invalidity Contentions, Case No. 09-CV-03079-JEC, received in Mar. 2010.
Exhibit 1, Invalidity Chart: IMA and Insurance Plus Service Agreement, U.S. Patent No. 7,509,286, received in Mar. 2010, 21 pgs.
Exhibit 2, Invalidity Chart: Investors Money AccountSM System, U.S. Patent No. 7,509,286, received in Mar. 2010, 26 pgs.
Exhibit 3, Invalidity Chart: Insured Money Account System, U.S. Patent No. 7,509,286, received in Mar. 2010, 26 pgs.
Exhibit 4, Invalidity Chart: U.S. Patent No. 4,985,833 (Oncken), U.S. Patent 7,509,286, received in Mar. 2010, 21 pgs.
Exhibit 5, Invalidity Chart: First City Bank of Texas' Insured Savings Program, U.S. Patent No. 7,509,286, received in Mar. 2010, 39 pgs.
Exhibit 6, Invalidity Chart: Quest Insured Account, U.S. Patent No. 7,509,286, received in Mar. 2010, 19 pgs.
Exhibit 7, Invalidity Chart: CIBC World Markets—Insured Bank Deposit Account, U.S. Patent No. 7,509,286, received in Mar. 2010, 16 pgs.
Exhibit 8, Invalidity Chart: Merrill Lynch CMA/ISA Service, U.S. Patent No. 7,509,286, received in Mar. 2010, 72 pgs.
Exhibit 9, Invalidity Chart: 1983 Fed Letter, U.S. Patent No. 7,509,286, received in Mar. 2010 16 pgs.
Exhibit 10, Invalidity Chart: Merrill Lynch Banking Advantage Program ("MLBA Program"), U.S. Patent No. 7,509,286, received in Mar. 2010 22 pgs.

Exhibit 11, Invalidity Chart: Merrill Lynch & You + MLBA Information Statement, U.S. Patent No. 7,509,286, received in Mar. 2010 18 pgs.
Exhibit 12, Invalidity Chart: Smith Barney Insured Deposit Account, U.S. Patent No. 7,509,286, received in Mar. 2010, 22 pgs.
Exhibit 13, Invalidity Chart: Smith Barney Bank Deposit Program, U.S. Patent No. 7,509,286, received in Mar. 2010, 18 pgs.
Exhibit 14, Invalidity Chart: Alliance Insured Account, U.S. Patent No. 7,509,286, received in Mar. 2010, 16 pgs.
Exhibit 15, Invalidity Chart: Reserve's American Express Presentation, U.S. Patent No. 7,509,286, received in Mar. 2010, 16 pgs.
Exhibit 16, Invalidity Chart: U.S. Patent No. 7,376,606 (Jacobsen), U.S. Patent No. 7,536,350, received in Mar. 2010, 6 pgs.
Exhibit 17, Obviousness Combinations Chart, U.S. Patent No. 7,509,286, received in Mar. 2010, 351 pgs.
U.S. Appl. No. 11/641,046, filed Dec. 19, 2006, Bruce Bent et al.
U.S. Appl. No. 11/840,060, filed Aug. 16, 2007, Bruce Bent et al.
U.S. Appl. No. 12/385,522, filed Apr. 10, 2009, Bruce Bent et al.
U.S. Appl. No. 12/408,507, filed Mar. 20, 2009, Bruce Bent et al.
U.S. Appl. No. 12/408,511, filed Mar. 20, 2009, Bruce Bent et al.
U.S. Appl. No. 12/408,523, filed Mar. 20, 2009, Bruce Bent et al.
U.S. Appl. No. 12/453,387, filed May 8, 2009, Bruce Bent et al.
U.S. Appl. No. 12/453,388, filed May 8, 2009, Bruce Bent et al.
U.S. Appl. No. 12/453,389, filed May 8, 2009, Bruce Bent et al.
U.S. Appl. No. 12/453,390, filed May 8, 2009, Bruce Bent et al.
U.S. Appl. No. 12/453,390, filed May 8, 2009, Bruce Bent.
U.S. Appl. No. 12/622,979, filed Nov. 20, 2009, Bruce Bent et al.
FDIC Federal Register Citations: Email from Bert Ely to Comments, Mar. 8, 2006, Subject: Large-Bank Deposit Insurance Determination Proposal—RIN 3064-AC98—Regs@fdic.gov. Attached, also from FDIC Federal Register Citations: Email From American Banker, by Bert Ely, Feb. 24, 2006, Viewpoint: FDOC's Account-Link Plan a Pointless, Costly Threat.
Garton, Thomas W.; Are LLC Banks in the Cards? Stay Tuned; Fredrikson & Byron, P.A.; Jun. 2003; http://www.fredlaw.com/articles/banking/bank_0306_twig.html; 2 pages.
*Island Intellectual Property LLC* et al. v. *Deutsche Bank AG*, et al.; Memorandum and Order; Case 1:09-cv-02675-KBF; Doc. 289; Feb. 14, 2012; pp. 1-28.
*Island Intellectual Property LLC* et al. v. *Deutsche Bank AG*, et al.; Order; Case 1:09-cv-02675-KBF; Doc. 221; Feb. 14, 2012; pp. 1-34.
*Island Intellectual Property LLC* et al. v. *Deutsche Bank Trust Company Americas*, et al.; Declaration of Charles R. Macedo 2 in support of Plaintiffs' motions in limine nos. 4-6; Case 1:09-cv-02675-KBF; Doc. 260; Feb. 3, 2012; pp. 1-3 and Exhibits.
*Island Intellectual Property LLC* et al. v. *Deutsche Bank Trust Company Americas*, et al.; Defendants' opposition to Plaintiffs' motion in limine #3 to preclude defendants' expert Richard T. Powers from testifying that the Merrill Lynch CMA/ISA product includes omnibus accounts. Case 1:09-cv-02675-KBF; Doc. 269; Feb. 6, 2012; pp. 1-18.
*Island Intellectual Property LLC* et al. v. *Deutsche Bank Trust Company Americas*, et al.; Defendants' opposition to Plaintiffs' motion in limine #4 to preclude evidence and argument regarding Plaintiffs' confidential Oct. 18, 2000 presentation to American Enterprises Investment Services at trial; Case 1:09-cv-02675-KBF; Doc. 284; Feb. 10, 2012; pp. 1-12.
*Island Intellectual Property LLC* et al. v. *Deutsche Bank Trust Company Americas*, et al.; Memorandum and Order; Case 1:09-cv-02675-KBF; Doc. 265; Feb. 6, 2012; pp. 1-22.
*Island Intellectual Property LLC* et al. v. *Deutsche Bank Trust Company Americas*, et al.; Plaintiffs' brief in support of their motion in limine #3 to preclude defendants' expert Richard T. Powers from testifying that the Merrill Lynch CMA/ISA product includes omnibus accounts based on 17-year old double hearsay that is uncorroborated and in contravention of documentary and oral evidence of record; Case 1:09-cv-02675-KBF; Doc. 247; Jan. 30, 2012; pp. 1-20.
*Island Intellectual Property LLC* et al. v. *Deutsche Bank Trust Company Americas*, et al.; Plaintiffs' memorandum of law in support of motion in limine #4 to preclude evidence and argument regarding Plaintiffs' confidential Oct. 18, 2000 presentation to American Enterprises Investment Services at trial; Case 1:09-cv-02675-KBF; Doc. 262; Feb. 6, 2012; pp. 1-10.

*Island Intellectual Property LLC* et al. v. *Deutsche Bank Trust Company Americas*, et al.; Plaintiffs' motion in limine #4 to preclude evidence and argument regarding Plaintiffs' confidential Oct. 18, 2000 presentation to American Enterprises Investment Services at trial; Case 1:09-cv-02675-KBF; Doc. 257; Feb. 3, 2012; pp. 1-10.
*Island Intellectual Property LLC* et al. v. *Deutsche Bank Trust Company Americas*, et al.; Plaintiffs' Notice of Motion and Motion in Limine #3 to preclude Defendants' expert Richard T. Powers from testifying that the Merrill Lynch CMA/ISA product includes omnibus accounts based on 17-year old double hearsay that is uncorroborated and in contravention of documentary and oral evidence of record; Case 1:09-cv-02675-KBF, Doc. 246; Jan. 30, 2012; pp. 1-2.
*Island Intellectual Property LLC* et al. v. *Deutsche Bank Trust Company Americas*, et al.; Plaintiffs' notice of motion and motion in limine #3 to preclude testimony of Gilbert Schwartz; Case 1:09-cv02675-KBF; Doc. 259; Feb. 3, 2012; pp. 1-2.
*Island Intellectual Property LLC* et al. v. *Deutsche Bank Trust Company Americas*, et al.; Plaintiffs' notice of motion and motion in limine #4 to preclude evidence and argument regarding Plaintiffs' confidential Oct. 18, 2000 presentation to American Enterprises Investment Services at trial; Case 1:09-cv-02675-KBF; Doc. 256; Feb. 3, 2012; pp. 1-2.
Knight-Ridder; Money Matters, Tips you can use—Limits Apply as FDIC Insurance Covers Depositor, Not Account; Chicago Tribune; Feb. 4, 1998; 2 pages.
Lawsuit by Island Intellectual Property LLC against Clearview Correspondent Services, LLC, et al.; Complaint for Patent Infringement; Civil Action No. 1:11-cv-448 (LO/TRJ); Apr. 26, 2011; 55 pages.
Lawsuit by Island Intellectual Property LLC against First Southwest Company; Complaint for Patent Infringement; Civil Action No. 1:11-cv-00371-UNA; Apr. 26, 2011; 42 pages.
Lawsuit by *Island Intellectual Property LLC* et al. v. *Deutsche Bank Trust Company Americas* et al.; Joint Statement of Claims and Defenses to be Presented at Trial Set for Feb. 27, 2012; Jan. 16, 2012; Case 1:09-cv-02675-KBF (Document 227).
Lawsuit by *Island Intellectual Property LLC* v. *Clearview Correspondent Services, LLC*, et al.; Branch Banking & Trust Company's Answer to Complaint and Counterclaims; Civil Action No. 1:11-cv-448-LO-IDD; Jun. 20, 2011; 13 pages.
Lawsuit by *Island Intellectual Property LLC* v. *Clearview Correspondent Services, LLC*, et al.; Clearview Correspondent Services, LLC's Answer to Complaint and Counterclaims; Civil Action No. 1:11-cv-448-LO-IDD; Jun. 20, 2011; 12 pages.
Lawsuit by *Island Intellectual Property LLC* v. *Clearview Correspondent Services, LLC*, et al.; Scott & Stringfellow, LLC's Answer to Complaint and Counterclaims; Civil Action No. 1:11-cv-448-LO-IDD; Jun. 20, 2011; 12 pages.
Lawsuit by *Island Intellectual Property LLC* v. *First Southwest Company*; First Southwest Company's Answer to Complaint and Counterclaims; Civil Action 1:11-cv-371-SD; Jun. 20, 2011; 11 pages.
Lawsuit by *Island Intellectual Property LLC*, et al. v. *Deutsche Bank Trust Company Americas* et al.; Declaration of Olivia M. Kim in Support of Defendants' Motion for Summary Judgment of Invalidity Under 35 U.S.C. § 101; Oct. 6, 2011; Case 1:09-cv-02675-VM, Document 197.
Lawsuit by *Island Intellectual Property LLC*, et al. v. *Deutsche Bank Trust Company Americas*, et al. Plaintiffs' Memorandum of Law in Opposition to Defendants' Motion for Summary Judgment of Invalidity Under 35 U.S.C. § 101; Nov. 2, 2011; Case 1:09-cv-02675-VM, Document 201.
Lawsuit by *Island Intellectual Property LLC*, et al. v. *Deutsche Bank Trust Company Americas*, et al.; Defendants' Reply in Support of Their Motion for Summary Judgment of Invalidity Under 35 U.S.C. § 101; Nov. 15, 2011; Case 1:09-cv-02675-VM, Document 208.
Lawsuit by *Island Intellectual Property LLC*, et al. v. *Deutsche Bank Trust Company Americas*, et al.; Defendants' Response to Plaintiffs' Statement of Additional Material Facts in Support of Plaintiffs' Opposition to Defendants' Motion for Summary Judgment of Invalidity Under 35 U.S.C. § 101; Nov. 15, 2011; Case 1:09-cv-02675-VM, Document 209.
Lawsuit by *Island Intellectual Property LLC*, et al. v. *Deutsche Bank Trust Company Americas*, et al.; Order; Dec. 7, 2011; Case 1:09-cv-02675-VM, Document 212.

Lawsuit by *Island Intellectual Property LLC*, et al. v. *Deutsche Bank Trust Company Americas*, et al.; Special Master's Report and Recommended Decision on Defendants' Summary Judgment Motion of Invalidity Under 35 U.S.C. § 101; Dec. 19, 2011.

Lawsuit by *Island Intellectual Property LLC*, et al. v. *Deutsche Bank Trust Company Americas*, et al., Supplemental Declaration of Olivia M. Kim in Support of Defendants' Opening and Reply Claim Construction Briefs; Nov. 15, 2011; Case 1:09-cv-02675-VM, Document 207.

Martens, Don W.; letter to Hon. Victor Marrero re. supplement to letter of Nov. 28, 2011 on tentative rulings on claim construction in *Island Intellectual Property LLC* et al. v. *Deutsche Bank Trust Co.*, et al.; Nov. 28, 2011; Case 1:09-cv-02675-VM; Document 211.

Martens, Don W.; letter to Hon. Victor Marrero re. tentative rulings on claim construction in *Island Intellectual Property LLC* et al. v. *Deutsche Bank Trust Co.*, et al.; Nov. 28, 2011; Case 1:09-cv-02675-VM, Document 210.

Lawsuit by *Island Intellectual Property LLC*, et al. v. *Deutsch Bank Trust Company Americas*, et al.; Defendant Deutsche Bank Trust Company Americas' Second Supplemental Responses to Double Rock's Interrogatories Nos. 2, 8 and 9, Jul. 2010, 65 pages.

Exhibit 2, Invalidity Chart: U.S. Pat. No. 4,985,833 (Oncken)—U.S. Pat. 7,668,771, Jul. 2010, 14 pages.

Exhibit 5, Invalidity Chart: Merrill Lynch Business Advantage Program—U.S. Pat. No. 7,668,772, Jul. 2010, 7 pages.

Exhibit 8, Invalidity Chart: Harken Financial Services Sweep Product—U.S. Pat. No. 7,668,771, Jul. 2010, 9 pages.

Exhibit 9, Invalidity Chart: Wayne Hummer—Insured Bank Deposit Program—U.S. Pat. No. 7,668,771, Jul. 2010, 12 pages.

Exhibit 10, Invalidity Chart: U.S. Patent Application Publication No. 2007/0043666 (Burdette), U.S. Pat. No. 7,668,771, Jul. 2010, 9 pages.

Letter to R.M. Zaitzeff, from W.W. Wiles, dated Jun. 22, 1983 (response to May 10, 1983 letter re: offering of MMDAs), 6 pages.

Letter to G.T. Schwartz, from O.I. Ireland, dated Jun. 22, 1988 (response to Dec. 18, 1987 letter re: proposed modifications to Merrill Lynch's CMA Program), 5 pages.

Information Statement, "Alliance Insured Account," Sep. 1999; 6 pages.

Investors MoneyAccountSM and Insurance Plus Service Agreement, attached Schedule A (List of Banks Participating in the Insurance Plus Service), IMAD Mar. 1994, 3 pages.

Investors Money AccountSM (an FDIC-insured money market account), IMA-1 (Mar. 1994), 4 pages.

Investors MoneyAccountSM, "The FDIC-Insured Money Market Investment with an Important Plus," IMA Oct. 1995, 2 pages.

1985 SEC No-Act. LEXIS 2756, Investment Company Act of 1940—Section 3(a)(1), 2(a)(36); Securities Act of 1933—Section 2(1), Nov. 29, 1985, Kemper Financial Services, Inc., 9 pages.

Insured Money Account Program Agreement and Disclosure Statement, (attached Schedule A—Deposit Account Terms), faxed Mar. 28, 2000; 10 pages.

First National Bank in Brookings, Certificates of Deposit [online] [retrieved on Jul. 17, 2009]. Retrieved from the Internet: Certificates of Deposit, <URL: http://web.archive.org/web/20000524121111/www.firstnb.com/cd.htm>; Multi-Bank CDs, <URL: http://web.archive.org/web/20000524132934/www.firstnb.com/mbcd.htm>, 5 pages.

Summary of Commentary on Current Economic Conditions by Federal Reserve Districts, Jan. 1985, 44 pages.

12 CFR Ch. II (Jan. 1, 2009 Edition), pp. 124-125.

Product Strategy, "Money Fund $$ Moving to Bank Deposits, Distributors Start to Install Bank Deposit Accounts to Replace Money Funds," 6 FRC Monitor, Dec. 2003, 2 pages.

Board of Governors of the Federal Reserve System, "The May 1998 Senior Financial Officer Survey," May 1998, (attached Appendix A: Survey Questions and Responses; Appendix B: Glossary; Appendix C: Examples of Key Reserve Concepts), 48 pages.

Interest Rate Review, A Publication of the Meyer Weekly Interest Rate Survey, "A Look at Tiers," Apr. 1987, 6 pages, vol. 11, No. 4.

LexisNexis, The American Banker, "Merrill Joins Money Market Account, CMA; Broker Begins Testing With 12 Institutions," Sep. 23, 1983, 4 pages.

Bent et al., Office Action, U.S. Appl. No. 10/071,053, with attached SB08, date considered Mar. 10, 2009, 2 pages.

Merrill Lynch & You, "Financial Services The Way You Want, When You Want Them," Jan. 2000, 16 pages.

Exhibit 1, "FA/FB Account 1997 First Transactions, TRX Types: PU, PP, TA, PT," Aug. 2003, p. 1-2.

Advertisement: Where Your Interest is?, Mutual Funds, Oct. 1997; 1 page.

Advertisement: It's 1997, Do You Know Where Your Interest Is?, Mutual Funds, Dec. 1993, p. 46.

USPTO Office Action, Interview Summary, U.S. Appl. No. 11/767,827, Date Mailed Sep. 23, 2009, 4 pages.

USPTO Office Action, Office Action Summary, U.S. Appl. No. 11/767,827, Date Mailed Jun. 5, 2009, 35 pages.

Service Mark Application, Applicant: Reserve Management Corporation, Mark: Reserve Insured Deposits, (attached Power of Attorney, Declaration, Drawing Page, Sep. 21, 2001, 6 pages.

Letter to C.R. Macedo, from R.L. Rainey, Re: Promontory Interfinancial Network, LLC, dated Jul. 22, 2008, (attached Attachments A-E), 35 pages.

Letter to C.R. Macedo, from R.L. Rainey, Re: Promontory Interfinancial Network, LLC, dated Oct. 16, 2008, (attached Attachments A-C), 22 pages.

Letter to C.R. Macedo, from R.L. Rainey, Re: Promontory Interfinancial Network, LLC, dated Feb. 23, 2009, (attached Exhibit A-B), 21 pages.

Merrill Lynch & Co., Inc., Form 10-K405 (Annual Report (Regulation S-K, item 405)), Filed Mar. 14, 2002 for the Period Ending Dec. 28, 2001, 248 pages.

Merrill Lynch, "Information Statement Regarding changes to Interest Rates on Deposits in the Merrill Lynch Banks," Nov. 12, 2007, 2 pages.

QUESTessentials, "Quest Insured Account," May 17, 1994, 3 pages.
Information Statement, "Quest Insured Account," (attached Appendix A), 5 pages.

OCC Insured Bank Deposit Account (attached are page 2 of Quest for Value Funds Daily Data, Jun. 1993; OCC Insured Account Rate Table), 3 pages.

CIBC World Markets, "Insured Bank Deposit Account," Information Statement, Jul. 1, 2000, 2 pages.

Letter to Client, from M.J. Hensle, Re: Salomon Smith Barney Bank Deposit ProgramSM, (attached Q&A: Important Information about the New Salomon Smith Barney Bank Deposit Program), Aug. 16, 2002, 14 pages.

FDIC, FDIC Law, Regulations, Related Acts—4000—Advisory Opinions, Oct. 22, 1987, J.W. Via, Jr., Counsel [online] [Retrieved on Jan. 22, 2010]. Retrieved from the Internet: URL: <http://www.fdic.gov/regulations/laws/rules/4000-2560.html>, 1 page.

FDIC, FDIC Law, Regulations, Related Acts—4000—Advisory Opinions, Jun. 28, 1993, J. A. DiNuzzo, [online] [Retrieved on Jan. 22, 2010]. Retrieved from the Internet: URL: <www.fdic.gov/regulations/laws/rules/4000-8240.html>, 2 pages.

FDIC, FDIC Law, Regulations, Related Acts—4000—Advisory Opinions, Jul. 23, 1986, D. H. Jones [online] [Retrieved on Jan. 22, 2010]. Retrieved from the Internet: URL: <www.fdic.gov/regulations/laws/rules/4000-2120.html#fdic400086-21>, 2 pages.

Merrill Lynch—Pierce, Fenner & Smith, Inc., "The Merrill Lynch Cash Management Account®," Financial Service, Jan. 1985, 18 pages.

CMA, "A Guide to Your CMA Account," Jan. 1995, 38 pages.

American Banker, Salomon's Sweep Plan Raises FDIC Fund Alarm [online], Dec. 6, 2000 [retrieved on Apr. 13, 2009]. Retrieved form the Internet: <URL: http://www.americanbanker.com/printthis.html?id=2000120603YJGEZD>, 2 pages.

The Insured Deposit Account: "Money in the Bank," page 5; Three Little Letters. Three Big Ways to Save in 1998, p. 4.

LexisNexis, The American Banker, Sep. 23, 1983, Merrill Joins Money Market Account, CMA; Broker Begins Testing With 12 Institutions, Byline: A. Aryan, 4 pages.

Merrill Lynch & Co Inc—MER, 10k WIZARD, Form 8-K, "Report of Unscheduled Material Events or Corporate Changes," Filed Mar. 7, 2002, 51 pages.

Federal Reserve System, LEXSEE 51 FR 9632, "Definition of Deposit and Technical Amendments," Action: Final Rule, Mar. 20, 1986, 13 pages.
Federal Reserve System, LEXSEE 56 FR 15494, "Regulation D—Reserve Requirements of Depository Institutions," Action: Final Rule, Apr. 17, 1991, 5 pages.
Federal Reserve System, Part 201—Reserve Requirements of Depository Institutions (Regulation D)12 CFR Ch. II (Jan. 1, 2010 Edition), pp. 94-128, Pt. 204-Pt. 205.
Letter to G.T. Schwartz, from O.I. Ireland, dated Jun. 22, 1988, Re: response to letter of Dec. 18, 1987 regarding proposed modifications to Merrill Lynch's CMA Program, 5 pages.
Federal Reserve System, LEXSEE 47 FR 55207, "Reserve Requirements of Depository Institutions; Money Market Deposit Account," Dec. 8, 1982, Action: Final Rule, 5 pages.
Insured Bank Deposits™ Program Information Statement, (attached List of Eligible Program Banks, Effective May 9, 2002; New Account Application, Joint Account Agreement), 11 pages.
Memorandum to M. Peterson, J. Whitt, R. Wroten, E. Naumes, E. Deal, B. McCain, from J.E. Oncken, Jun. 15, 1990, Re: Insured Savings Update (with attachments), 7 pages.
Insured Savings, "Project Team Meeting," Feb. 2, 1989, 21 pages.
Insured Savings, "Overview & Marketing Plan," Presented by: J.E. Oncken, Dec. 6, 1988, (including Exhibit A), 23 pages.
Letter to V.J. Best, from J.E. Oncken, dated Apr. 18, 1988, 2 pages.
Letter to M.L. Duke from K. Johnson, dated Dec. 27, 1989, (attached Insured Savings Correspondent Agreement, Exhibits A-D, letter to M.L. Duke from K. Johnson dated Nov. 21, 1989 and Account Information Sheet), 39 pages.
Memorandum to J. Oncken, J. Scurlock, B. Standefer, E. Piner, T. Cyr, from K. Johnson, dated Jul. 5, 1990, Re: Attached Insured Savings Letters (with attachments), 9 pages.
E.D.S.—First City Austin Electronic Mail, from J. Oncken, to T. Cyr, Re: Depository Levels at Insured Savings Depositories, Nov. 2, 1989, 1 page.
Cash Management Balance Monitoring Agreement and Memorandum from Ed Piner to Cash management Line of Business Representatives dated May 21, 1991(with attachments), 8 pages.
Merrill Lynch, Insured Savings Account Fact Sheet, The Merrill Lynch Cash Management Account® Financial Service, Jan. 1986, 4 pages.
Merrill Lynch Money Markets, Inc., Merrill Lynch Capital Markets, "The Insured Savings Account, Issuer Guide to Offering MMDAs through Merrill Lynch," Sep. 1986; 36 pages.
Merrill Lynch, The Merrill Lynch Capital BuilderSM Account Financial Service, Insured SavingsSM Account Participating Depository Institutions, 1996, 2 pages.
Insured Deposit Account, May 21, 1996, 14 pages.
The Insured Deposit Account: "Money in the Bank," p. 5; Three Little Letters. Three Big Ways to Save in 1998, p. 4.
Smith Barney Inc. Capital Markets, Debt Origination Group Memo, to J. Mandelbaum, from T. Hamilton, cc: R. Holloman, H. Bald, S. Becton, Re: Insured Deposit Account, Oct. 10, 1995; Smith Barney Inc. Capital Markets, Debt Origination Group Memo, to B. Holloman, from T. Hamilton, cc: W. Heinzerling, H. Morris, COPs, Re: New Product Proposal for Insured Deposit Account, Sep. 18, 1995, 2 pages.
Insured Deposit Account, Product Description for the Investor, Draft as of Sep. 20, 1995, 8 pages.
Campbell, Andrew, et al.; A new standard for deposit insurance and government guarantees after the crisis; Journal of Financial Regulation and Compliance, vol. 17 No. 3, 2009; pp. 210-239.
Cynamon et al.; Redefining the Monetary Aggregates: A Clean Sweep; Eastern Economic Journal, vol. 32, No. 4, Fall 2006; pp. 661-672.
Hencke, Christopher; New Rules for FDIC Deposit Insurance; ABA Bank Compliance, Jul./Aug. 1999, 20,7; pp. 31-37.
Mutual Fund Dealers Association, 1 page, established 1998; (http://www.mfda.ca/.
Insured Savings Correspondent Agreement with Exhibits A-D, Dec. 1989; 28 pgs.
Investors MoneyAccount$^{SM}$ and Insurance Plus Service Agreement, Schedule A, Mar. 1994; 3 sheets.
Investors MoneyAccount$^{SM}$ (an FDIC-insured money market account), Apr. 1996; 4 sheets.
Investors MoneyAccount$^{SM}$ The FDIC-Insured Money Market with an Important Plus., Apr. 1996; 2 sheets.
Insured Money Account Program Agreement and Disclosure Statement, Mar. 2000; 11 sheets.
Quest Insured Account, *QUESTessentials*, May 17, 1994; 3 sheets.
OCC Insured Bank Deposit Account, Jun. 1993; 3 sheets.
Letter from Marilyn J. Hensle, announcing Salomon Smith Barney Bank Deposit Program.$^{SM}$, with Q&A, Aug. 16, 2000; 14 sheets.
The Insured Savings Account, Issuer Guide to Offering MMDAs through Merrill Lynch, Jul. 1986; 27 pgs.
H. C. Denision Company, Sheboygan, WI, retrieved Nov. 2, 2009; 1 sheet.
Frequent Asked Questions: FDIC Sweep Program, optionsXpress, retrieved Jan. 6, 2010; www.optionsxpress.com/welcom/faq/aq/fdc.aspx#rate.
Money Market Mutual Fund and FDIC-Insured Deposit Program Rates & Bank List, Jan. 5, 2010; www.pershing.com/rates.html, 1 sheet.
Insured deposit online, The Insured Deposit Program, Evolve Bank & Trust, ; retrieved Apr. 3, 2009; 2 sheets.
Deutsche Bank, Deutsche Bank insured deposit program, Dec. 18, 2009; 3 pgs.
Scottrade Bank Deposit Program—Terms, Conditions & Disclosures; Author unknown; Aug. 2011; pp. 1-3.
Salomon Smith Barney, "Bank Deposit Program Disclosure Statement," Assume 2010 or earlier; 3 pages. For purposes of prosection, the Examiner should assume that these references are prior art, but Applicants reserve the right to challenge the prior art status of the reference in litigation.
Merrill Lynch, "Insured Savings™ Account Fact Sheet," The Merrill Lynch Cash Management Account® Financial Service, Apr. 1987; 11 pages.
Insured Bank Deposits™ Program Summary Information Statement, May 9, 2002; 11 pages.

* cited by examiner

| | | |
|---|---|---|
| TIME → | T1 | Obtaining first client account transaction information for one or more first sub periods of time for a first set of one or more source institutions |
| | T2 | Obtaining at or before a first source reception cutoff time, a respective net transfer amount for respective ones of the first set of source institutions |
| | T3 | Selecting at least one aggregated deposit account in at least one recipient depository institution in a first group of one or more depository institutions with respective recipient cutoff times in a first time range |
| | T4 | Generating transfer data reflecting a transfer of at least a first transfer amount to the selected at least one recipient depository institution in the first group |
| | T5 | Obtaining second client account transaction information for one or more second sub periods of time for a second set of one or more source institutions |
| | T6 | Obtaining at or before a second source reception cutoff time, a respective second net transfer amount for respective ones of the second set of source institutions |
| | T7 | Selecting at least one aggregated deposit account in at least one recipient depository institution in a second group of one or more depository institutions with respective recipient cutoff times in a second time range |
| | T8 | Generating transfer data reflecting a transfer of at least a second transfer amount to the selected at least one recipient depository institution in the second group |
| | T9 | Allocating amounts of funds from multiple of the client accounts to substantially match the fund transfers |
| | T10 | Updating or having updated the one or more data bases to reflect the transfers to one or more of the depository institutions |

To Fig. 5B

SYSTEM, METHOD AND PROGRAM PRODUCT FOR ADMINISTERING FUND MOVEMENTS USING DEPOSITORY INSTITUTION GROUPS

RELATED APPLICATIONS

This application claims priority from Provisional Application U.S. Application Ser. No. 61/354,623 filed on Jun. 14, 2010, which is incorporated herein by reference in its entirety as if fully set forth herein.

FIELD OF INVENTION

The present invention generally relates to a system, method and program product for administering fund movements, such as sweep programs. In one or more embodiments, the present invention generally relates to using a method that generates data for transfers by forming depository institutions into groups based at least in part on different cutoff times for participants in the system and/or based on depository institution types.

SUMMARY OF ONE OR MORE EMBODIMENTS

In one embodiment, a method is disclosed comprising: accessing, using one or more computers, one or more electronic databases, stored on one or more computer-readable media, comprising: (i) aggregated account information for a plurality of government-backed insured and interest-bearing aggregated deposit accounts held in a plurality of recipient depository institutions, comprising a balance of funds held in each of the aggregated deposit accounts, wherein funds from a plurality of client accounts are aggregated with funds of other client accounts in the aggregated deposit accounts, wherein each of multiple of the depository institutions has one or more respective cutoff times; (ii) source institution information comprising an amount of funds sourced to a program from each of a plurality of respective source institution, wherein multiple of the source institutions are also depository institutions and/or are affiliated with one or more of the depository institutions; (iii) client account information for each of a plurality of the respective client accounts comprising at least a respective balance of funds from the respective client account held in each of one or more recipient depository institutions in the interest-bearing aggregated deposit accounts holding funds of the respective client account; obtaining first client account transaction information at or before a first source reception cutoff time, comprising credit information and/or debit information applied to or against respective client accounts for one or more first sub periods of time for a first set of one or more of the source institutions; obtaining, using the one or more computers, a respective first net transfer amount for one or more first sub-periods of time for respective ones in the first set of one or more of the respective source institutions based at least in part on the first client account transaction information; selecting at least one respective aggregated deposit account in at least one respective depository institution in a first group of one or more of the recipient depository institutions, to which to deposit/transfer or to withdraw/transfer funds, based at least in part on one or more selection rules, wherein the first group comprises one or more recipient depository institutions with respective recipient cutoff times in a first time range; generating transfer data, using the one or more computers, reflecting a transfer of at least one first transfer amount to or from the at least one recipient depository institution that was selected; obtaining at or before a second source reception cutoff time that is after the first source reception cutoff time, second client account transaction information comprising credit information and/or debit information applied to or against respective client accounts for the one or more second sub periods of time for a second set of one or more of the source institutions; obtaining, using the one or more computers, a respective second net transfer amount for the one or more second sub-periods of time for respective ones in a second set of one or more of the source institutions based at least in part on the second client account transaction information, where some or all of the one or more second sub periods of time may be the same as or different from the one or more first sub periods of time, and wherein the first and second sets of one or more of the source institutions may be different, or the same or partially overlap; selecting at least one aggregated deposit account in at least one depository institution in a second group of one or more of the recipient depository institutions, to which to deposit/transfer or to withdraw/transfer funds, based at least in part on one or more selection rules, wherein the second group comprises one or more of the recipient depository institutions with respective recipient cutoff times in a second time range that is different from the first time range; generating transfer data, using the one or more computers, reflecting a transfer of at least one second transfer amount to the at least one aggregated deposit account selected from the second group of one or more of the recipient depository institutions; allocating, using the one or more computers, amounts of funds from multiple of the client accounts among multiple of the recipient depository institutions, so that the respective balance of funds in each of the aggregated deposit accounts of the multiple of the recipient depository institutions, after taking into consideration the fund transfer amounts for the first and second sub periods of time, will substantially match a sum of the respective balances of funds from the multiple of the respective client accounts allocated to this respective aggregated deposit account; and updating or having updated, using the one or more computers, the one or more electronic databases to reflect the allocating of the amounts of funds of the multiple client accounts to the recipient depository institutions.

In a further embodiment, the first group has multiple recipient depository institutions therein, and the second group has multiple recipient depository institutions therein, where at least multiple of the recipient depository institutions in the second group are different from the recipient depository institutions in the first group In a further embodiment, the first time range of recipient cutoff times is overlapping with the second time range of recipient cutoff times, but ends before the second time range of recipient cutoff times.

In a further embodiment, the first time range of recipient cutoff times is not overlapping with the second time range of recipient cutoff times, and ends before a beginning of the second time range of recipient cutoff times.

In a further embodiment, multiple of the source institutions are also recipient depository institutions.

In a further embodiment, multiple of the source institutions are affiliated with one or more of the recipient depository institutions, and wherein one of the one or more selection rules is to transfer fund of respective source institutions only to recipient depository institutions that are affiliated therewith, if possible.

In a further embodiment, some of the fund transfers are deposited/transferred to one or more money fund accounts.

In a further embodiment, some of the fund transfers are deposited/transferred to one or more uninsured aggregated investment vehicles.

In a further embodiment, the method comprises: obtaining at or before a third source reception cutoff time, third client account transaction information comprising credit information and/or debit information applied to or against respective client accounts for one or more third sub periods of time for a third set of one or more of the source institutions; obtaining, using the one or more computers, a respective net transfer amount for the one or more third sub-periods of time for the third set of one or more of the source institutions based at least in part on the third client account transaction information; selecting at least one respective aggregated deposit account in at least one of the respective depository institutions in a third group, to which to deposit/transfer or to withdraw/transfer funds, based at least in part on one or more selection rules, wherein the third group comprises one or more of the recipient depository institutions with respective recipient cutoff times in a third time range; and generating transfer data, using the one or more computers, reflecting a transfer of at least one third transfer amount to the at least one aggregated deposit account selected from the third group of one or more of the recipient depository institutions.

In a further embodiment, the method comprises selecting depository institutions for at least one of the groups so that all of the depository institutions in this group are in the same time zone.

In a further embodiment, each of multiple of the depository institutions has a maximum cap, and further comprising selecting depository institutions for at least the second group to be in the same time zone and so that a sum of the maximum caps of the respective depository institutions selected for the second group equals or exceeds a threshold amount.

In a further embodiment, each of multiple of the depository institutions has a maximum cap, and further comprising selecting depository institutions for at least one of the groups so that a sum of the maximum caps of the respective depository institutions selected for this group equals or exceeds a threshold amount.

In a further embodiment, the generating transfer data steps comprise determining one or more of the transfer amounts for one or more of the recipient depository institutions based, at least in part, on one or more parameters.

In a further embodiment, the government backed insurance is Federal Deposit Insurance Corporation insurance.

In a further embodiment, at least one of the recipient depository institutions is in at least two of the groups.

In a further embodiment, the one or more databases comprise information on the cutoff times of multiple of the recipient depository institutions, accessing that information on the cutoff times by the one or more computers.

In a further embodiment, at least one of the source institutions has both first client account transaction information and second client account transaction information.

In a further embodiment, the first source reception cutoff time and/or the second source reception cutoff time varies from day to day.

In a further embodiment, one or more of the recipient depository institution cutoff times varies from time period to time period.

In a further embodiment, the recipient depository institutions in the first group and/or the second group vary from time period to time period.

In a further embodiment, a system is disclosed, comprising: one or more computers comprising memory wherein the memory stores computer-readable instructions comprising program code that, when executed, cause the one or more computers to perform the steps: accessing, using the one or more computers, one or more electronic databases, stored on one or more computer-readable media, comprising: (i) aggregated account information for a plurality of government-backed insured and interest-bearing aggregated deposit accounts held in a plurality of recipient depository institutions, comprising a balance of funds held in each of the aggregated deposit accounts, wherein funds from a plurality of client accounts are aggregated with funds of other client accounts in the aggregated deposit accounts, wherein each of multiple of the depository institutions has one or more respective cutoff times; (ii) source institution information comprising an amount of funds sourced to a program from each of a plurality of respective source institution, wherein multiple of the source institutions are also depository institutions and/or are affiliated with one or more of the depository institutions; (iii) client account information for each of a plurality of the respective client accounts comprising at least a respective balance of funds from the respective client account held in each of one or more recipient depository institutions in the interest-bearing aggregated deposit accounts holding funds of the respective client account; obtaining at or before a first source reception cutoff time, on the one or more computers, first client account transaction information comprising credit information and/or debit information applied to or against respective client accounts for one or more first sub periods of time for a first set of one or more of the source institutions; obtaining, on the one or more computers, a respective first net transfer amount for one or more first sub-periods of time for respective ones in the first set of one or more of the respective source institutions based at least in part on the first client account transaction information; selecting, using the one or more computers, at least one respective aggregated deposit account in at least one respective depository institution in a first group of one or more of the recipient depository institutions, to which to deposit/transfer or to withdraw/transfer funds, based at least in part on one or more selection rules, wherein the first group comprises one or more recipient depository institutions with respective recipient cutoff times in a first time range; generating transfer data, using the one or more computers, reflecting a transfer of at least one first transfer amount to or from the at least one recipient depository institution that was selected; obtaining at or before a second source reception cutoff time that is after the first source reception cutoff time, on the one or more computers, second client account transaction information comprising credit information and/or debit information applied to or against respective client accounts for the one or more second sub periods of time for a second set of one or more of the source institutions; obtaining, on the one or more computers, a respective second net transfer amount for the one or more second sub-periods of time for respective ones in a second set of one or more of the source institutions based at least in part on the second client account transaction information, where some or all of the one or more second sub periods of time may be the same as or different from the one or more first sub periods of time, and wherein the first and second sets of one or more of the source institutions may be different, or the same or partially overlap; selecting, using the one or more computers, at least one aggregated deposit account in at least one depository institution in a second group of one or more of the recipient depository institutions, to which to deposit/transfer or to withdraw/transfer funds, based at least in part on one or more selection rules, wherein the second group comprises one or more of the recipient depository institutions with respective recipient cutoff times in a second time range that is different from the first time range; generating transfer data, using the one or more computers, reflecting a transfer of at least one second transfer amount to the at least one aggregated deposit account selected from the second group of one or more of the recipient depository institutions; allocating, using the one or more computers, amounts of funds from multiple of the client accounts among multiple of the recipient depository institutions, so that the respective balance of funds in each of the aggregated deposit accounts of the multiple of the recipient depository institutions, after taking into consideration the fund transfer amounts for the first and second sub periods of time, will substantially match a sum of the respective balances of funds from the multiple of the respective client accounts allocated to this respective aggregated deposit account; and updating or having updated, using the one or more computers, the one or more electronic databases to reflect the allocating of the amounts of funds of the multiple client accounts to the recipient depository institutions.

In a further embodiment, a method is disclosed, comprising: accessing, using one or more computers, one or more electronic databases, stored on one or more computer-readable media, comprising: (i) aggregated account information for a plurality of government-backed insured and interest-bearing aggregated deposit accounts held in a plurality of recipient depository institutions, comprising a balance of funds held in each of the aggregated deposit accounts, wherein funds from a plurality of client accounts are aggregated with funds of other client accounts in the aggregated deposit accounts, wherein each of multiple of the depository institutions has one or more respective cutoff times; (ii) source institution information comprising an amount of funds sourced to a program from each of a plurality of respective source institution, wherein multiple of the source institutions are also depository institutions and/or are affiliated with one or more of the depository institutions; (iii) client account information for each of a plurality of the respective client accounts comprising at least a respective balance of funds from the respective client account held in each of one or more recipient depository institutions in the interest-bearing aggregated deposit accounts holding funds of the respective client account; obtaining first client account transaction information comprising credit information and/or debit information applied to or against respective client accounts for one or more first sub periods of time for a first set of one or more of the source institutions; obtaining, using the one or more computers, a respective first net transfer amount for one or more first sub-periods of time for respective ones in the first set of one or more of the respective source institutions based at least in part on the first client account transaction information; selecting at least one respective aggregated deposit account in at least one respective depository institution in a first group comprising one or more of the recipient depository institutions, to which to deposit/transfer or to withdraw/transfer funds, based at least in part on one or more selection rules, wherein the first group comprises one or more recipient depository institutions of a first type; generating transfer data, using the one or more computers, reflecting a transfer of at least one first transfer amount to or from the at least one recipient depository institution that was selected; obtaining second client account transaction information comprising credit information and/or debit information applied to or against respective client accounts for the one or more second sub periods of time for a second set of one or more of the source institutions; obtaining, using the one or more computers, a respective second net transfer amount for the one or more second sub-periods of time for respective ones in a second set of one or more of the source institutions based at least in part on the second client account transaction information, where some or all of the one or more second sub periods of time may be the same as or different from the one or more first sub periods of time, and wherein the first and second sets of one or more of the source institutions may be different, or the same or partially overlap; selecting at least one aggregated deposit account in at least one depository institution in a second group comprising one or more of the recipient depository institutions, to which to deposit/transfer or to withdraw/transfer funds, based at least in part on one or more selection rules, wherein the second group comprises one or more recipient depository institutions of a second type; generating transfer data, using the one or more computers, reflecting a transfer of at least one second transfer amount to the at least one aggregated deposit account selected from the second group of one or more of the recipient depository institutions; allocating, using the one or more computers, amounts of funds from multiple of the client accounts among multiple of the recipient depository institutions, so that the respective balance of funds in each of the aggregated deposit accounts of the multiple of the recipient depository institutions, after taking into consideration the fund transfer amounts for the first and second sub periods of time, will substantially match a sum of the respective balances of funds from the multiple of the respective client accounts allocated to this respective aggregated deposit account; and updating or having updated, using the one or more computers, the one or more electronic databases to reflect the allocating of the amounts of funds of the multiple client accounts to the recipient depository institutions.

In a further embodiment, the first type and/or the second type is based at least in part on an affiliation.

In a further embodiment, the first type and/or the second type is based at least in part on a type of account held thereby.

In a further embodiment, the first type comprises recipient depository institutions holding a government backed insured account in the program, and the second group comprises recipient depository institutions holding at least one non-insured aggregated investment vehicle.

The above and related objects, features and advantages of the present invention, will be more fully understood by reference to the following detailed description of the preferred, albeit illustrative, embodiments, of the present invention, when taken in conjunction with the accompanying figures, wherein:

BRIEF DESCRIPTION OF THE DRAWINGS

FIG. 4 is an exemplary representation of a time sequence for an exemplary method in accordance with one or more embodiments of the invention.

DETAILED DESCRIPTION

Figure 1A:
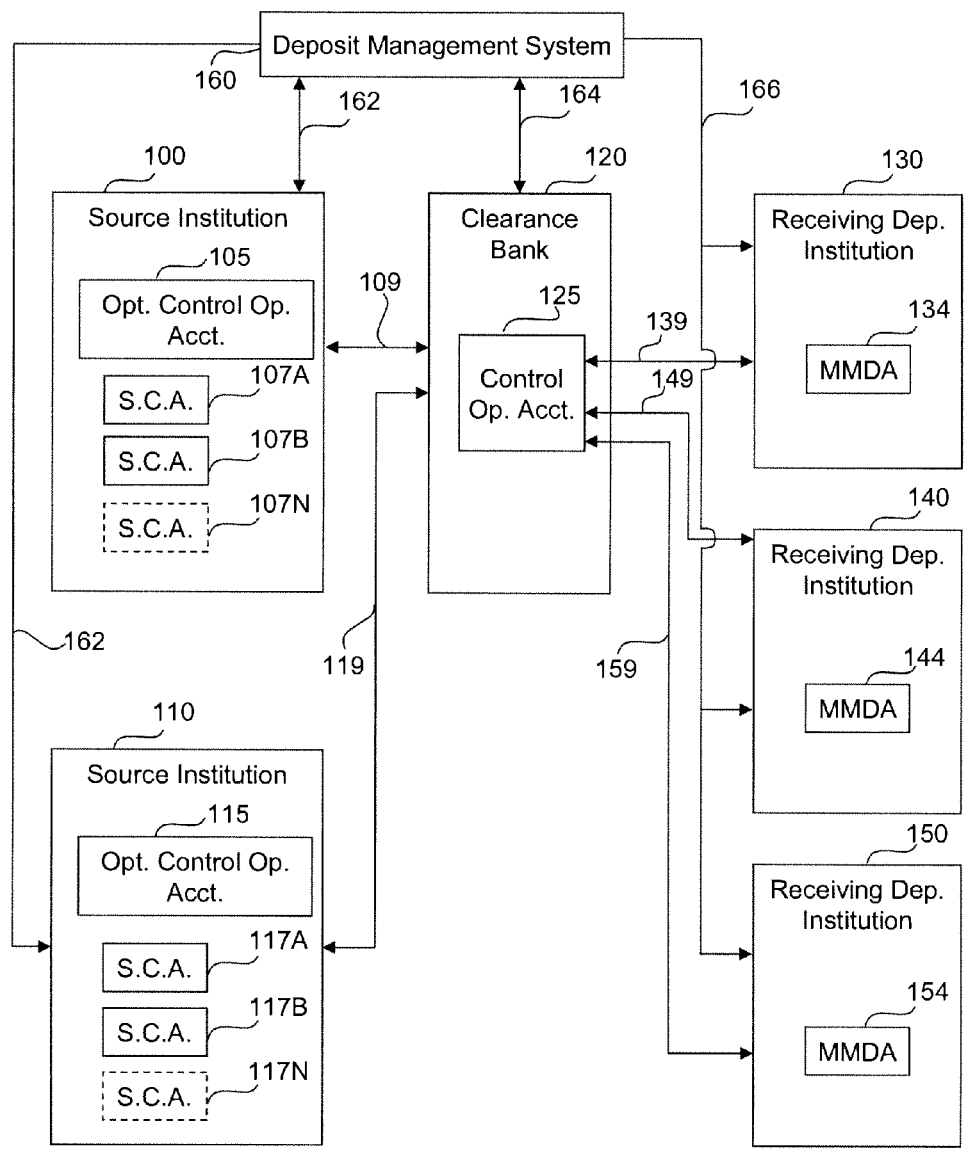
FIG. 1A is a schematic block diagram of an exemplary system in accordance with one or more embodiments of the invention.

The present invention discloses a deposit management system 160, a method, and a program product for implementing a deposit sweep program for accommodating banks and other types of financial entities with early cutoff times for fund movements and/or with varying processing and/or staffing schedules, while permitting fund movements for one or more programs using a method that generates data for transfers by forming depository institutions into groups based at least in part on cutoff times, and/or by forming depository institutions into groups based at least in part on depository institution type and account type held therein. In this system, a deposit sweep program includes source institutions, recipient depository institutions, and intermediaries, among others.

Source institutions may, by way of example, be banks, credit unions, registered investment advisors, broker dealers, asset managers, and other types of financial institutions, to name a few. Typically, the source institutions are the institutions that interact with the clients that are placing or authorizing the respective clients' funds to go into and/or be managed by the system. Note that a source institution can include one or more clearing institutions for other source institutions, investment advisors, and/or intermediaries for other source institutions. These terms will be discussed below.

Recipient depository institutions are typically banks or other types of deposit institutions whose accounts are backed by some form of insurance, such as government-backed insurance, like Federal Deposit Insurance Corporation (FDIC) insurance in the case of banks, or the National Credit Union Share Insurance Fund (NCUSIF) in the case of credit unions. However, note that some recipient depository institutions may hold financial instruments that are not insured.

One or more intermediary institutions may be used to facilitate the movement of funds between the source institution(s) and the recipient depository institution(s), and/or to perform various recordkeeping functions. Such intermediaries may perform record keeping and/or fund transfer functions, and may include a bank or clearance bank through which fund transfers may be facilitated, a clearing firm, an administrator that performs recordkeeping functions and/or provides data to facilitate fund transfers, and/or other entities that perform fund transfer or recordkeeping functions. Note that one or multiple entities may also fulfill a single function or role or multiple functions or roles.

With respect to some types of source institutions, the source institution itself may clear its own client accounts or it may use another entity to clear its client accounts. If a source institution is a clearing entity, it may provide clearing services to other source institutions, such as broker-dealers, banks, financial advisors, to name a few. Such entities for which clearing services are performed by another entity are sometimes referred to as "correspondents." Under some guidelines, when a clearing entity is used to clear funds for one or more correspondents, the funds of the clearing entity and the one or more correspondents may be held together in an aggregated account such as an interest-bearing aggregated money market deposit account or an aggregated demand deposit account. In one or more embodiments, the funds from each different correspondent may be segregated in a separate aggregated account.

In some deposit sweep systems, one entity may play the role of one or more of the above. For example, a source institution, such as a bank, may also be a recipient depository institution. Similarly, a source institution, like a broker-dealer, or a bank, may be affiliated with one or more of the recipient depository institutions. In one or more embodiments, there may be no affiliation between the institutions, or an affiliation between only some of the institutions.

Further, the administrator may also be either a source institution, a recipient depository institution, a clearance bank, or another entity participating in deposit sweep functions. Further, in one or more embodiments one entity may play part of one role and another part of another role. For example, when a bank is an intermediary it may be used to facilitate the transfer of funds, but also may be a source and/or recipient institution. Such a bank, may or may not use a separate record keeper.

Likewise, a particular program may have one source institution or multiple source institutions. Similarly, a particular program may have one recipient depository institution or multiple recipient depository institutions.

A "program" comprises a deposit arrangement to make available government-backed insurance through one or more aggregated accounts, wherein such program can provide government-backed insurance in an amount greater than an insurance limit for funds held in a single depository institution, through the use of a plurality of aggregated deposit accounts, with the aggregated deposit accounts in different program depository institutions. Each program may include one or more insured deposit products, with one or more of the programs having different attributes, such as different insurance levels, different tier options and rates paid, and services. In one embodiment, the rates paid may be determined by such factors as the balance in the client's insured account, or can be determined by the total value of the client's brokerage account, or can be determined by the total value of a group of accounts for a particular household together, or can be determined by relationship pricing based on the number of products a client uses though a source institution (SI) or affiliated source institutions, to name a few. Each source institution may have a plurality of client accounts, S.C.A.'s, that invest in particular products that make up part of a particular program. The client accounts, S.C.A., may be for individuals or corporations or government entities, or any other form of entity. Thus, for example, a source institution may manage a number of programs PROGRAM SI1-1, PROGRAM SI1-2, ... PROGRAM SI1-p, where each client account, S.C.A., of the source institution SI1 invests in at least one of the products under at least one of the programs PROGRAM SI1-1-PROGRAM SI1-p. Examples of different kinds of programs that may be offered, include a program with cash management services, a program for high net worth individuals with a higher minimum balance required, a program paying a lower rate and offering more services, a no frills program with a higher rate and no services where for a fee, the client could get other services, to name a few. Note that in one or more embodiments, a program may also manage some client funds that are held in investment instruments that are not government-backed insured instruments.

Each source institution may have one or more programs of its own, and/or may participate in one or more programs of other institutions. A client may also have one or more of its own programs operating out of one or more source institutions. Each client may participate in one or more programs from a single source institution, or may participate in programs in several different institutions, and/or may participate in one or more of the client's own programs.

The present invention may be used in the context of these exemplary or other fund movement systems.

In the description to follow, the term "client account" refers to an account associated with client funds, such as, for example, consisting of funds of the client designated or determined for management by the deposit management system, to be described.

Referring to FIG. 1A, the present invention generally relates to a system, method and/or program product for administering a deposit sweep program wherein funds are received/swept from or deposited back to one or more source institutions 100, 110, e.g., financial institutions, such as banks, broker-dealers, financial advisors, intermediaries and/or other financial institutions, under instruction of a deposit management system 160 ("DMS"), to or from government-insured interest-bearing aggregated deposit accounts in one or more recipient depository institutions, e.g., banks 130-150 participating in the deposit sweep interchange program. In one or more embodiments, a portion of the client account funds may also be deposited in other investment vehicles held in or directed by another respective recipient depository institution. Note that in one or more embodiments, a respective source institution may hold one or more of these aggregated accounts and may also function as a recipient depository institution.

The deposit management system 160, comprises one or more computers, which can be configured to perform one or more of the following tasks:

(a) obtaining information regarding transactions applied to client accounts at source institutions 100, 110 in a particular time period, such as over a particular time period, such as a range of hours, day, week, month or the like. Such information may be in the form of detailed individual transactions, summary transactions or combinations thereof. Transactions could include sweeps, checks, transfers to cover, e.g., securities transactions or margin accounts, debit card transactions, credit card transactions, on-line bill paying transactions, touch tone bill paying data, ACH transactions, wire transactions, to name a few. In one or more embodiments, such information may be obtained directly by processing one or more transactions, or indirectly by other means.

In embodiments, such information may be received electronically in the form of a sweep file which can contain either detailed or summary information for each client account which has activity in a given time period. In embodiments, such information may be received in person, over the telephone, by fax or other distribution means, and entered by keying or scanning such information. One or more items of information may be obtained by one or more of these exemplary methods.

(b) obtaining net transfer information associated with the movement of funds from and/or to source institutions, clearance institutions and/or recipient institutions. Such net transfer information may be received electronically either in connection with a sweep file and/or separately, received in person, over the telephone, by fax or other distribution means and entered by keying or scanning such information, and/or by calculating or by verifying the net transfer information by the deposit management system 160. The net transfer information can reflect one net transfer per institution, and/or multiple net transfers reflecting each separate transfer to be conducted between institutions. For example, a net transfer could reflect a single net transfer between a source institution and a clearance institution to reflect transactions occurring during a particular time period, such as a range of hours, day, week, month or the like. A net transfer could also or alternatively reflect a plurality of net transfers between a clearance institution and different recipient institutions associated with a particular transfer of funds relating to transactions occurring during one or more particular time periods.

(c) obtaining selection and transfer information associated with the allocation of funds among various recipient institutions. The selection and transfer information may be received electronically either in connection with a sweep file and/or separately, received in person, over the telephone, by fax or other distribution means and entered by keying or scanning such information, and/or may be calculated and/or may be verified by the deposit management system 160. The selection and transfer information may be calculated based at least in part on one or more criteria. Examples of such criteria are set forth in U.S. Pat. No. 7,752,107, and U.S. application Ser. No. 12/638,544, filed on Dec. 15, 2009, which are hereby incorporated by reference in their entirety. The selection and transfer information may be used in generating the net transfer information to and/or from recipient depository institutions.

(d) generating recommended and/or actual withdrawal/transfer amount(s) and/or instructions and/or deposit/transfer amount(s) and/or instructions to and/or from source institutions and/or recipient institutions. In embodiments, the system may generate recommended and/or actual instructions to be carried out by source institutions, agents of source institutions, intermediaries and/or others. In embodiments, intermediaries may up load or otherwise provide instructions to be approved, executed and/or performed by others.

(e) obtaining allocation information regarding funds held in particular aggregated deposit accounts at recipient depository institutions associated with particular client accounts. In one or more embodiments, the allocation information may be calculated based at least in part on one or more criteria. In embodiments, the recordkeeper performs such allocations in accordance with one or more parameters.

As noted, each of a plurality of these recipient depository institutions 130-150$n$ in the deposit sweep management system 160 holds one or more interest-bearing aggregated deposit accounts 134, 144, 154 (for example, an aggregated money market deposit account, e.g., MMDA, for holding funds associated with a plurality of clients accounts in the program). In embodiments, these aggregated deposit accounts can be insured, for example with government-backed insurance, such as Federal Deposit Insurance Corporation (FDIC) insurance in the case of, e.g., a bank, or National Credit Union Share Insurance Fund (NCUSIF) insurance in the case of, e.g., a credit union, to name a few.

In an exemplary embodiment shown in FIG. 1A, information for a plurality of client accounts (107A, 107B, . . . 107N) associated with a source institution 100 is held in one or more databases, with each of a plurality of the respective client accounts held on behalf of different clients and comprising client funds managed by a program. In one or more embodiments, the deposit management system 160 may maintain electronic records corresponding to client accounts (107A, 107B, . . . 107N) in the one or more databases. In one or more embodiments, the respective source institution 100 has a control operating account. In one or more embodiments, the control operating account 105 may be at the respective source institution 100. Alternatively or in addition, in one or more embodiments, the control operating account for the source institution 100 may be at another financial institution, such as a clearance account 125 held in a clearance bank 120. In one or more embodiments, funds flow in and out of the client accounts (107A, 107B, . . . 107N), via the control operating account 105 and/or via control operating account 125. Alternatively, in one or more embodiments, the funds in one or more of the client accounts may flow directly between institutions without an internal and/or an external control operating account. In one or more embodiments, fund flows may be via a combination of one or more control operating accounts and directly between institutions without using an external control operating account.

Fund movement data may be received by the deposit management system 160, via a sweep file comprising fund transfer data swept from or to one or more of client accounts of a source institution 100, or via fund transfer data from another entity (e.g., a payment or credit vendor such as a debit card or credit card processor), or from a client, or from a fund reallocation determined by or for the deposit management system 160, or from any other source. The fund movement data may be received electronically by wire, or via Facsimile or telephone, for example, so that the data may need to be manually keyed, optically scanned, or otherwise entered into the deposit management system 160, and/or it may be verified and/or in some cases, calculated. The fund transfers may comprise data for individual check deposit data, wire deposit data, electronic ACH deposit data, electronic debit card transaction files, electronic credit card transaction files, check presentment data, ACH debit data, touch tone bill paying data, Internet bill paying data, a sweep file, and/or a net of a plurality of deposit/transfers for one client account or multiple client accounts, and/or a net of one or more of withdrawals/transfers for one client account or multiple client accounts, and/or a net of one or more deposits/transfers and one or more debits/transfers from one client account or multiple client accounts, to name a few.

Figure 1B:
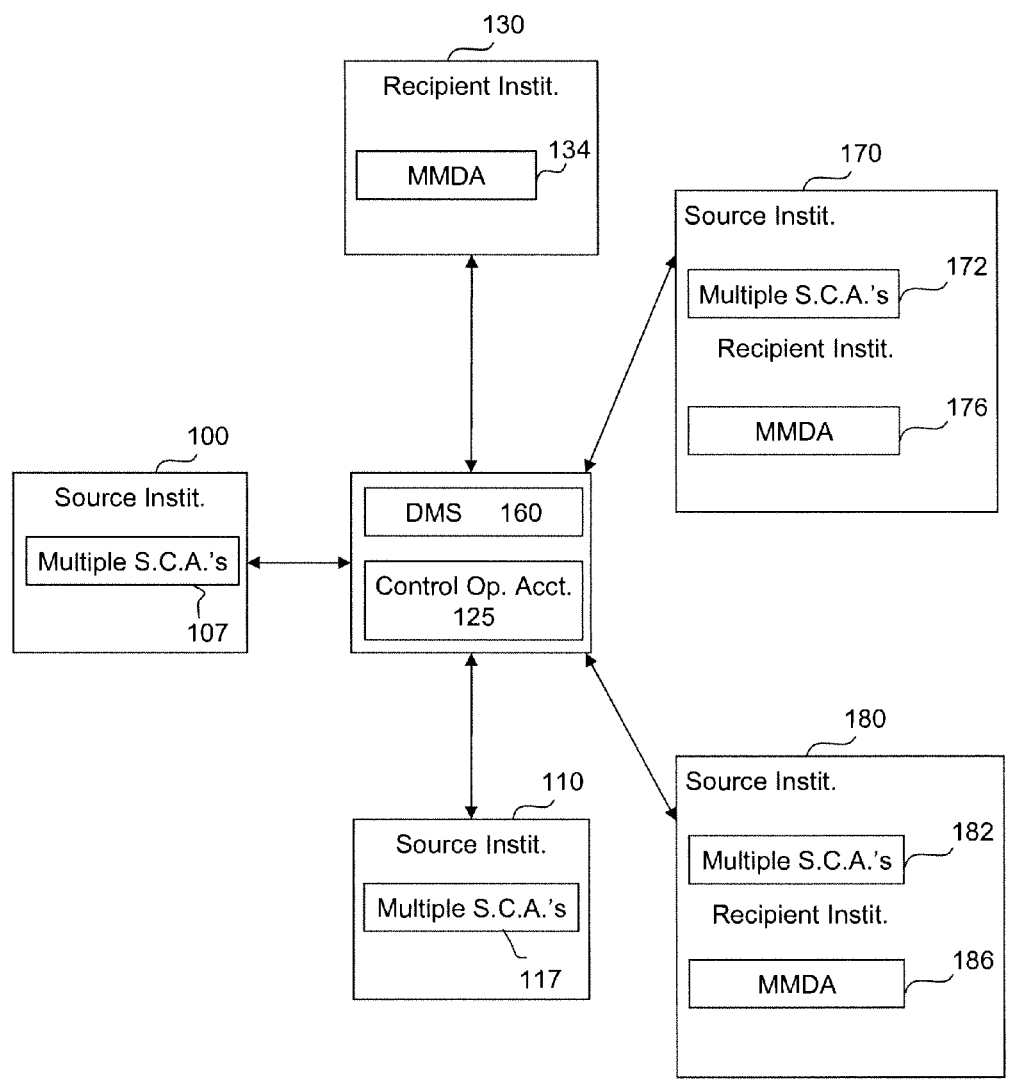
FIG. 1B is a schematic block diagram of another exemplary system in accordance with one or more embodiments of the invention.

FIG. 1B illustrates another exemplary embodiment of the overall system in a hub and spoke context, for ease of explanation. At the center or hub is the deposit management system 160, and a control operating account 125. The deposit management system 160 and control operating account 125 could be at the same or different institutions, consistent with the present invention. The source institutions 100 and 110 are illustrated as spokes, with each source institution comprising client accounts, as reflected in FIG. 1A. One or more of the source institutions may optionally also include a control operating account associated therewith in one or more embodiments. The control operating account associated with the respective source institution may be at the respective source institution, or at another institution affiliated with the source institution, or at a different institution entirely. A source institution may also be the same as or affiliated with one or more institutions associated with the deposit management system 160, the control operating account 125, or the record keeper for the system. The recipient depository institution 130 with its MMDA 134, is shown as another spoke in the figure. Institutions 170 and 180 are illustrated as yet other spokes in the figure. Institutions 170 and 180 operate as both source institutions in some fund transfers, and recipient depository institutions in other fund transfers. Institution 170 comprises multiple client accounts 172, and an MMDA 176. Likewise, institution 180 comprises multiple client accounts 182, as well as an MMDA 186. The deposit management system 160 may keep electronic records associated with the multiple client accounts 172, 182, and the like.

Other forms of deposit sweep systems may also be used with the present invention.

A deposit management system 160 may be established in some embodiments with a system processing timeline for withdrawals/transfers that can be configured to meet requirements of deposit management system operations and may be amenable to the processing/business hours of as many other financial and recordkeeping institutions as possible with varying cutoff times and/or across various regions/time zones. In one or more embodiments, the selection of recipient depository institutions, the timing of communicating the transfer data, and the determination of deposit/transfer amounts and/or withdrawal/transfer amounts to and from those selected recipient depository institutions may be based, at least in part, on a time of receipt of the fund transfer data, and/or on the respective fund transfer cutoff times for respective recipient depository institutions and/or source institutions or other entities involved in the fund transfer, and/or the type of funds or accounts involved (e.g., municipal funds), and/or the affiliation and/or clearing designation for the source institution sending the data, to name a few. In one or more embodiments, the selection of recipient depository institutions and the determination of deposit/transfer amounts and/or withdrawal/transfer amounts to and from those selected recipient depository institutions may be based, at least in part, on reciprocity. Reciprocity, in this context, means that the deposit management system 160 takes into consideration the fact that the prospective recipient depository institution has sent deposits (when operating as a source institution) into the program, and/or takes into account the amount of source fund deposits that the prospective recipient depository institution (when operating as a source institution) has sent to the program, to determine the fact and/or amount of the deposit/transfer or withdrawal/transfer. This reciprocity consideration may be based at least in part on some or all of the funds held in other recipient depository institutions that originated from client accounts of the respective recipient depository institution (when functioning as a source institution). Alternatively, the reciprocity may be based at least in part on funds of only some client accounts or types of client accounts of the recipient depository institution, such as municipal, state, federal or other governmental entity client accounts, or accounts of local businesses, in the recipient depository institution, and sourced to the program.

The present invention may be useful for facilitating deposit/transfer and/or withdrawal/transfer of fund amounts to and from the program, for purposes such as servicing client account withdrawals/transfers and/or deposit/transfers, and/or for fund reallocation determined by the deposit management system or another entity. It may be advantageous where the deposit/transfer and/or withdrawal/transfer data may be received close to a particular cutoff time for the respective recipient depository institution, or for the source institution, or other entity that may be involved in the fund transfer, such as an entity in the recordkeeping or fund transfer chain, that may be subject to an early cutoff or the deposit management system 160, or the particular program. Thus, in one or more embodiments, the invention may be useful in extending the program's transaction and settlement time(s) (trade time(s)) with the source institutions and other entities.

Accordingly, an advantage of some embodiments of the deposit management system of the invention may be a successful and timely movements of funds exchanged between institutions. Such timely movement of funds may facilitate local processing schedules and staffing schedules, that might be caused by different time zones, and/or for other reasons. Such timely movement of funds may facilitate receipt of instructions at a time before local cut-off times for wires (both outgoing and incoming), or at a time before cutoff for settlement with the Federal Reserve or correspondent bank for deposits and withdrawals and other transfers, or in some cases, before a time in which the institution can invest the funds. Such timely movement of funds may facilitate insuring deposits at intended recipient or source institutions. Such timely movement of funds may, in one or more embodiments, facilitate settlement functions with one or more of the source financial institutions or recipient depository institutions or other entities involved in the fund transfer operation or recordkeeping. Such timely movement of funds may facilitate customer withdrawals, deposits, and reallocation of funds, in the program, and may facilitate limiting a use of 'automatic' withdrawals (withdrawals that would count against the 6 withdrawal limit per month imposed by Federal Banking Regulations) from the interest-bearing aggregated deposit accounts in recipient depository institutions.

In one or more embodiments, the system may establish or have established or require establishment of an interest-bearing government-backed (e.g., FDIC, NCUSIF, etc.) insured aggregated deposit account, such as an aggregated money market deposit account (MMDA) at one or more depository institutions.

The present invention can be used in various kinds of deposit interchange programs and deposit sweep programs, as well as programs hereinafter developed. The present invention can also be used in the demand deposit marketplace, with insured deposit bank sweep products.

In some situations, some or all of the depository institutions in a program may be subject to an earliest depository institution cutoff time, e.g., 11 am for one recipient depository institution, with the balance in the one or more interest-bearing aggregated deposit accounts held in these respective depository institutions in the program locked-in at this earliest cutoff time, despite subsequent client activity. This restriction may be a problem because there may continue to be client activity after the cutoff time of this earliest depository institution, particularly for depository institutions participating in the program that are located in different time zones, e.g., the Pacific time zone, for example.

In one or more further embodiments of the invention, multiple fund transfers may be made at different times of a day or other period, with an allocation to various recipient depository institutions for these fund transfers based, at least in part, on respective cutoff times of the respective depository institutions. In one or more embodiments, depository institutions may be grouped into two or more groups that are formed, based at least in part, on their respective cutoff times. In one or more embodiments, the groups may be based at least in part on time zones of the depository institutions. For example, a first group may comprise all recipient depository institutions in a program, a second group may comprise depository institutions in Midwest, Mountain and Pacific time zones, and a third group may comprise depository institutions in the Pacific time zone, e.g., the recipient depository institutions in one or more of the groups may be selected so that all of the depository institutions in the respective group are in the same time zone. Note that some depository institutions in the eastern time zone may be included in the second or third groups if they have late cutoff times. An advantage to one or more embodiments of this type may be that some or all of the depository institutions in the program may no longer be subject to an earliest depository institution cutoff time.

In one or more embodiments, one or more of the respective groups of depository institutions may have a respective desired minimum cumulative capacity to accept deposits from other depository institutions. For example, a critical mass of capacity to accept deposits based at least in part on depository institution maximum caps may be required in one or more embodiments. This critical mass amount of capacity may be predetermined based on one or more parameters, such as historical data and/or maximum and/or minimum caps, or may be determined on the fly, based at least in part on current banking conditions. For example, a particular group of Pacific time zone depository institutions may be required to take deposits from New York or other eastern time zone depository institutions after the cutoff time for the New York depository institutions, or after an eastern group cutoff time, as well as to take deposits from its own client accounts and/or from other depository institutions in the same time zone. The ability to accept deposits at or above a certain level late in the day may be advantageous for late day municipal or state or federal or other governmental entity fund transfers, and, as noted, may be adjustable. In one or more embodiments, the deposit management system 160 may reset one or more maximum caps in order to meet a determined capacity requirement for a given period of time.

Figure 3A:
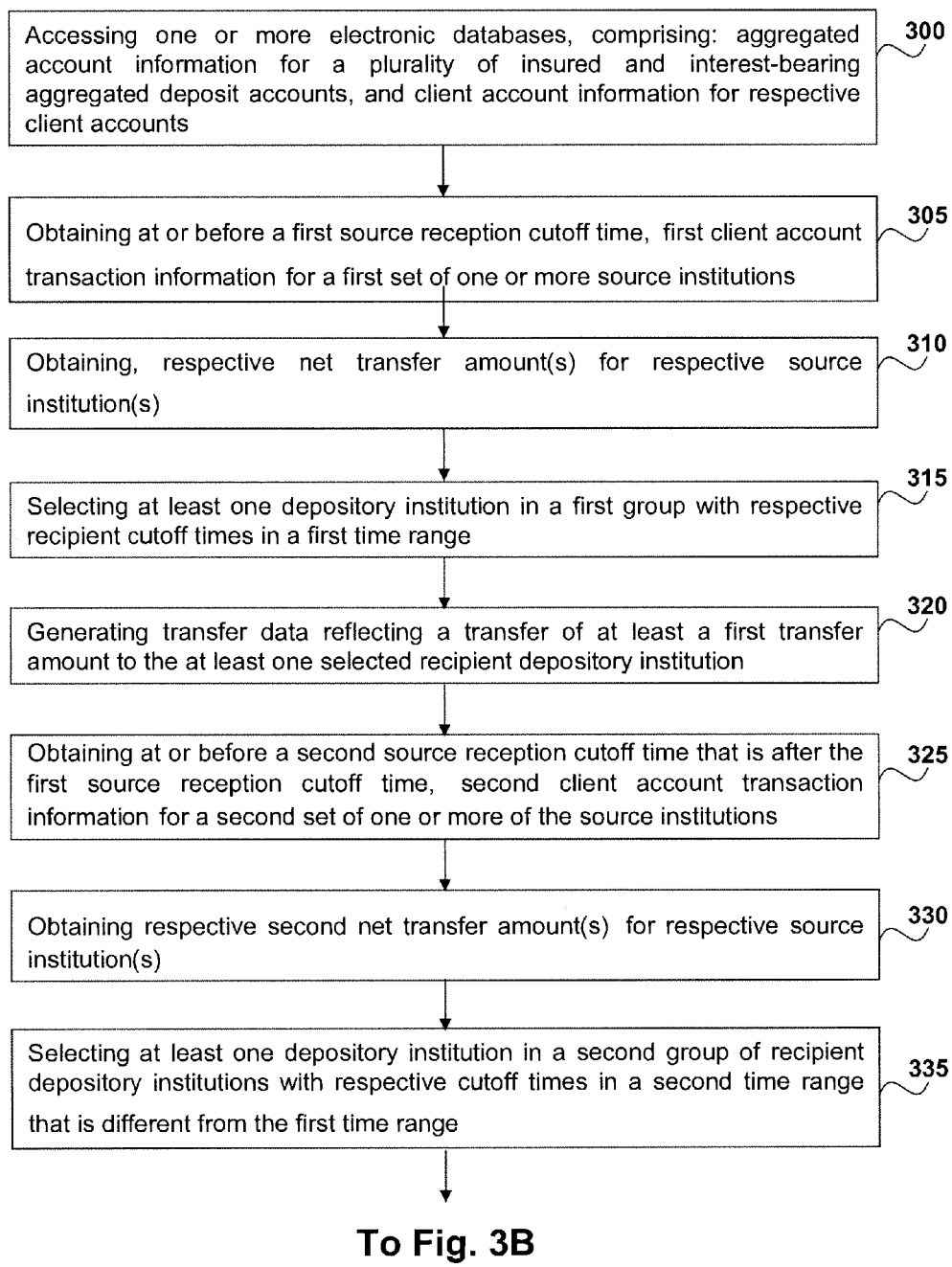
FIGS. 3A and 3B are a schematic flow chart of an exemplary method in accordance with one or more embodiments of the invention.
Figure 3B:
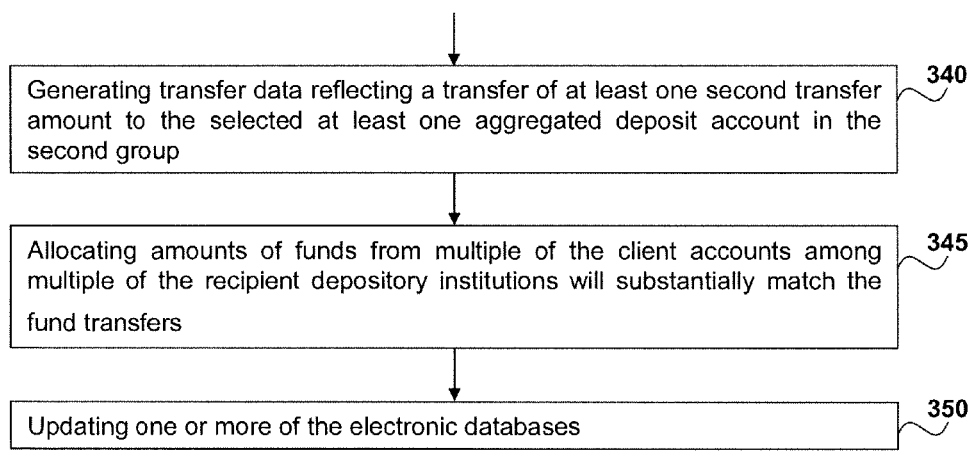

FIG. 3 illustrates one embodiment of a method for allocating fund transfers to different groups of depository institutions based at least in part on depository institution cutoff times. Block 300 represents an operation of accessing, using one or more computers, one or more electronic databases, stored on one or more computer-readable media. In one or more embodiments, the one or more electronic databases comprise aggregated account information for a plurality of government-backed insured and interest-bearing aggregated deposit accounts held in a plurality of recipient depository institutions, comprising a balance of funds held in each of the aggregated deposit accounts, wherein funds from a plurality of client accounts are aggregated with funds of other client accounts in the aggregated deposit accounts. Each of multiple of the depository institutions may have one or more respective cutoff times. The aggregated account information may further comprise, in one or more embodiments, information on identification information for the respective depository institution holding the aggregated deposit account. The one or more databases may further comprise, in one or more embodiments, maximum capacities (max cap) and/or minimum capacities (min cap) for one or more of the recipient depository institutions. These caps may be set by the program administrator or by the institution itself, or by another entity, and, as noted, may be adjustable. Note that in one or more embodiments, the government backed insurance may be Federal Deposit Insurance Corporation insurance.

In one or more embodiments, the one or more databases may further comprise source institution information comprising an amount of funds sourced to a program from each of a plurality of respective source institution, wherein multiple of the source institutions may also be depository institutions and/or are affiliated with one or more of the depository institutions. The source funds of a respective source institution comprises funds of the institution held in one or more of the aggregated deposit accounts in the other recipient depository institutions in the program, and/or may be held in other investment vehicle accounts managed by the deposit management system 160 (in some embodiments, it may also include funds of its client accounts held in it own aggregated deposit accounts). In one or more embodiments, the one or more databases may also maintain information on various source institution and/or depository institution cutoff times (e.g., processing cutoff times for all or for some accounts, deposit and/or withdrawal cutoff times, a set of multiple cutoff times for a given source institution or a given depository institution, e.g., an 11 am cutoff, a 1 pm cutoff time and a 4 pm cutoff time for the given source institution, to name a few).

In one or more embodiments, the one or more databases may further comprise client account information for each of a plurality of the respective client accounts. The client account information may comprises one or more or all of: (a) client account information for each of a plurality of the respective client accounts comprising at least a respective balance of funds from the respective client account held in each of one or more recipient depository institutions in the aggregated deposit accounts holding funds of the respective client account; (b) deposit/transfer and/or withdrawal/transfer data for the respective client account, which may include individual credit and debit data and/or nets of such credit and debit data for the respective client account; and (c) a respective balance of funds of the client managed in the program.

Block 305 represents an operation of obtaining at or before a first source reception cutoff time first client account transaction information comprising credit information and/or debit information applied to or against respective client accounts for one or more first sub periods of time for a first set of one or more of the source institutions, and/or other transfer information. Note that the source reception cutoff time means the time at which the system 160 desires to receive the client account transaction data from the source in order to process a transfer for a particular computer run. This means for example, that client account transaction data received from a source, for example, at or before 11 am, may be processed in a 12 noon computer run, and client account transaction information received at of before 1 pm, may be processed in a 2 pm computer run. Accordingly, in one or more embodiments, there may be multiple source reception cutoff times, e.g., an 11 am cutoff, a 1 pm cutoff time, and a 4 pm cutoff time, and these source reception cutoff times may be applied for all source institutions, or only some source institutions, or for only specific types of source institutions, and/or for all client account data, or for only specific client accounts, and/or for only specific types of client accounts, for example. Client account transaction data from the source received after 11 am may be processed in a subsequent computer run. The client account transaction information for each of multiple of the client accounts may comprise information regarding transactions applied to client accounts at source institutions 100, 110, such as over a particular time period, such as a range of hours, days, weeks, month or the like. Such information may be in the form of detailed individual transactions, summary transactions or combinations thereof. Transactions could include sweeps, checks, transfers to cover, e.g., securities transactions or margin accounts, debit card transactions, credit card transactions, on-line bill paying transactions, touch tone bill paying data, ACH transactions, wire transactions, to name a few. In one or more embodiments, such information may be obtained directly by processing one or more transactions, or indirectly by other means. In one or more embodiments, such information may be received electronically in the form of a sweep file which can contain either detailed or summary information for each client account which has activity in the given time period. In one or more embodiments, such information may be received in person, over the telephone, by fax or other distribution means, and entered by keying or scanning or other means of entry of such information. One or more items of information may be obtained by one or more of these exemplary methods. The other transfer information may comprise information generated by the deposit management system 160 or another entity as part of a fund reallocation, or may be generated by another entity, and may comprise depository institution opt-in or opt-outs, depository institution minimum caps and/or maximum caps, the addition or deletion of depository institutions based on various parameters, to name a few. This operation is represented in the Timeline of FIG. 4 by T1.

Block 310 represents an operation of obtaining, using the one or more computers, a respective first net transfer amount for one or more first sub-periods of time for respective ones in the first set of one or more of the respective source institutions based at least in part on the first client account transaction information. The respective net transfer amount for a respective source institution may be comprised of a net of withdrawal/transfer amounts and fund deposit/transfer amounts from the respective source institution that may be accumulated and netted. The net transfer amount may be calculated in whole or in part, using the one or more computers of the deposit management system 160, and/or may be received through one or more electronic communication networks, and/or may be received manually in person, or via facsimile, or by telephone, or by mail, and keyed and/or scanned into the system. This operation may be represented in the Time line of FIG. 4 as taking place at time T2.

Block 315 represents an operation of selecting at least one respective aggregated deposit account in one or more of the respective depository institutions in a first group of one or more of the recipient depository institutions, to which to deposit/transfer or to withdraw/transfer funds, based at least in part on one or more selection rules, wherein the first group comprises one or more of the recipient depository institutions with respective recipient cutoff times in a first time range. In one or more embodiment, one or more of the recipient cutoff times may vary from time period to time period. In one or more embodiments, the first group may comprise just one depository institution, or may comprise multiple depository institutions, or may comprises all of the depository institutions in the program. This operation may be represented in the Time line of FIG. 4 as taking place at time T3. In one or more embodiments, this operation may be performed manually.

In one or more embodiments, one of the selection rules may comprise ensuring that the selected one or more recipient depository institutions from the group have a capacity to accept deposit/transfers and/or withdrawal/transfers at or above a given level. In one or more embodiments, this operation may be performed by comparing one or more of the respective maximum caps of the prospective recipient depository institutions in the group to a required capacity for the respective transfer. This required capacity may be a predetermined amount, and/or may in part be an amount determined on the fly based at least in part on current transfer activity.

In one or more embodiments, one of the selection rules may comprise obtaining a partial or substantially full reciprocity for source contributions of funds to the program, as described above. Another selection rule may comprise maintaining an amount of funds of a particular client account in a respective recipient depository institution at or below an insurance limit, or relative to a prescribed amount or percentage to be held in a respective depository institution. Another selection rule may be based at least in part on client account instructions. Another rule may comprise making a selection based on when transfer information is received and/or processed relative to a cutoff time of the recipient depository institutions for fund transfers, and/or relative to one or more time threshold times, and/or relative to the cutoff times of one or more other of the depository institutions or entities involved in the fund transfer chain, and/or a processing receipt cutoff time of the deposit management system 160 or a particular program. Another selection rule may comprise selecting a recipient depository institution for a withdrawal/transfer or a deposit/transfer in order to comply with a respective minimum cap and/or a respective maximum cap associated in the one or more databases with the respective interest-bearing aggregated deposit accounts or associated with one or more of the respective recipient depository institutions. Another selection rule may comprise minimizing a number of withdrawals/transfers and/or deposits/transfers in a month period to hold balances held in one or more of the interest-bearing aggregated deposit accounts substantially stable for some period of time. Another selection rule may comprise complying with a Federal Banking regulation 6 withdrawal/ transfer limit per month for one or more of the respective depository institutions. Another selection rule may comprise a selection or de-selection of one or more of the recipient depository institutions by one or more of the clients and/or the source institutions, and/or by the depository institutions, and/or by another entity. In one or more embodiments, this operation may be performed manually.

Block 320 represents an operation of generating transfer data reflecting a transfer of at least a first transfer amount to or from the at least one recipient depository institution that was selected. In one or more embodiments, the transfer of the first transfer amount may be directly to or from one or more other institutions, or indirectly via one or more clearing accounts of one or more clearance institutions. This operation is represented in the Timeline of FIG. 4 as T4

In one or more embodiments, a transfer data generator is provided for generating recommended and/or actual withdrawal/transfer amount(s) and/or instructions and/or deposit/transfer amount(s) and/or instructions, to and/or from source institutions and/or recipient institutions. In embodiments, the system may generate recommended and/or actual instructions to be carried out by source institutions, agents of source institutions, intermediaries and/or others. In embodiments, intermediaries may up-load or provide instructions to be approved, executed and/or performed by others.

In one or more embodiments, the transfer data may be presented to the respective selected at least one depository institution in a manner that does not count against the 6 withdrawal limit imposed by Federal Reserve regulations, e.g., using one or more of the methods of in person, or by mail, or by messenger, or by telephone and distributed by mail, or by automated teller machine, or a combination thereof. Alternatively, the transfer data may be communicated electronically. In one or more embodiments, the instructions for a deposit/transfer amount to or a withdrawal/transfer amount from the interest-bearing aggregated deposit account may be provided by email or Fax or wire directly to the respective one depository institution, or to a messenger service for messenger delivery to the at least one respective one recipient depository institution selected. Alternatively, the instructions for any of the deposits/transfers and/or withdrawals/transfers may be generated manually or generated by computer, and communicated to a source institution, or to an intermediary institution, or to another institution, that may, in turn, send the instructions to the selected at least one respective recipient depository institution, either directly or via a messenger.

The amount of the first transfer amount may be determined based at least in part on one or more parameters. The first transfer amount may be caused by a single net transfer amount to or from one source institution, or may be caused by multiple net transfer amounts to and/or from the same source institution that are netted to obtain the first transfer amount. Alternatively, the first transfer amount may be obtained by a netting of respective net transfer amounts to and/or from multiple different source institutions. The amount for the at least one first transfer for the selected at least one recipient depository institution may be received electronically either in connection with a sweep file and/or separately, and/or may be received in person, over the telephone, by fax or other distribution means, and entered by keying or scanning such information, and/or the at least one first transfer amount may be calculated based at least in part on one or more of the respective net transfer amounts, and/or the at least one first transfer amount may be verified, by the deposit management system 160. If the transfer information is calculated, it may be calculated based at least in part on one or more parameters. As noted above, one of the parameters for determining the amount may comprise ensuring that the selected one or more recipient depository institutions from the group have a capacity to accept deposit/transfers and/or withdrawal/transfers at the level required for the particular transfer. This operation may be performed by comparing respective maximum caps of the prospective one or more recipient depository institutions, either singly or in combination, to a required capacity for the respective transfer. This required capacity may be a predetermined amount, and/or may in whole or on part be an amount determined on the fly based at least in part on current transfer activity. Examples of other such parameters are set forth in U.S. Pat. No. 7,752,107, and U.S. application Ser. No. 12/638,544, filed on Dec. 15, 2009, which are hereby incorporated by reference in their entirety. As noted, such one or more parameters may be based at least in part on obtaining a target reciprocity for one or more source institutions, and/or based at least in part on complying with maximum caps and/or minimum caps, and/or to comply with client and/or source instructions regarding amounts or percentages to be held in one or more of the recipient depository institutions, and/or to stay within insurance limits, and/or to minimize transfer activity for one or more of the recipient depository institutions, to name a few.

Block 325 represents an operation of obtaining at or before a second source reception cutoff time that is after the first source reception cutoff time, second client account transaction information comprising credit information and/or debit information applied to or against respective client accounts for one or more second sub periods of time for a second set of one or more of the source institutions. This step may be similar to the operation of block 305, but from a second set of one or more of the source institutions. In one or more embodiments, one or more of the second sub periods of time may be the same as the one or more first sub periods of time. In one or more embodiments, all of the second sub periods of time may be different from the one or more first sub periods of time. In one or more embodiments, the first and second sets of one or more of the source institutions may be different, or the same, or may partially overlap. This operation is represented in the Timeline of FIG. 4 as T5.

Block 330 represents an operation of obtaining, using the one or more computers, a respective second net transfer amount for the one or more second sub-periods of time for respective ones in a second set of one or more of the source institutions based at least in part on the second client account transaction information.

How the respective second net transfer amount(s) are obtained, as noted above, is not limiting on the invention. This data may be received from one or more respective source financial institutions via a network transmission, or via facsimile, or by telephone, or by mail, or in person, and then keyed or scanned or otherwise entered into the system, or confirmed, and/or it may be calculated in whole or in part by the deposit management system 160 to effect redistributions among the recipient depository institutions, and/or it may be received from another entity. This operation may be represented in the Time line of FIG. 4 as taking place at time T6.

Block 335 represents an operation of selecting at least one aggregated deposit account in at least one of the recipient depository institutions in a second group of one or more of the recipient depository institutions, to which to deposit/transfer or to withdraw/transfer funds, based at least in part on one or more selection rules, wherein the second group comprises one or more recipient depository institutions with respective cutoff times in a second time range that is different from the first time range. In one or more embodiments, the first and second time ranges could start at the same time, but the second time range may end at a later time than the first time range. In one or more embodiments, the first and second times ranges have different time lengths. In one or more embodiments, the first and second times ranges have the same time length. In one or more embodiments, the first and second times ranges overlap. In one or more embodiments, the first and second time ranges do not overlap, e.g., the first time range of recipient cutoff times ends before a beginning of the second time range of recipient cutoff times. In one or more embodiments, at least one of the recipient depository institutions is in at least two of the groups of depository institutions. In one or more embodiments, none of the recipient depository institutions in the first group is in the second group. The selection operation is represented in the Timeline of FIG. 4 by T7.

In one or more embodiments, one of the selection rules may comprise ensuring that the selected one or more recipient depository institutions from the group have a capacity to accept deposit/transfers and/or withdrawal/transfers. In one or more embodiments, this operation may be performed by comparing a respective maximum cap of the prospective one or more recipient depository institutions to a required capacity for the respective transfer. This required capacity may be a predetermined amount, and/or may in whole or in part be an amount determined on the fly based at least in part on current transfer activity.

In one or more embodiments, one of the selection rules may comprise obtaining a partial or substantially full reciprocity for source contributions of funds to the program, as described above. Another selection rule may comprise maintaining an amount of client account funds in a respective recipient depository institution at or below an insurance limit, or relative to a prescribed amount or percentage to be held in a respective depository institution. Another selection rule may be based at least in part on client account instructions. Another rule may comprise making a selection based on when transfer information is received and/or processed relative to a cutoff time of the recipient depository institutions for fund transfers, and/or relative to one or more time threshold times, and/or relative to the cutoff times of one or more other of the depository institutions or entities involved in the fund transfer chain, and/or a processing receipt cutoff time for the deposit management system 160 and/or a particular program. Another selection rule may comprise selecting a recipient depository institution for a withdrawal/transfer or a deposit/transfer in order to comply with respective minimum caps and/or respective maximum caps associated in the one or more databases with the respective insured and interest-bearing aggregated deposit accounts or associated with one or more of the respective depository institutions. Another selection rule may comprise minimizing a number of withdrawals/transfers and/or deposits/transfers in a month period to hold balances held in one or more of the interest-bearing aggregated deposit accounts substantially stable for some period of time. Another selection rule may comprise complying with a Federal Banking regulation 6 withdrawal/transfer limit per month for one or more of the respective depository institutions. Another selection rule may comprise a selection or de-selection of one or more of the recipient depository institutions by one or more of the clients and/or the source institutions, and/or by the depository institutions, and/or by another entity. In one or more embodiments, this operation may be performed manually.

Block 340 represents an operation of generating transfer data, using the one or more computers, reflecting a transfer of at least one second transfer amount to the at least one aggregated deposit account selected from the second group of one or more of the recipient depository institutions. This operation may be represented in the Time line of FIG. 4 as taking place at time T8.

In one or more embodiments, the transfer data may comprise presentation to the respective at least one depository institution in a manner that does not count against the 6 withdrawal limit imposed by Federal Reserve regulations, e.g., using one or more of the methods of: in person, or by mail, or by messenger, or by telephone and distributed by mail, or by automated teller machine, or a combination thereof. Alternatively, the transfer data may be communicated electronically. In one or more embodiments, the instructions for a deposit/transfer amount to and/or a withdrawal/transfer amount from the interest-bearing aggregated deposit account may be provided by email or Fax or wire directly to the respective at least one depository institution selected, or to a messenger service for messenger delivery to the respective at least one recipient depository institution selected. Alternatively, the instructions for any of the withdrawals/transfers may be generated manually or generated by computer, and communicated to a source institution, or to an intermediary institution, or to another institution, that may, in turn, send the instruction to the at least one respective recipient depository institution selected, either directly or via a messenger.

The amount of the at least one second transfer amount may be determined based at least in part on one or more parameters. The second transfer amount may be caused by a single net transfer amount to or from one source institution, or may be caused by multiple net transfer amounts to and/or from the same source institution that are netted to obtain the first transfer amount. Alternatively, the second transfer amount may be obtained by a netting of respective net transfer amounts to and/or from multiple different source institutions. The amount for the at least one second transfer for the selected at least one recipient depository institution may be received electronically either in connection with a sweep file and/or separately, and/or may be received in person, over the telephone, by fax or other distribution means, and entered by keying or scanning such information, and/or the at least one second transfer amount may be calculated in whole or in part based at least in part on one or more of the respective net transfer amounts, and/or the second transfer amount may be verified, by the deposit management system 160. If the transfer information is calculated, it may be calculated based at least in part on one or more parameters. As noted above, one of the parameters for determining the amount may comprise ensuring that the selected one or more recipient depository institutions from the group have a capacity to accept deposit/transfers and/or withdrawal/transfers at a level required for the particular transfer. This operation may be performed by comparing one or more respective maximum caps of the prospective recipient depository institutions in the second group to a required capacity for the respective transfer. This required capacity may be a predetermined amount, and/or may in part be an amount determined on the fly based at least in part on current transfer activity. Examples of other such parameters are set forth in U.S. Pat. No. 7,752,107, and U.S. application Ser. No. 12/638,544, filed on Dec. 15, 2009, which are hereby incorporated by reference in their entirety. As noted, such one or more parameters may be based at least in part on obtaining a target reciprocity for one or more source institutions, and/or based at least in part on complying with maximum caps and/or minimum caps, and/or to comply with client and/or source instructions regarding amounts or percentages to be held in one or more of the recipient depository institutions, and/or to stay within insurance limits, and/or to minimize transfer activity for one or more of the recipient depository institutions, to name a few.

Block 345 represents an operation of allocating, using the one or more computers, amounts of funds from multiple of the client accounts among multiple of the recipient depository institutions, so that the respective balance of funds in each of the aggregated deposit accounts of multiple of the recipient depository institutions, after taking into consideration the fund transfer amounts for the first and second sub periods of time, will substantially match a sum of the respective balances of funds from the multiple of the respective client accounts allocated to this respective aggregated deposit account. In one or more embodiments, this operations may be considered, in one or more embodiments, a re-shuffling of client account amounts to substantially match the one or more transfers to or from the aggregated deposit accounts. This allocation operation may be performed just one time a day, or may be performed for every transfer of funds, or may be performed every few hours, or based on meeting a fund level threshold, to name a few. This operation is represented in the Timeline of FIG. 4 by T9.

Block 350 represents an operation of updating or having updated, using the one or more computers, the one or more electronic databases to reflect at least a final one of the allocations to one or more of the depository institutions. Note that in one or more embodiments, the one or more databases may be updated for each of the allocations. In one or more embodiments, the one or more databases may be updated to reflect an updated respective balance of funds for multiple of the client accounts, with the data comprising a balance of client funds from the respective client account held in each of one or more recipient depository institutions in the interest-bearing aggregated deposit accounts holding funds of the respective client account and any other accounts in the program holding funds of the respective client account. This operation may be represented in the Time line of FIG. 4 as taking place at time T10.

Note that any number of transfers may be performed during a particular day. In this respect, in one or more embodiments, the steps may be performed of obtaining at or before a third source reception cutoff time, third client account transaction information comprising credit information and/or debit information applied to or against respective client accounts for one or more third sub periods of time for a third set of one or more of the source institutions; obtaining, using the one or more computers, a respective net transfer amount for the one or more third sub-periods of time for respective ones of the third set of one or more of the source institutions based at least in part on the third client account transaction information; selecting at least one respective aggregated deposit account in at least one respective depository institution in a third group, to which to deposit/transfer or to withdraw/transfer funds, based at least in part on one or more selection rules, wherein the third group comprises one or more of the recipient depository institutions with respective recipient cutoff times in a third time range; and generating transfer data, using the one or more computers, reflecting a transfer of at least one third transfer amount to the at least one aggregated deposit account selected from the third group of one or more of the recipient depository institutions. The third time range is flexible and, for example, may overlap either or both of the first and second ranges, or may begin at or after an end of one or both of the other time ranges. Note that the same implementations and permutations as previously described may be applicable to these additional steps. In one or more embodiments, this operation may be performed manually.

In a further embodiment, where each of multiple of the depository institutions has a maximum cap, the operation may be performed of selecting depository institutions for at least one of the groups so that a sum of the maximum caps of the respective depository institutions selected for the group equals or exceeds a threshold amount. As noted previously, this threshold amount may comprise a predetermined amount or an amount determined on the fly based at least in part on current transfer activity, to ensure that one or more of the groups receiving transfer amounts later in the day have the capacity to accept deposits coming from other depository institutions. As per the example described previously, a particular group of Pacific time zone depository institutions may be required to have the cumulative capacity to take deposits from New York or other eastern time zone depository institutions after the cutoff time for the New York depository institutions, or after an eastern group cutoff time, as well as from its own client accounts and/or from other depository institutions in the same time zone. In one or more embodiments, the operation of selecting depository institutions for the at least one group with depository institutions in the same time zone may be performed so that a sum of the maximum caps of the respective depository institutions selected for the group equals or exceeds the previously described threshold amount.

Figure 5A:
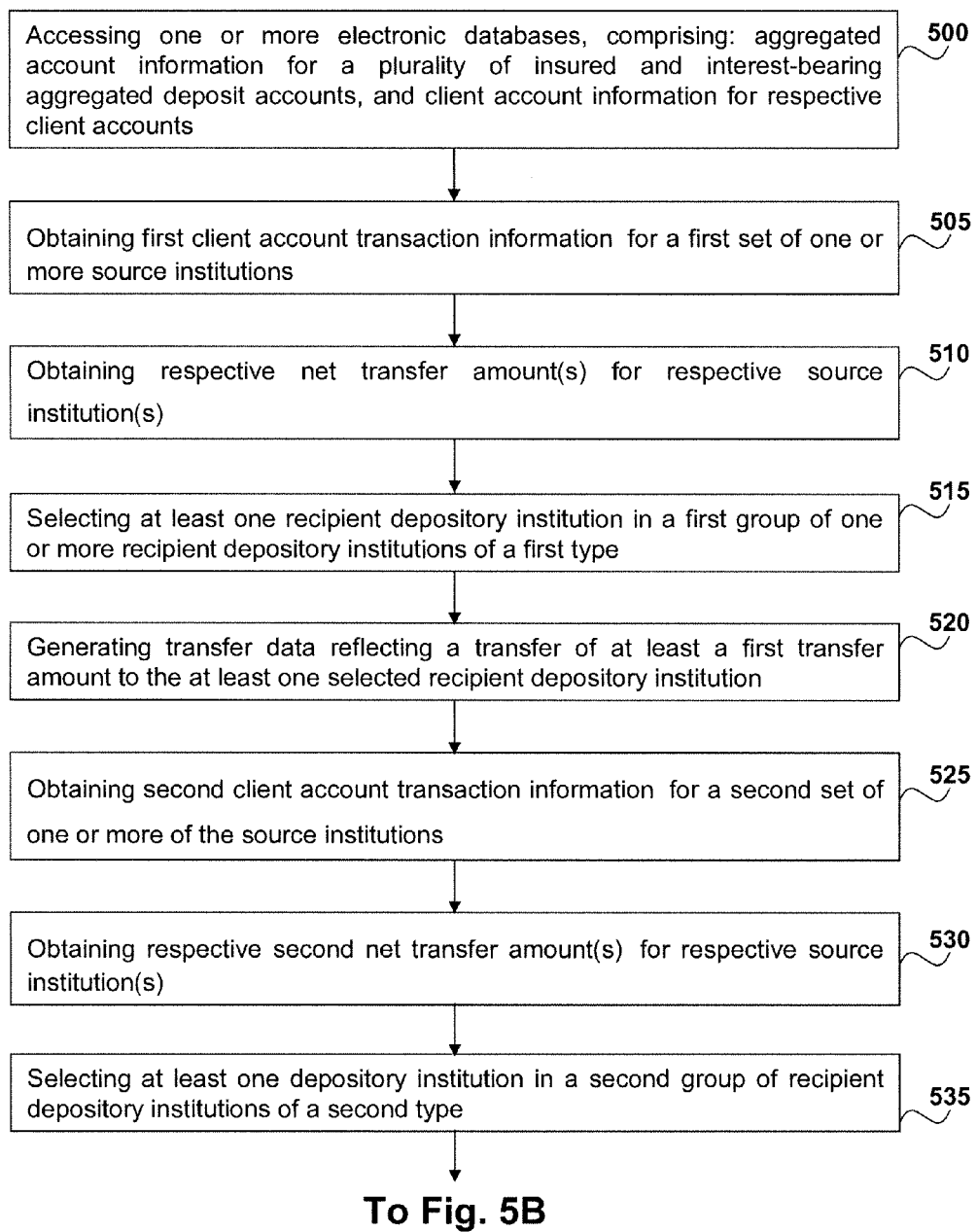
FIGS. 5A and 5B are a schematic flow chart of another exemplary method in accordance with one or more embodiments of the invention.
Figure 5B:
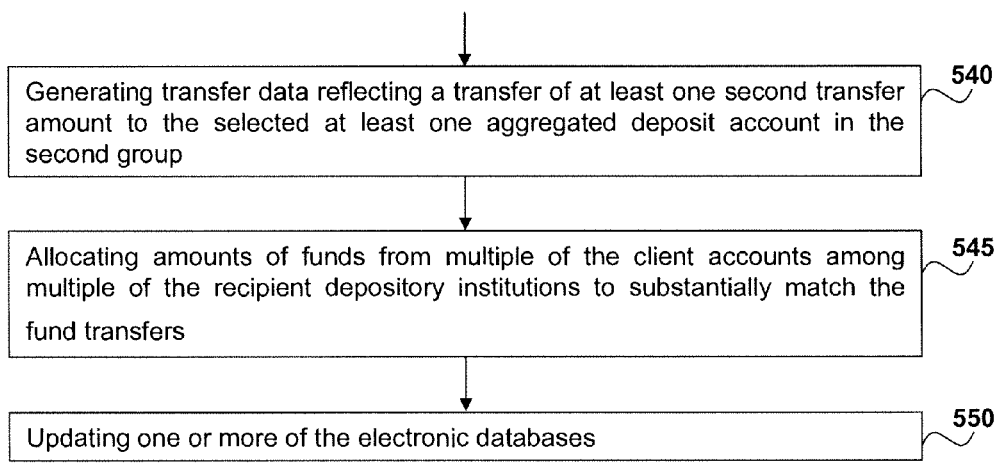

A further embodiment of the inventions is illustrated by the flowcharts of FIGS. 5A and 5B. This embodiment is based, at least in part on forming recipient depository institutions based on depository institution types. Referring to FIGS. 5A and 5B, block 500 represents an operation of accessing, using one or more computers, one or more electronic databases, stored on one or more computer-readable media. In one or more embodiments, the one or more databases comprise (i) aggregated account information for a plurality of government-backed insured and interest-bearing aggregated deposit accounts held in a plurality of recipient depository institutions, comprising a balance of funds held in each of the aggregated deposit accounts, wherein funds from a plurality of client accounts are aggregated with funds of other client accounts in the aggregated deposit accounts, wherein each of multiple of the depository institutions has one or more respective cutoff times. In one or more embodiments, the one or more databases comprise (ii) source institution information comprising an amount of funds sourced to a program from each of a plurality of respective source institution, wherein multiple of the source institutions are also depository institutions and/or are affiliated with one or more of the depository institutions. In one or more embodiments, the one or more databases comprise (iii) client account information for each of a plurality of the respective client accounts comprising at least a respective balance of funds from the respective client account held in each of one or more recipient depository institutions in the interest-bearing aggregated deposit accounts holding funds of the respective client account. See the discussion for block 300 in FIG. 3A for permutations, which apply here also.

Block 505 represents an operation of obtaining first client account transaction information comprising credit information and/or debit information applied to or against respective client accounts for one or more first sub periods of time for a first set of one or more of the source institutions. In one or more embodiments, the obtaining operation of block 505 may be performed to obtain the first client account transaction information at or before a first source reception cutoff time. See the discussion for block 305 in FIG. 3A for a definition of the source reception cutoff time, and for permutations, which apply here also.

Block 510 represents and operation of obtaining, using the one or more computers, a respective net transfer amount for one or more first sub-periods of time for respective ones in the first set of one or more of the respective source institutions, based at least in part on the first client account transaction information. See the discussion for block 310 in FIG. 3A for permutations, which apply here also.

Block 515 represents an operation of selecting at least one respective aggregated deposit account in at least one respective depository institution in a first group comprising a first plurality of the recipient depository institutions, to which to deposit/transfer or to withdraw/transfer funds, based at least in part on one or more selection rules, wherein the first group comprises recipient depository institutions of a first type. See the discussion for block 315 in FIG. 3A for permutations, which apply here, except the grouping is based at least in part on a first type, to be discussed below.

Block 520 represents an operation of generating transfer data, using the one or more computers, reflecting a transfer of at least one first transfer amount to or from the at least one recipient depository institution that was selected. See the discussion for block 320 in FIG. 3A for permutations, which apply here also.

Block 525 represents an operation of obtaining second client account transaction information comprising credit information and/or debit information applied to or against respective client accounts for the one or more second sub periods of time for a second set of one or more of the source institutions. In one or more embodiments, the obtaining operation of block 525 may be performed to obtain the second client account transaction information at or before a second source reception cutoff time that is after the first source reception cutoff time. See the discussion for block 325 in FIG. 3A for permutations, which apply here also.

Block 530 represents an operation of obtaining, using the one or more computers, a respective second net transfer amount for the one or more second sub-periods of time for respective ones in a second set of one or more of the source institutions based at least on part on the second client account transaction information, where some or all of the one or more second sub periods of time may be the same as or different from the one or more first sub periods of time, and wherein the first and second sets of one or more of the source institutions may be different, or the same or partially overlap. See the discussion for block 330 in FIG. 3A for permutations, which apply here also.

Block 535 represents an operation of selecting at least one aggregated deposit account in at least one depository institution in a second group comprising a second plurality of the recipient depository institutions, to which to deposit/transfer or to withdraw/transfer funds, based at least in part on one or more selection rules, wherein the second group comprises recipient depository institutions of a second type. See the discussion for block 335 in FIG. 3A for permutations, which apply here also, except that the second group is based on recipient depository institutions of a second type.

In one or more embodiments, the first type and/or the second type may be based at least in part on an affiliation. In one or more embodiments, the first type and/or the second type is based at least in part on a type of account held by the depository. For example, the first type may comprise recipient depository institutions holding a government backed insured account in the program, and the second group may comprise recipient depository institutions holding at least one non-insured aggregated investment vehicle, such as an aggregated money fund. As another example, one of the types may be based at least in part on depository institutions holding government accounts, such as municipal or state fund accounts. As another example, one of the types may be based at least in part on whether the depository institution is a clearing institution or uses a particular clearing institution for clearing transactions.

Block 540 represents an operation of generating transfer data, using the one or more computers, reflecting a transfer of at least one second transfer amount to the at least one aggregated deposit account selected from the second group of one or more of the recipient depository institutions. See the discussion for block 340 in FIG. 3B for permutations, which apply here also.

Block 545 represents an operation of allocating, using the one or more computers, amounts of funds from multiple of the client accounts among multiple of the recipient depository institutions, so that the respective balance of funds in each of the aggregated deposit accounts of the multiple of the recipient depository institutions, after taking into consideration the fund transfer amounts for the first and second sub periods of time, will substantially match a sum of the respective balances of funds from the multiple of the respective client accounts allocated to this respective aggregated deposit account. See the discussion for block 345 in FIG. 3B for permutations, which apply here also.

Block 550 represents an operation of updating or having updated, using the one or more computers, the one or more electronic databases to reflect the allocating of the amounts of funds of the multiple client accounts to the recipient depository institutions. See the discussion for block 350 in FIG. 3B for permutations, which apply here also.

Figure 2:
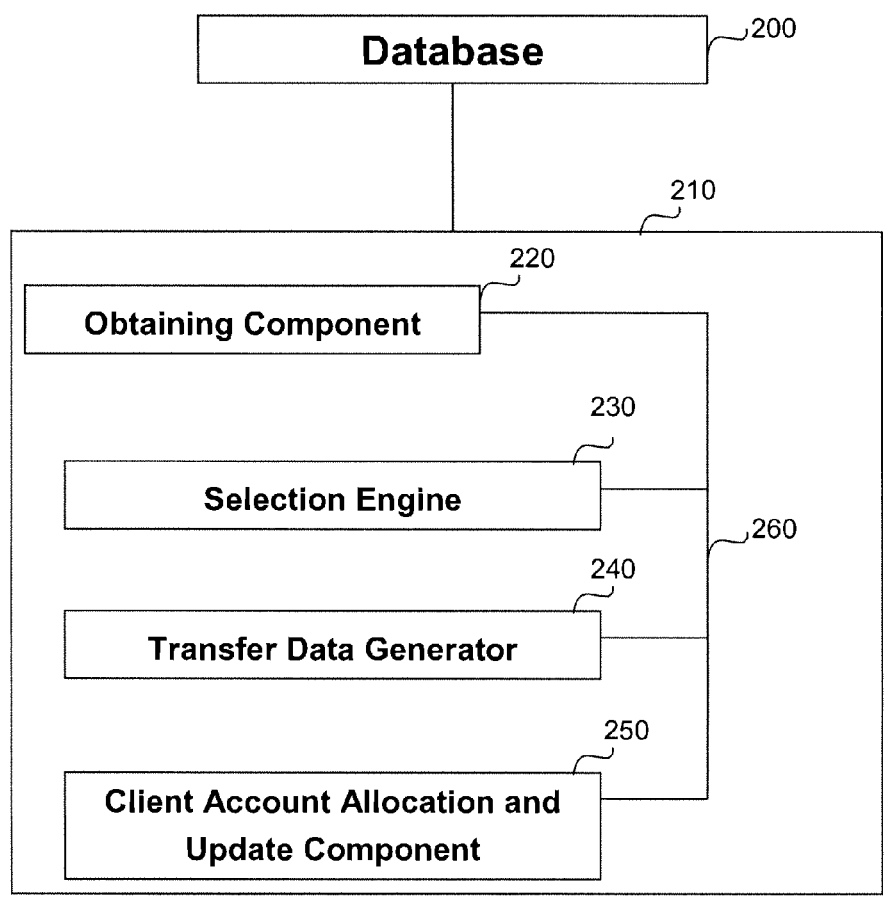
FIG. 2 is a schematic block diagram of an exemplary system in accordance with one or more embodiments of the invention.

One non-limiting embodiment of a deposit management system 160 for implementing the invention is shown in FIG. 2 and comprises one or more electronic databases 200 and one or more computers 210.

The one or more computers 210 for the deposit management system, in one or more embodiments, may be operatively connected/accessible to computer-readable program code stored in memory, and may be capable of executing program code uploaded therefrom to configure the one or more computers into one or more special-purpose machines. The code, in one or more embodiments, may be comprised of programming modules or other software forms that implement functional components in the one or more computers. These modules or other software forms may be stored separately or in combination.

In one or more embodiments, an obtaining component 220 performs the obtaining first and second client account transaction information operations and the obtaining the net transfer amounts for the first and the second sub-periods of time. As noted for the discussion of these operations in relations to the flowchart of FIG. 3, one or more of these information items may be received via a communication component, configured on the one or more computers 210, for receiving electronically, via one or more electronic networks, the first and second client account transaction information operations and the obtaining net transfer amounts information. Some or all of this information may be received in connection with an electronic sweep file. Alternatively or in addition, some or all of this information may be separately received in person, or over the telephone, by fax or other distribution means and entered by keying or scanning or other means of entry of such information. Accordingly, the obtaining component may also be implemented for one or more embodiments, by a component for receiving information keyed or scanned into the system. Alternatively or in addition, the obtaining component 210 may be implemented in one or more embodiments, by a calculator engine for calculating nets for individual client accounts, and/or for calculating respective net transfer amounts for respective one of the source institutions based at least in part on the credit information and/or the debit information received for client accounts associated in the one or more databases with a respective one of the source institutions. Alternatively or in addition, the obtaining component 210 may be implemented in one or more embodiments, by a component for verifying and/or correlating received information with client account and/or net transfer amount information received in a sweep file or received from a source or a record keeper or other entity.

In one or more embodiments, a selection engine 230 may perform a selection of at least one aggregated deposit account in one or more of the recipient depository institutions in the first and the second groups, to which to deposit/transfer or to withdraw/transfer funds, based at least in part on one or more selection rules, as previously discussed in relation to FIG. 3. Note that in one or more embodiments, the selection engine 230 may further comprise a component for selecting the one or more recipient depository institutions to form the first and second groups. The one or more selection criteria to form the groups may be based in one or more embodiment, as noted previously, on one or more of the following: on cutoff times, on deposit capacities that are based at least in part on current respective maximum and minimum caps for the respective recipient depository institutions as compared to projected transfers for the one or more sub periods of time or on real time transfer data for the one or more sub periods of time, on achieving a target reciprocity as previously discussed, on minimizing transfers to one or more of the recipient depository institutions, on selecting only recipient depository institutions with a predetermined affiliation for one or both of the groups, or that use a same clearing institution, or are of a predetermined type, or that have a predetermined account type, e.g., a particular investment account type, to name a few. Note that alternatively or in addition, the selection of recipient depository institutions for the respective groups may also be predetermined in whole or in part, by its clients, or by another third party, and/or may be based at least in part on a de-selection by the source institution or its clients, or the recipient depository institution or the deposit management system, and received electronically, and/or manually received and keyed, scanned or otherwise entered into the system. The group members may be substantially constant, or determined periodically, or may be determined in real time. Accordingly, in one or more embodiments, the recipient depository institution members in one or more of the groups may change with every transfer operation, or every few hours, or daily, or weekly, for example.

The one or more computers 210 for the deposit management system may be further configured, in one or more embodiments, with program code for a transfer data generator 240 for generating recommended and/or actual withdrawal/transfer amount(s) and/or instructions and/or deposit/transfer amount(s) and/or instructions, to and/or from source institutions and/or recipient institutions. In embodiments, the system may generate recommended and/or actual instructions to be carried out by source institutions, agents of source institutions, intermediaries and/or others. In embodiments, intermediaries may up-load or provide instructions to be approved, executed and/or performed by others.

In one or more embodiments, a transfer data generator 240 may be configured for generating transfer data reflecting a wire, Fax, email, or other method of transfer of the transfer data. The transfers may be directly to other institutions, or via one or more clearing accounts of one or more clearance institutions, or to payment entities, to name a few. As noted, in one or more embodiments, the transfer data may reflect that withdrawal/transfer data may be presented to the respective one depository institution in a manner that does not count against the 6 withdrawal limit imposed by Federal Reserve regulations, e.g., using one or more of the methods of: in person, or by mail, or by messenger, or by telephone and distributed by mail, or by automated teller machine, or a combination thereof.

The one or more computers 210 for the deposit management system may be further configured, in one or more embodiments, with program code to comprise a client account allocation and update component 250 for allocating amounts of funds from multiple of the client accounts among multiple of the recipient depository institutions, so that the respective balance of funds in each of the aggregated deposit accounts of multiple of the recipient depository institutions, after taking into consideration the fund transfer amounts for the first and second sub periods of time, will substantially match a sum of the respective balances of funds from the multiple of the respective client accounts allocated to this respective aggregated deposit account. The one or more databases are then updated to reflect the allocating of the amounts of funds of the multiple client accounts to the recipient depository institutions. In one or more embodiments, the allocation information may be calculated based at least in part on one or more criteria. In one or more embodiments, a record keeper performs such allocations and/or allocation calculations in accordance with one or more parameters.

A system bus 260 may further be provided to facilitate electronic data communication among the components.

In one or more embodiments, the one or more computers 210 may be configured with programming code for performing a pseudo-allocation of the one or more first withdrawal/transfer amounts and/or one or more first deposit/transfer amounts, to determine, based at least in part on the pseudo-allocation end balances, if there are any client account funds that are not insured, and/or to determine whether recipient depository institution reciprocity targets for one or more of the recipient depository institutions will or will not be met by a proposed allocation, and then if certain parameters are not met, altering one or more of the parameters associated with one or more of the different recipient depository institutions in the program to reduce the uninsured amount and/or to come closer to reciprocity targets. For example, in one or more embodiments, if the performance of the pseudo-allocation determines that there will be funds that are not insured or that one or more recipient depository institution reciprocity targets will not be met by the proposed allocation, then in the one or more embodiments where allocation to the interest-bearing aggregated deposit accounts held in the respective recipient depository institutions is controlled at least in part by maximum caps and/or minimum caps, one or more of these cap may be adjusted. In one or more embodiments, this operation may be performed manually.

In one or more embodiments, the one or more computers 210 may be configured with programming code for generating and sending one or more instructions to withdraw/transfer funds from the control operating account held by the clearance bank 120 and to transfer those funds to one or more of the program source institutions and/or to recipient depository institutions and/or to payment entities. In one or more embodiments, this operation may be performed manually.

In one or more embodiments, the one or more computers may be configured by programming code for making direct electronic communication with the control operating account 125 held by the clearance bank 120 to provide instructions to withdraw/transfer funds from the control operating account 125, and to send/transfer funds to one or more of the source institutions and/or to one or more of the recipient depository institutions and/or to one or more payment entities. In another embodiment, a communication to the clearance bank by telephone, or by Fax, or in person, or other non-automated communication, may be performed. In one or more embodiments, this operation may be performed manually.

In one or more embodiments, the transfer data generator 240 may be configured with programming code for sending the transfer data to a source institution. In one or more embodiments, this operation may be performed manually.

In one or more embodiments, the program may use a plurality of control operating accounts at one or more clearance banks, to manage timing of deposit/transfers and withdrawals/transfer among the recipient depository institutions, the source institutions, and the payment entities.

As noted above, in one or more embodiments, a reverse wire draw-down operation may be used by a source institution, or by the deposit management system 160, or by another entity, to "pull" funds from one or more aggregated transaction accounts, instead of initiating a "push" transfer via a wire or other electronic transfer, by the recipient depository institutions.

In yet another embodiment, a recipient depository institution, an intermediary institution, the deposit management system 160, and/or another entity, may perform a reverse wire draw-down operation to "pull" funds from one or more depository institutions/source institutions/clearance banks for a deposit/transfer to accelerate fund movement.

In one or more embodiments, the transfer data comprises at least funds of one or more client accounts. In one or more embodiments, the transfer data comprises at least bank funds, or only bank funds. In one or more embodiments, the transfer data comprises at least municipal or other governmental funds, or only municipal or other governmental funds.

In one or more embodiments, the one or more computers 210 may be configured by programming code to administer clients' deposits/transfers to and/or withdrawals/transfers from client accounts associated with one or more of the source institutions. The administering may comprise processing transaction data comprising transaction data for one or more deposits/transfers for one or more client accounts and/or transaction data for one or more withdrawals/transfers from one or more of said client accounts, with the transaction data comprising a respective amount for each respective deposit/transfer and/or each respective withdrawal/transfer, and/or a partial or whole net of such amounts over a period of time. For example, the transactions could include sweeps, checks, transfers to cover, e.g., securities transactions or margin accounts, debit card transactions, credit card transactions, on-line bill paying transactions, touch tone bill paying data, ACH transactions, wire transactions, other transfers, and/or nets thereof, to name a few.

Embodiments within the scope of the present invention include program products comprising machine-readable media for carrying or having machine-executable instructions or data structures stored thereon. Such machine-readable media can be any available media which can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to store desired program code in the form of machine-executable instructions or data structures and which can be accessed by a general purpose or special purpose computer or other machine with a processor. Combinations of the above are also included within the scope of machine-readable media. Machine-executable instructions comprise, for example, instructions and data which cause a general purpose computer, special purpose computer, or special purpose processing machines to perform a certain function or group of functions.

Embodiments of the invention have been described in the general context of method steps which may be implemented in one or more embodiments by a program product including machine-executable instructions, such as program code, for example in the form of program modules executed by machines in networked environments. Generally, program modules include routines, programs, objects, components, data structures, etc., that perform particular tasks or implement particular data types. Multi-threaded applications may be used, for example, based on Java or C++. Machine-executable instructions, associated data structures, and program modules represent examples of program code for executing steps of the methods disclosed herein. The particular sequence of such executable instructions or associated data structures represent examples of corresponding acts for implementing the functions described in such steps.

Embodiments of the present invention may be practiced with one or multiple computers in a networked environment using logical connections to one or more remote computers having processors. Logical connections may include a local area network (LAN) and a wide area network (WAN) that are presented here by way of example and not limitation. Such networked environments are commonplace in office-wide or enterprise-wide computer networks, and include intranets and the Internet, and may use a wide variety of different communication protocols. Those skilled in the art will appreciate that such network computing environments will typically encompass many types of computer system configurations, including personal computers, hand-held devices, multi-processor systems, microprocessor-based or programmable consumer electronics, network PCs, minicomputers, mainframe computers, and the like. Embodiments of the invention may also be practiced in distributed computing environments where tasks are performed by local and remote processing devices that are linked (either by hardwired links, wireless links, or by a combination of hardwired and wireless links) through a communications network. In a distributed computing environment, program modules may be located in both local and remote memory storage devices.

It should be noted that although the flow charts provided herein show a specific order of method steps, it is understood that the order of these steps may differ from what is depicted. Also two or more steps may be performed concurrently or with partial concurrence. Such variation will depend on the software and hardware systems chosen and on designer choice. It is understood that all such variations are within the scope of the invention. Likewise, software and web implementations of the present invention could be accomplished with programming techniques with rule based logic and other logic to accomplish the various database searching steps, correlation steps, comparison steps and decision steps. It should also be noted that the word "component" as used herein and in the claims is intended to encompass implementations using one or more lines of software code, and/or hardware implementations. It should also be noted that the phrase "a plurality" is intended to mean more than one, and is not intended to refer to any previous recitation of the word "plurality," unless preceded by the word "the."

While this invention has been described in conjunction with the exemplary embodiments outlined above, it is evident that many alternatives, modifications and variations will be apparent to those skilled in the art. Accordingly, the exemplary embodiments of the invention, as set forth above, are intended to be illustrative, not limiting. Various changes may be made without departing from the spirit and scope of the invention.

I claim:

1. A method, comprising:

accessing, using one or more computers, one or more electronic databases, stored on one or more computer-readable media, comprising:
(i) aggregated account information for a plurality of government-backed insured and interest-bearing aggregated deposit accounts held in a plurality of recipient depository institutions, comprising a balance of funds held in each of the aggregated deposit accounts, wherein funds from a plurality of client accounts are aggregated with funds of other client accounts in the aggregated deposit accounts, wherein each of multiple of the depository institutions has one or more respective cutoff times;
(ii) source institution information comprising an amount of funds sourced to a program from each of a plurality of respective source institution, wherein multiple of the source institutions are also depository institutions and/or are affiliated with one or more of the depository institutions;
(iii) client account information for each of a plurality of the respective client accounts comprising at least a respective balance of funds from the respective client account held in each of one or more of the recipient depository institutions in the interest-bearing aggregated deposit accounts holding funds of the respective client account;

obtaining at or before a first source reception cutoff time, first client account transaction information comprising credit information and/or debit information applied to or against respective client accounts for one or more first sub periods of time for a first set of one or more of the source institutions;

obtaining, using the one or more computers, a respective first net transfer amount for one or more of the first sub-periods of time for respective ones in the first set of one or more of the respective source institutions based at least in part on the first client account transaction information;

selecting at least one respective aggregated deposit account in at least one respective depository institution in a first group comprising a first plurality of the recipient depository institutions, to which to deposit/transfer or to withdraw/transfer funds, based at least in part on one or more selection rules, wherein the first group comprises recipient depository institutions with respective recipient cutoff times in a first time range;

generating transfer data, using the one or more computers, reflecting a transfer of at least one first transfer amount to or from the at least one recipient depository institution that was selected;

obtaining at or before a second source reception cutoff time that is after the first source reception cutoff time, second client account transaction information comprising credit information and/or debit information applied to or against respective client accounts for the one or more second sub periods of time for a second set of one or more of the source institutions;

obtaining, using the one or more computers, a respective second net transfer amount for the one or more of the second sub-periods of time for respective ones in a second set of one or more of the source institutions based at least in part on the second client account transaction information, where some or all of the one or more second sub periods of time may be the same as or different from the one or more first sub periods of time, and wherein the first and second sets of one or more of the source institutions may be different, or the same or partially overlap;

selecting at least one aggregated deposit account in at least one depository institution in a second group comprising a second plurality of the recipient depository institutions, to which to deposit/transfer or to withdraw/transfer funds, based at least in part on one or more selection rules, wherein the second group comprises recipient depository institutions with respective recipient cutoff times in a second time range that is different from the first time range;

generating transfer data, using the one or more computers, reflecting a transfer of at least one second transfer amount to the at least one aggregated deposit account selected from the second group of one or more of the recipient depository institutions;

allocating, using the one or more computers, amounts of funds from multiple of the client accounts among multiple of the recipient depository institutions, so that the respective balance of funds in each of the aggregated deposit accounts of the multiple of the recipient depository institutions, after taking into consideration the fund transfer amounts for the first and second sub periods of time, will substantially match a sum of the respective balances of funds from the multiple of the respective client accounts allocated to this respective aggregated deposit account; and updating or having updated, using the one or more computers, the one or more electronic databases to reflect the allocating of the amounts of funds of the multiple client accounts to the recipient depository institutions.

2. The method as defined in claim 1, where at least multiple of the recipient depository institutions in the second group are different from the recipient depository institutions in the first group.

3. The method as defined in claim 1, wherein the first time range of recipient cutoff times is overlapping with the second time range of recipient cutoff times, but ends before the second time range of recipient cutoff times.

4. The method as defined in claim 1, wherein the first time range of recipient cutoff times is not overlapping with the second time range of recipient cutoff times, and ends before a beginning of the second time range of recipient cutoff times.

5. The method as defined in claim 1, wherein multiple of the source institutions are also recipient depository institutions.

6. The method as defined in claim 1, wherein multiple of the source institutions are affiliated with one or more of the recipient depository institutions, and wherein one of the one or more selection rules is to transfer fund of respective source institutions only to recipient depository institutions that are affiliated therewith, if possible.

7. The method as defined in claim 1, wherein some of the fund transfers are deposited/transferred to one or more money fund accounts.

8. The method as defined in claim 1, wherein some of the fund transfers are deposited/transferred to one or more uninsured aggregated investment vehicles.

9. The method as defined in claim 1, further comprising:
obtaining at or before a third source reception cutoff time, third client account transaction information comprising credit information and/or debit information applied to or against respective client accounts for one or more third sub periods of time for a third set of one or more of the source institutions;

obtaining, using the one or more computers, a respective net transfer amount for the one or more third sub-periods of time for the third set of one or more of the source institutions based at least in part on the third client account transaction information;

selecting at least one respective aggregated deposit account in at least one of the respective depository institutions in a third group, to which to deposit/transfer or to withdraw/transfer funds, based at least in part on one or more selection rules, wherein the third group comprises one or more of the recipient depository institutions with respective recipient cutoff times in a third time range;

and generating transfer data, using the one or more computers, reflecting a transfer of at least one third transfer amount to the at least one aggregated deposit account selected from the third group of one or more of the recipient depository institutions.

10. The method as defined in claim 1, further comprising:
selecting depository institutions for at least one of the groups so that all of the depository institutions in this group are in the same time zone.

11. The method as defined in claim 10, wherein each of multiple of the depository institutions has a maximum cap, and
further comprising:
selecting depository institutions for at least the second group to be in the same time zone and so that a sum of the maximum caps of the respective depository institutions selected for the second group equals or exceeds a threshold amount.

12. The method as defined in claim 1, wherein each of multiple of the depository institutions has a maximum cap, and
further comprising:
selecting depository institutions for at least one of the groups so that a sum of the maximum caps of the respective depository institutions selected for this group equals or exceeds a threshold amount.

13. The method as defined in claim 1, wherein the generating transfer data steps comprise:
determining one or more of the transfer amounts for one or more of the recipient depository institutions based, at least in part, on one or more parameters.

14. The method as defined in claim 1, wherein the government backed insurance is Federal Deposit Insurance Corporation insurance.

15. The method as defined in claim 1, wherein at least one of the recipient depository institutions is in at least two of the groups.

16. The method as defined in claim 1, wherein the one or more databases comprise information on the cutoff times of multiple of the recipient depository institutions, and further comprising accessing that information on the cutoff times by the one or more computers.

17. The method as defined in claim 1, wherein at least one of the source institutions has both first client account transaction information and second client account transaction information.

18. The method as defined in claim 1, wherein the first source reception cutoff time and/or the second source reception cutoff time varies from day to day.

19. The method as defined in claim 1, wherein one or more of the recipient depository institution cutoff times varies from time period to time period.

20. The method as defined in claim 1, wherein the recipient depository institutions in the first group and/or the second group vary from time period to time period.

21. A system, comprising:
one or more computers comprising memory wherein the memory stores computer-readable instructions comprising program code that, when executed, cause the one or more computers to perform the steps:
accessing, using the one or more computers, one or more electronic databases, stored on one or more computer-readable media, comprising:
(i) aggregated account information for a plurality of government-backed insured and interest-bearing aggregated deposit accounts held in a plurality of recipient depository institutions, comprising a balance of funds held in each of the aggregated deposit accounts, wherein funds from a plurality of client accounts are aggregated with funds of other client accounts in the aggregated deposit accounts, wherein each of multiple of the depository institutions has one or more respective cutoff times;
(ii) source institution information comprising an amount of funds sourced to a program from each of a plurality of respective source institution, wherein multiple of the source institutions are also depository institutions and/or are affiliated with one or more of the depository institutions;
(iii) client account information for each of a plurality of the respective client accounts comprising at least a respective balance of funds from the respective client account held in each of one or more of the recipient depository institutions in the interest-bearing aggregated deposit accounts holding funds of the respective client account;

obtaining at or before a first source reception cutoff time, on the one or more computers, first client account transaction information comprising credit information and/or debit information applied to or against respective client accounts for one or more first sub periods of time for a first set of one or more of the source institutions;

obtaining, on the one or more computers, a respective first net transfer amount for one or more of the first sub-periods of time for respective ones in the first set of one or more of the respective source institutions based at least in part on the first client account transaction information;

selecting, using the one or more computers, at least one respective aggregated deposit account in at least one respective depository institution in a first group comprising a first plurality of the recipient depository institutions, to which to deposit/transfer or to withdraw/transfer funds, based at least in part on one or more selection rules, wherein the first group comprises recipient depository institutions with respective recipient cutoff times in a first time range;

generating transfer data, using the one or more computers, reflecting a transfer of at least one first transfer amount to or from the at least one recipient depository institution that was selected;

obtaining at or before a second source reception cutoff time that is after the first source reception cutoff time, on the one or more computers, second client account transaction information comprising credit information and/or debit information applied to or against respective client accounts for the one or more second sub periods of time for a second set of one or more of the source institutions;

obtaining, on the one or more computers, a respective second net transfer amount for the one or more of the second sub-periods of time for respective ones in a second set of one or more of the source institutions based at least in part on the second client account transaction information, where some or all of the one or more second sub periods of time may be the same as or different from the one or more first sub periods of time, and wherein the first and second sets of one or more of the source institutions may be different, or the same or partially overlap;

selecting, using the one or more computers, at least one aggregated deposit account in at least one depository institution in a second group comprising a second plurality of the recipient depository institutions, to which to deposit/transfer or to withdraw/transfer funds, based at least in part on one or more selection rules, wherein the second group comprises recipient depository institutions with respective recipient cut-off times in a second time range that is different from the first time range;

generating transfer data, using the one or more computers, reflecting a transfer of at least one second transfer amount to the at least one aggregated deposit account selected from the second group of one or more of the recipient depository institutions;

allocating, using the one or more computers, amounts of funds from multiple of the client accounts among multiple of the recipient depository institutions, so that the respective balance of funds in each of the aggregated deposit accounts of the multiple of the recipient depository institutions, after taking into consideration the fund transfer amounts for the first and second sub periods of time, will substantially match a sum of the respective balances of funds from the multiple of the respective client accounts allocated to this respective aggregated deposit account; and updating or having updated, using the one or more computers, the one or more electronic databases to reflect the allocating of the amounts of funds of the multiple client accounts to the recipient depository institutions.

* * * * *